(12) United States Patent
Kennedy et al.

(10) Patent No.: US 9,325,728 B1
(45) Date of Patent: Apr. 26, 2016

(54) SYSTEMS AND METHODS FOR IMPLEMENTING AND SCORING COMPUTER NETWORK DEFENSE EXERCISES

(71) Applicant: Leidos, Inc., Reston, VA (US)

(72) Inventors: Scott Kennedy, San Diego, CA (US); Carleton Rose Ayers, II, San Tan Valley, AZ (US); Susan Banks, Carlsbad, CA (US); Ian Carroll Allison, Carlsbad, CA (US); Myoki Elizabeth Spencer, San Diego, CA (US); Michael Anthony Diaz, Escondido, CA (US)

(73) Assignee: Leidos, Inc., Reston, VA (US)

( * ) Notice: Subject to any disclaimer, the term of this patent is extended or adjusted under 35 U.S.C. 154(b) by 150 days.

(21) Appl. No.: 13/947,149

(22) Filed: Jul. 22, 2013

Related U.S. Application Data

(60) Provisional application No. 61/673,894, filed on Jul. 20, 2012.

(51) Int. Cl.
*H04L 29/06* (2006.01)

(52) U.S. Cl.
CPC .................... *H04L 63/1433* (2013.01)

(58) Field of Classification Search
CPC ............... H04L 63/1433; H04L 63/1491
See application file for complete search history.

(56) References Cited

U.S. PATENT DOCUMENTS

| | | | |
|---|---|---|---|
| 7,023,979 B1 | 4/2006 | Wu et al. | |
| 7,133,896 B2 | 11/2006 | Ogdon et al. | |
| 7,213,260 B2 | 5/2007 | Judge | |
| 7,467,202 B2 | 12/2008 | Savchuk | |
| 7,913,303 B1 | 3/2011 | Rouland et al. | |
| 8,250,654 B1 * | 8/2012 | Kennedy et al. | 726/22 |
| 8,266,320 B1 * | 9/2012 | Bell et al. | 709/238 |
| 2001/0034847 A1 | 10/2001 | Gaul, Jr. | |
| 2002/0178383 A1 | 11/2002 | Hrabik et al. | |
| 2002/0188887 A1 | 12/2002 | Largman et al. | |
| 2003/0014669 A1 | 1/2003 | Caceres et al. | |
| 2003/0046577 A1 | 3/2003 | Silverman | |
| 2003/0056116 A1 | 3/2003 | Bunker et al. | |
| 2003/0167410 A1 | 9/2003 | Rigstad et al. | |
| 2003/0172145 A1 | 9/2003 | Nguyen | |
| 2004/0030931 A1 | 2/2004 | Chamandy et al. | |
| 2004/0229199 A1 | 11/2004 | Ashley et al. | |
| 2004/0250107 A1 | 12/2004 | Guo | |
| 2005/0015624 A1 | 1/2005 | Ginter et al. | |

OTHER PUBLICATIONS

Ayers II, Carleton R., "TeamDefend, A White Paper on Strengthening the Weakest Link: Organizational Cyber Defense Training, A CyberPatriot Initiative," 5 pp.
Ayers, Duke, "TeamDefend, a CyberPatriot Initiative, FAA Distinguished Lecturer Series, 'Fight as You Train,'" Mar. 17, 2004, 35 pp.
Ayers, Duke, "TeamSentry, A New Training Model for Defending the Critical Infrastructure," 13 pp.
Kennedy, Scott C., et al., "Computer Network Defense Exercise (CNDX), 'Train as You Fight,'" Nov. 2, 2004, 25 pp.
Myers, Kay, and Ayers, Duke, "Computer Network Defense Exercise (CNDX), a Tool for Unit Level Cyber Defense Training," 2 pp.

* cited by examiner

*Primary Examiner* — Chau Le
*Assistant Examiner* — Muhammad Chaudhry
(74) *Attorney, Agent, or Firm* — Dawn-Marie Bey; Bey & Cotropia PLLC

(57) ABSTRACT

Processes for the implementation and scoring of computer and network system defense exercises include base and modified scoring in accordance with various parameters and across multiple types of participants including attackers, defenders, forensic analysts, judges and referees. Effects-based scoring includes scoring for ascertaining status of an external client system by a participant in an independent client system.

15 Claims, 50 Drawing Sheets

```
<server>
    <message>
        ...
    </message>
    <time>Thu Dec  4 14:24:51 PST 2008</time>
    <msgid>973792</msgid>
    <session>03299a1eaacd37c98da5500f64d677a3</session>
</server>
```

FIGURE 20

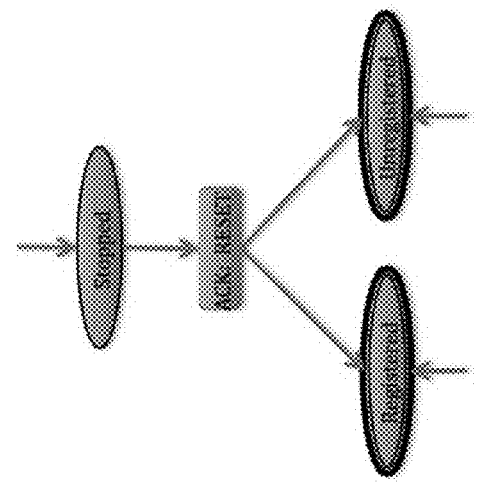
FIGURE 21b
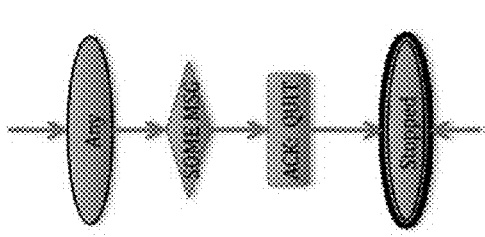
FIGURE 21a
```
<server>
    <message type="ACK">
        <acknowledge>OK</acknowledge>
    </message>
</server>
```
FIGURE 21c
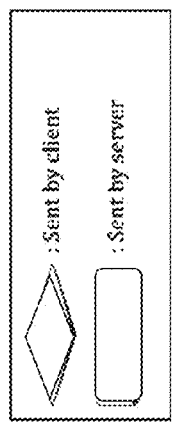
◇ : Sent by client
▭ : Sent by server

```
<server>
  <message type="VERSION">
    <version>1.0</version>
  </message>
</server>
```

```
<server>
    <message type="REGISTER">
        <id>
            <hostname>SERV2</hostname>
            <networks>
                <network>
                    <ip-address>192.168.1.100</ip-address>
                    <subnet-mask>255.255.255.0</subnet-mask>
                    <gateway>192.168.1.1</gateway>
                    <mac-address>FA:CE:00:44</mac-address>
                </network>
            </networks>
            <kernel>kernel.dll build 33421</kernel>
            <processors>
                <number>2</number>
                <description>Intel Xeon 2.4 GHz</description>
            </processors>
            <ram>4G</ram>
        </id>
    </message>
</server>
```

FIGURE 23b

```
<server>
    <message type="SID">
        <sid>aacd-37c9-8da5-0329-9a1e-500f-64d6-77a3</sid>
    </message>
</server>
```

FIGURE 24

```
<server>
  <message type="HEALTH">
    <cpu no="0">99</cpu>
    <cpu no="1">8</cpu>
    <mem>44</mem>
    <disks>
      <part>
        <name>C:</name>
        <full>40</full>
      </part>
      <part>
        <name>D:</name>
        <full>100</full>
      </part>
    </disks>
    <interfaces>
      <interface>
        <name>Connection 1</name>
        <up>32</up>
        <down>14</down>
      </interface>
    </interfaces>
  </message>
</server>
```

```
<server>
  <message type="FIREWALL">
    <status>up</status>
    <changes>
      <rule>INCOMING PORT(S) BLOCKED: ALL</rule>
      <rule>ALLOW TCP PORT 443 FROM * TO *<rule>
    </changes>
  </message>
</server>
```

```
<server>
  <message type="PORTS">
    <ports>
      <open>
        <tcp>
          <port>135</port>
          <port>80</port>
          <port>443</port>
        </tcp>
      </open>
      <closed>
        <tcp>
          <port>21</port>
        </tcp>
        <udp>
          <port>160</port>
        </udp>
      </closed>
    </ports>
  </message>
</server>
```

```
<server>
    <message type="VULNFIXED">
        <vulns>
            <vuln>
                <id>1342</id>
            </vuln>
        </vulns>
    </message>
</server>
```

FIGURE 30

```
<server>
    <message type="VULNS">
        <fixed>
            <vulns>
                <vuln>
                    <id>1342</id>
                </vuln>
                <vuln>
                    <id>9392</id>
                </vuln>
            </vulns>
        </fixed>
        <existing>
            <vulns>
                <vuln>
                    <id>9165</id>
                </vuln>
            </vulns>
        </existing>
    </message>
</server>
```

```
<client>
    <message type="VERSION">
        <version>1.0</version>
    </message>
</client>
```

FIGURE 32

```
<client>
    <message type="ACK">
        <acknowledge>OK</acknowledge>
    </message>
</client>
```

FIGURE 33

```
<client>
  <message type="PROFILE">
    <profile name="WIN WEB SERVER">
      <sid>aacd-37c9-8da5-0329-961e-5000-6406-77a3</sid>
      <vuln>
        <id>1342</id>
        <services>
          <service>
            <name>Print Spooler</name>
            <action>disable</action>
          </service>
        </services>
      </vuln>
      <vuln>
        <id>9393</id>
        <keys prec=1>
          <key>
            <keyname>HKE\...\Server</keyname>
            <valuename>Enabled</valuename>
            <value>0</value>
          </key>
        </Keys>
        <services prec=2>
          <service>
            <name>World Wide Web Services</name>
            <action>restart</action>
          </service>
        </services>
      </vuln>
      <vuln>
        <id>9165</id>
        <bin prec=1>
          <file>c:\windows\commctrl32.dll</file>
          <version>3299</version>
          <md5>4AB502...04EAB</md5>
        </bin>
        <services prec=2>
          <service>
            <name>OS</name>
            <action>restart</action>
          </service>
        </services>
      </vuln>
    </profile>
  </message>
</client>
```

FIGURE 35

```
<client>
    <message type="PASS CHECK">
        <auth>
            <username>admin</username>
            <password>someweakpass</password>
        </auth>
    </message>
</client>
```

FIGURE 36

```
<client>
    <message type="THROTTLE">
        <seconds>15</seconds>
        <minutes>2</minutes>
        <hours>0</hours>
    </message>
</client>
```

FIGURE 37

```
<client>
    <message type="GETPORTS"/>
</client>
```

FIGURE 38

```
<client>
    <message type="GETVULNS"/>
</client>
```

| Element | Value | Scoring Cycle 1 State | Scoring Cycle 1 Score | Scoring Cycle 2 State | Scoring Cycle 2 Score | Scoring Cycle 3 State | Scoring Cycle 3 Score | Scoring Cycle 4 State | Scoring Cycle 4 Score | Scoring Cycle 5 State | Scoring Cycle 5 Score | TT # Subtotal |
|---|---|---|---|---|---|---|---|---|---|---|---|---|
| Host 1 | 2 | UP | 2 | UP | 2 | DOWN | 0 | UP | 2 | UP | 2 | |
| Crit Serv 1 | 3 | UP | 3 | UP | 3 | UP | 0 | UP | 3 | UP | 3 | |
| Crit Serv 2 | 3 | UP | 3 | DOWN | 0 | DOWN | 0 | UP | 3 | UP | 3 | |
| Crit Serv 3 | 5 | UP | 5 | DOWN | 0 | DOWN | 0 | DOWN | 0 | DOWN | 5 | |
| Vol 1 | 3 | NOT FIX | 0 | FIXED | 3 | FIXED | 0 | FIXED | 3 | FIXED | 3 | |
| Vol 2 | 5 | NOT FIX | 0 | NOT FIX | 0 | NOT FIX | 0 | FIXED | 5 | FIXED | 5 | |
| Vol 3 | 1 | NOT FIX | 0 | NOT FIX | 0 | FIXED | 0 | FIXED | 1 | FIXED | 1 | |
| Vol 4 | 2 | NOT FIX | 0 | NOT FIX | 0 | NOT FIX | 0 | NOT FIX | 0 | NOT FIX | 2 | |
| Subtotals | | | 13 | | 8 | | 0 | | 17 | | 24 | |
| TT 1 Value | Max 10 | SUBMIT | 3 | Add Value | 3 | No Change | 0 | Add Value | 3 | Add Value | 1 | 10 |
| TT 2 Value | Max 10 | NONE | 0 | SUBMIT | 5 | Add Value | 5 | No Change | 0 | No Change | 0 | 10 |
| TT 3 Value | Max 10 | NONE | 0 | NONE | 0 | NONE | 0 | NONE | 0 | SUBMIT | 8 | 8 |
| Subtotals | | | 3 | | 8 | | 5 | | 3 | | 9 | |
| Cumulative | | | 16 | | 32 | | 37 | | 57 | | 90 | |

FIGURE 45b

SYSTEMS AND METHODS FOR IMPLEMENTING AND SCORING COMPUTER NETWORK DEFENSE EXERCISES

CROSS-REFERENCE TO RELATED APPLICATIONS

This application claims benefit of priority to U.S. Provisional Patent Application No. 61/673,894 for SYSTEMS AND METHODS FOR IMPLEMENTING AND SCORING COMPUTER NETWORK DEFENSE EXERCISES filed Jul. 20, 2012 which is incorporated herein by reference in its entirety.

This application is related to and claims the benefit of priority to U.S. application Ser. Nos. 13/554,609 and 12/492,242 (now U.S. Pat. No. 8,250,654) which were filed on Jul. 20, 2012 and Jun. 26, 2009, respectively, for SYSTEMS AND METHODS FOR IMPLEMENTING AND SCORING COMPUTER NETWORK DEFENSE EXERCISES and U.S. application Ser. Nos. 13/544,433 and 11/340,726 (now U.S. Pat. No. 8,266,320) filed on Jul. 20, 2012 and Jan. 27, 2006, respectively, for COMPUTER NETWORK DEFENSE and U.S. Provisional Patent Application No. 60/647,009, filed Jan. 27, 2005 which are incorporated herein by reference in their entirety.

BACKGROUND OF THE INVENTION

1. Field of the Invention

Embodiments of the invention relate to computer security. Specific embodiments relate to training information technology (IT) staff in the attack and/or defense of computer systems and networks.

2. Description of Related Art

Maintaining computer network security is becoming an increasingly difficult task. The internal (insider) threat has historically accounted for the greatest amount of misuse activity; and its consequence affects even the most trusted networks. Whether intentional or through improper procedure, the insider threat has resulted in lost productivity, espionage and fraud. The Internet plays an ever-increasing role in our national IT infrastructure as its ubiquitous nature provides a very cost-effective and high availability communication network. This world-wide infrastructure complements the trusted networks providing long-haul communications as well as remote management connectivity to Supervisory Control and Data Acquisition (SCADA) units connected to critical enterprise operations. The widening use of the Internet introduces increased exposure to the external threat such as corporate spies, cyber terrorists, and a growing number of "wannabe" hackers.

While higher-profile exploits (primarily external threats) such as "Code Red," "Nimda," "Blaster," "Sasser," and "Conflicker" are covered by the media, many more cyber incidents go unpublicized; at times because system administrators and security personnel are often ill-prepared to recognize, mitigate, and document cyber incidents. Compounding the situation is that knowledgeable hackers can use the aggregated power of low-value compromised systems to execute a coordinated attack against a more critical, better defended system. As such, most any IT resource connected to the Internet, regardless of its importance, becomes a weak link in the IT infrastructure if left unprotected. To protect these networks and resources, strong information assurance measures must be put in place to ensure the uninterrupted, reliable operation of these critical enterprise systems in the face of both internal and external threats.

SUMMARY OF THE INVENTION

In an embodiment of the present invention, a process for scoring a client network system defense training exercise implemented over a services-oriented architecture includes: receiving by at least one server from the client network system data related to a defense training exercise at an end of one or more of predetermined scoring cycles or upon request, the data including one or more of a current list of client network system vulnerabilities, details of client system vulnerability fixes, details of client system vulnerability identifications and details of client system vulnerability exploitations, wherein the details include a unique identifier for each of a vulnerability fixer, a vulnerability identifier and a vulnerability exploiter and a time value for each of time to fix, time to identify and time to exploit; applying a set of scoring rules by a scoring engine of the at least one server to the details to determine one or more base scores at the end of one or more of predetermined scoring cycles or upon request from a second server for each participant in the defense training exercise, wherein the participant could be an individual user or a group of users; and determining an actual score for each participant using the one or more base scores at the end of the defense training exercise.

In another embodiment of the present invention, a system for establishing an exercise environment from multiple component server systems communicating through a service-oriented architecture to manage and score one or more network defense exercises running on distributed client systems includes: an aggregating server which is configured to send commands to one or more secondary servers to control the configuration and execution of at least one defense exercise running on at least one client system; one or more secondary servers which collect information from one or more client systems and send summaries of the collected information to the aggregating server; wherein, responsive to receiving a registration message for one or more client systems to one or more network defense exercises, the aggregating server sends: a server identity message to the one or more secondary servers; a network defense exercise creation message to the one or more secondary servers; a network defense exercise parameters message to the one or more secondary servers; a network defense exercise vulnerability profiles message to the one or more secondary servers; a network defense exercise compliance profiles messages to the one or more secondary servers; a network defense exercise control message to the one or more secondary servers to start and stop a network defense exercise running on one or more client systems; and further wherein the one or more secondary servers provide individual user and team scores from the one or more network defense exercises to the aggregating server.

In another embodiment of the present invention, a process for scoring a client network system defense training exercise implemented over multiple independent client networks includes: receiving by a controlling server from each of the multiple independent client networks, state data related to an internal state of a reporting client network and an external state of one or more of the other of the multiple independent client networks as determined by at least one participant associated with the reporting client network; applying a set of scoring rules by a scoring engine of the at least one server to the state data to determine one or more base scores at the end of one or more of predetermined scoring cycles or upon request from a second server for each participant in the defense training exercise, wherein the participant could be an individual user or a group of users; and determining an actual score for each participant using the one or more base scores at the end of the defense training exercise.

BRIEF DESCRIPTION OF THE FIGURES

Each figure is exemplary of the characteristics and relationships described thereon in accordance with embodiments of the present invention.

FIG. 13 illustrates a "white cell's" trouble ticket review window with scoring input pull-down menu.

FIG. 16 illustrates an updated "white cell's" trouble ticket review window with scoring input pull-down menu.

FIG. 20 illustrates a client generated metadata message in accordance with the communication protocol of the present invention.

FIGS. 21a and 21b illustrate an acknowledge (ACK) state in accordance with the communication protocol of the present invention.

FIG. 21c illustrates a client generated acknowledge (ACK) message in accordance with the communication protocol of the present invention.

FIG. 23b illustrates a client generated REGISTER message in accordance with the communication protocol of the present invention.

FIG. 24 illustrates a client generated SID message in accordance with the communication protocol of the present invention.

FIG. 28b illustrates a client generated SERVICE message in accordance with the communication protocol of the present invention.

FIG. 30 illustrates a client generated VULNFIXED message in accordance with the communication protocol of the present invention.

FIG. 32 illustrates a server generated VERSION message in accordance with the communication protocol of the present invention.

FIG. 33 illustrates a server generated ACK message in accordance with the communication protocol of the present invention.

FIG. 35 illustrates a server generated PROFILE message in accordance with the communication protocol of the present invention.

FIG. 36 illustrates a server generated PASS CHECK message in accordance with the communication protocol of the present invention.

FIG. 37 illustrates a server generated THROTTLE message in accordance with the communication protocol of the present invention.

FIG. 38 illustrates a server generated GETPORTS message in accordance with the communication protocol of the present invention.

FIG. 39 illustrates a server generated GETVULNS message in accordance with the communication protocol of the present invention.

FIG. 44 illustrates features of a scoring system in accordance with at least one embodiment described herein.

FIGS. 45a and 45b are exemplary base scoring outputs in accordance with at least one embodiment described herein.

DETAILED DESCRIPTION OF THE INVENTION

Figure 1:
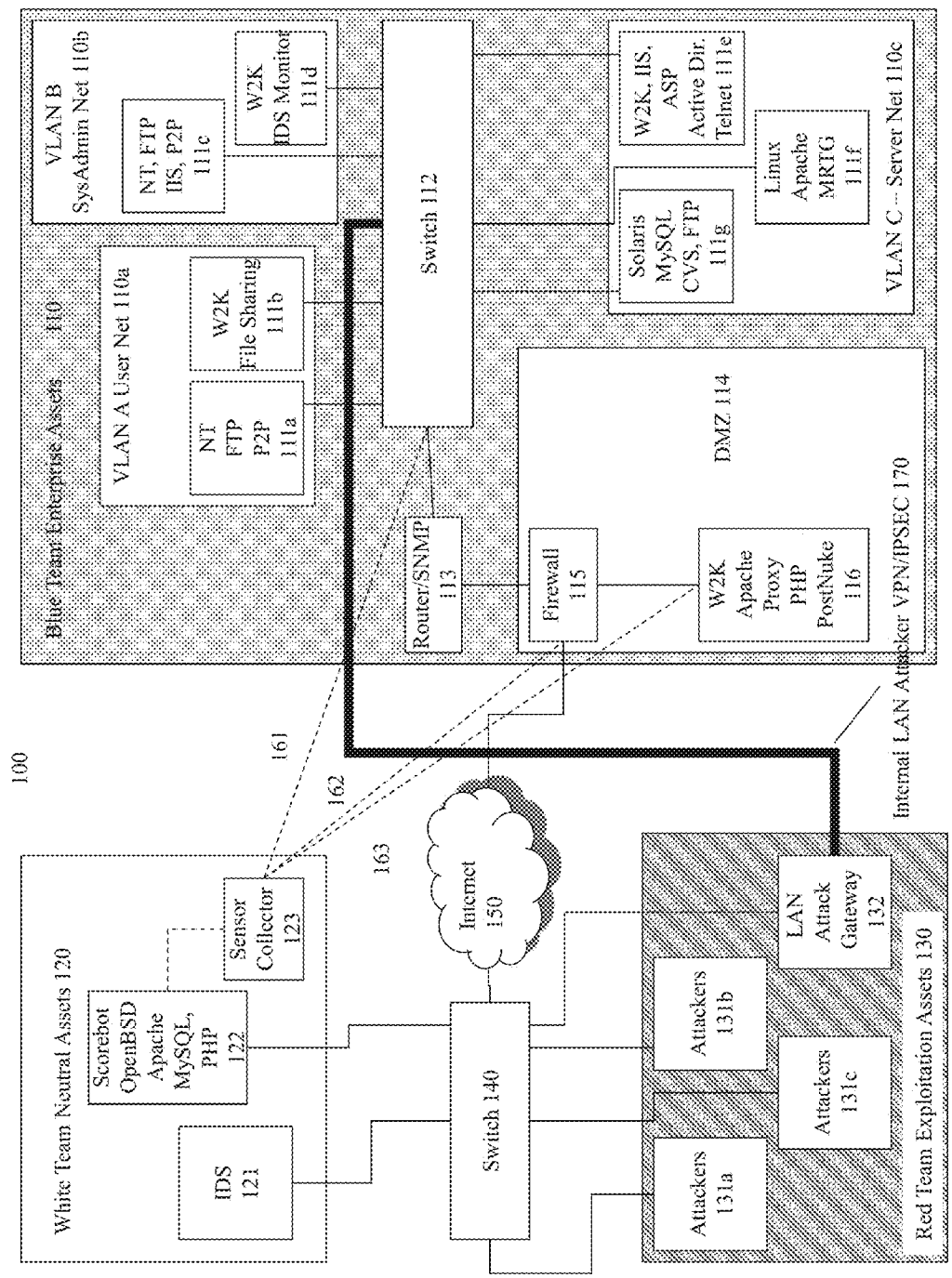
FIG. 1 is a block diagram illustrating relationships between elements of a system of the invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. While best mode is described, not all embodiments contain all features described herein. The individual features described herein relate to an exemplary composite of various embodiments of the invention.

There are many possible means for defending against threats to IT systems; whether such threats are launched by an insider or by a hacker in cyberspace. Existing approaches to training IT staff in defending against such threats do not often offer realistic exercise environments in which to train against live, re-configurable targets and networks. Typically no formalized and repeatable mechanism is provided to conduct routine exercises and quantitatively assess staff and network performance over time.

An effective means for protecting computer networks is to ensure that an enterprise's IT staff is armed with the technical skills and practical experience to recognize the indicators of, and defend against such threats. It would be beneficial that such training occur in an environment at least similar to the everyday operational environment encountered by the IT staff, and against threats likely to be encountered in the operational environment. In addition, it would be beneficial for the IT staff to learn to work as a team, administering and coordinating the many functions of computer network defense.

There are at least two obstacles to training a team on live data in an environment similar to their operating environment. First, the cost to send an entire IT staff off-site—either the direct cost, or the cost of not having sufficient IT staff on duty during training Second, running live exploit training on an operational network not only is risky due to potential service outages causes by training scenarios, but the enterprise also may experience reductions in network performance and responsiveness to customers.

Embodiments of the present invention train IT staff to, e.g.: identify vulnerabilities and lock down systems (e.g., networks, servers, and workstations); configure router policies; configure and monitor host-based and network-based IDS; recognize hacker/computer misuse activity; and properly respond to hacker/computer misuse. Each of these activities should be conducted in accordance with the enterprise's security policy.

Some embodiments of the invention are self-contained, e.g., they do not connect with customer's network. This approach mitigates disruption of customer operations while providing realistic training Systems of the invention can be configured to provide network architecture representative of the customer's IT infrastructure; for example, by using standard UNIX and Windows operating systems, network and security devices and software.

Real-world, live exploitation scenarios implemented by embodiments of the invention include exploit types such as: Simple Network Management Protocol (SNMP) shutdown via samba, Hypertext Transfer Protocol (HTTP) exploits and defacement; router reconfiguration; Secure Shell (SSH) exploits and shutdown; File Transfer Protocol (FTP) open traffic; Microsoft Windows® worm; and Hypertext Preprocessor (PHP) exploits. Some scenarios implement recognized vulnerabilities such as the 2003-2007 SysAdmin, Audit, Network, Security (SANS) Institute/Federal Bureau of Investigation (FBI) Top 20 List; common misconfigurations such as default accounts and passwords, and common vulnerabilities such as buffer overflows, race conditions, worms, and viruses. Some embodiments employ cyber attacks such as enumeration, discovery, and port scanning using Request For Change (RFC)-compliant Internet Control Message Protocol (ICMP) packets and Transmission Control Protocol (TCP) and User Datagram Protocol (UDP) connections. In preferred embodiments, the exploits are rendered relatively harmless. While services may be disabled by an exploit, the exploits are modified so that no unrecoverable or uncontrolled damage occurs. Further, exploits are updated to reflect current day vulnerabilities and documented attacks.

Beyond comprising one or more threat scenarios, each system exercise can include exercise controls such as rules of engagement (e.g., a list of what testing may/may not include, stop test procedures), exercise objectives, measures of performance, target configurations, and a communications plan. The exercises are configured to be repeatable, e.g., targets can be reset to an original state and exercise repeated—allowing meaningful comparison between results from one session to the next. Each exercise can train a plurality of trainees.

Embodiments of the invention allocate system assets to teams. FIG. 1 is a block diagram of a system of the present invention illustrating a set of relationships between assets. Other architectures and configurations are possible within options known to those skilled in the art.

A Blue Team comprises IT staff trainees and is allocated enterprise assets 110 to train on and to protect. For example, the Blue Team can be responsible for target systems and network defense; to review initial system configurations to verify that machines are properly configured and patched against vulnerabilities; to monitor and manage network and host-based systems using intrusion detection systems (IDS) and forensic inspection as necessary; to monitor and manage network and host-based systems to thwart active threats; and to report computer misuse to operational staff.

For the Blue Team, network priorities are availability and security. Network services should be maintained operational, in accordance with the security policy; some services will be assigned higher priority according to the exercise scenario. In many embodiments, the Blue Team is not allowed to "hack back" to points outside of the firewall. Similarly, Blue Team members are not allowed to modify administrative users, e.g. White Team users. Internet Control Message Protocol (ICMP) pinging must be allowed within the internal network and to external devices, other than the firewall. Blue Team use of automated patching tools (i.e. Up2date, Windows "Automatic Updates" service, etc.) is not allowed in most embodiments except for identified client machines. Patches are provided by the trainers based on reasonable Trouble Ticket requests. In most embodiments, Blue Team members must follow the guidelines set forth in the appropriate organization network security policy for securing the enterprise assets 110.

A Red Team comprises trainers with exploitation assets 130 configured to exploit enterprise assets 110. The Red Team is responsible, for example, to simulate the hacker threat by attacking enterprise assets 110 (using methods such as deployment of malware that has been rendered substantially harmless), and to follow the sequence of events as prescribed by an Exercise Director, e.g., a White Team member.

A White Team comprises trainers with neutral assets 120 to control and score an exercise. In addition, White Team members are responsible for initial target system configuration and providing training and feedback during the exercise as appropriate, and at a debrief. The White Team monitors and responds to Trainee "Trouble Tickets", providing guidance and scoring the quality of the trouble ticket submitted by the trainee. The White Team is further responsible to ensure flow of exercise mirrors real-world operations as closely as possible.

Conventional network communications between Red, White, and Blue assets are through networking devices Switch 140 (and thru the Internet/Switch 150 for remote training) When configured for remote training, some embodiments of the present invention allow access from terminals on an operational network (e.g., the client's network), but access to the assets of the operational network is prohibited, e.g. creating a virtual private network for assets of embodiments of the invention. Secondary communications for the White Team to gather scoring data are through ports and probes 161, 162, 163. For example, port and probe 161 are mirrored ports and a probe on the internal network side of the Router 113. Probe 162 is connected to the external side of the firewall 115 while probe 163 examines network assets in the "demilitarized zone" (DMZ). In some embodiments, the Red Team is given a dedicated attack path 170 to the enterprise assets that typically would not exist in the customer's actual network. In other embodiments, the Red Team has physical access to the Blue Team assets, e.g., switch 112.

In many embodiments, enterprise assets 110 include network devices such as routers, switches, etc., security devices (firewalls, IDS, etc.), servers (Windows NT/2000, Linux and Solaris); workstations (Windows NT/2000), and a system administrator web server 111c with software and explanations to properly configure enterprise assets 110. In many embodiments, one system 111d on the SysAdmin Net is dedicated and manned to monitor the IDS and System Status Board—described below.

In addition to a DMZ 114, router 113, and switch 112, in FIG. 1 enterprise assets 110 comprise a series of logically grouped hosts (referred to herein as "VLAN") VLAN A 110a, VLAN B 110b, and VLAN C 110c. Grouping in this fashion provides administrative separation between network cells as though they were physically separate switches. A DMZ is a portion of a network area that sits between an enterprise's internal network and an external network. It allows hosts within the DMZ to provide services to the external network, while protecting the internal network. In FIG. 1, a DMZ host 116 is running Microsoft Windows® 2000 (W2K) operating system, Apache web server, a proxy server, and server applications in open source PHP and PostNuke environments. In other configurations, enterprise assets can include other types of network devices and data terminal equipment know in the art, e.g., bridges, gateways, hubs, modems, multiplexers, etc.

The enterprise network can be configured to reflect the makeup of a customer's enterprise network. As new operating systems emerge, they will be included as new virtual targets.

Each VLAN comprises hosts 111a-111g running a variety of operating systems such as Microsoft Windows® 2000, Windows NT, Solaris, and Linux; along with a variety of applications such as file transfer under the File Transfer Protocol (FTP), file sharing, database management (e.g., MySQL), web servers and extensions (Apache, IIS, ASP), a software development configuration management system (CVS), portions of an intrusion detection system (IDS), a Multi-Router Traffic Grapher (MRTG) network utility, terminal emulation software (Telnet), and directory services (Active Dir.).

Figure 2:
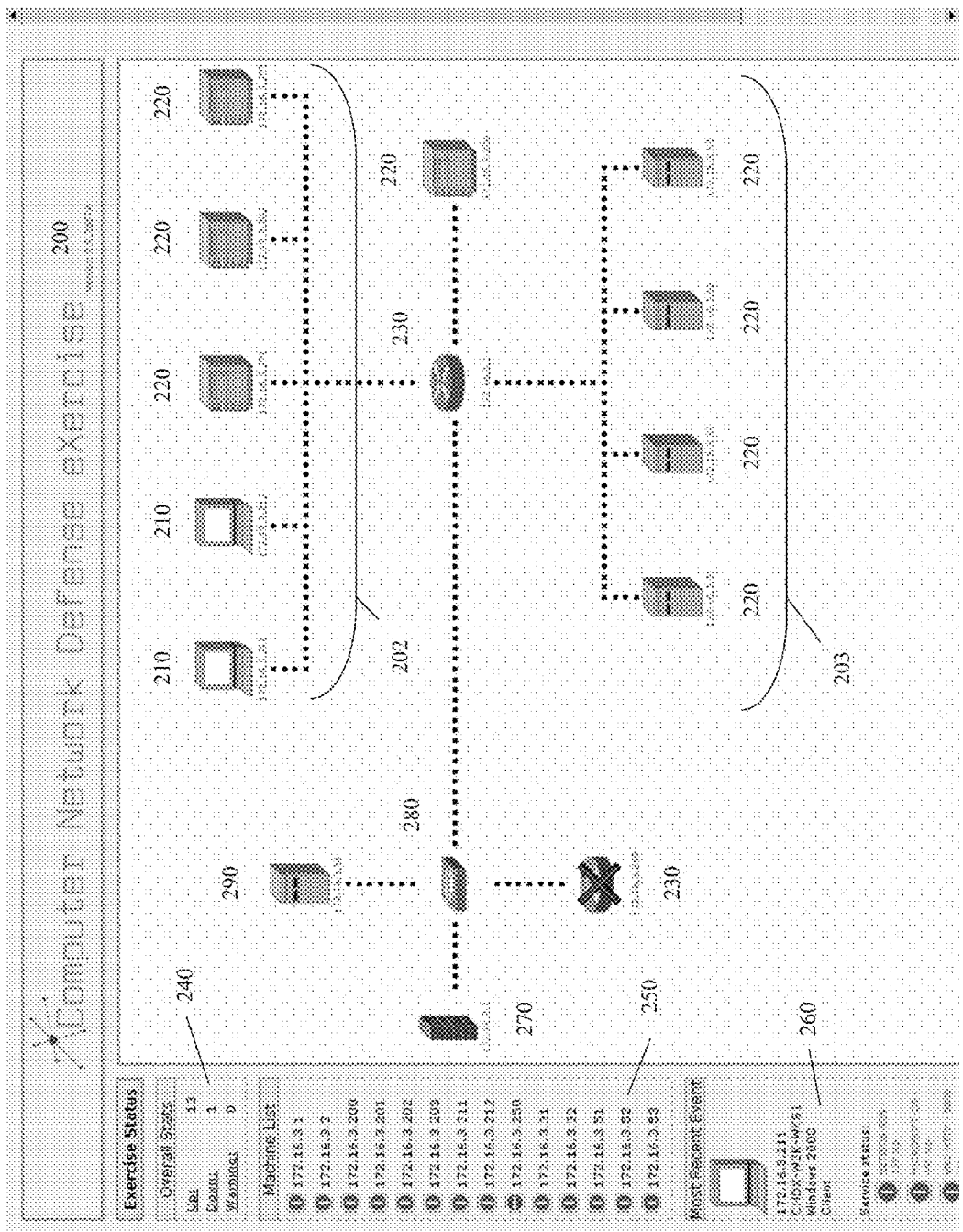
FIG. 2 illustrates a nominal "Network Management Console" interface depiction of the status of exercise resources.

Referring to FIG. 2, an interactive exercise status window for enterprise assets is shown. A firewall 270 is shown controlling access to external networks. A hub 280 connects the firewall 270 to a router 230 (shown as "down" by the "X" across the router icon), a server 290 configured as a DMZ host, and a router 232. The router 232 serves two VLANs 202, 203, and a standalone server 220. VLAN 202 comprises workstations 210 and Servers 220. VLAN 203 comprises a series of servers 220.

In addition to displaying up/down/warning status graphically, e.g., "down" corresponding to an "X" displayed over the network device icon, "warning" corresponding to an exclamation point "!" being displayed over the icon, summaries of overall status 240, machine status 250, and most recent (including service status for monitored services) 260 is shown in the left portion of the screen. For the display of FIG. 2, status for fourteen network devices (the hub is unaddressed) is shown as "Overall Stats" 240. The Machine List 250 confirms this status by showing router 172.16.250 as down by displaying a horizontal bar next to its address; up devices display a vertical bar adjacent to the address.

Figure 3:
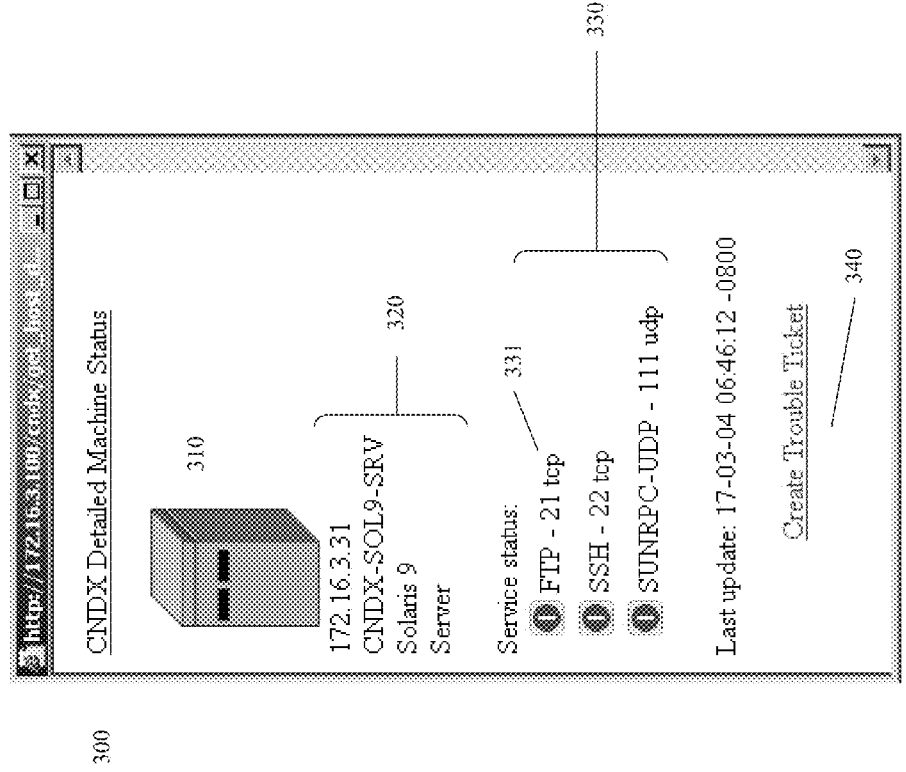
FIG. 3 illustrates a detailed machine status snapshot window.
Figure 4:
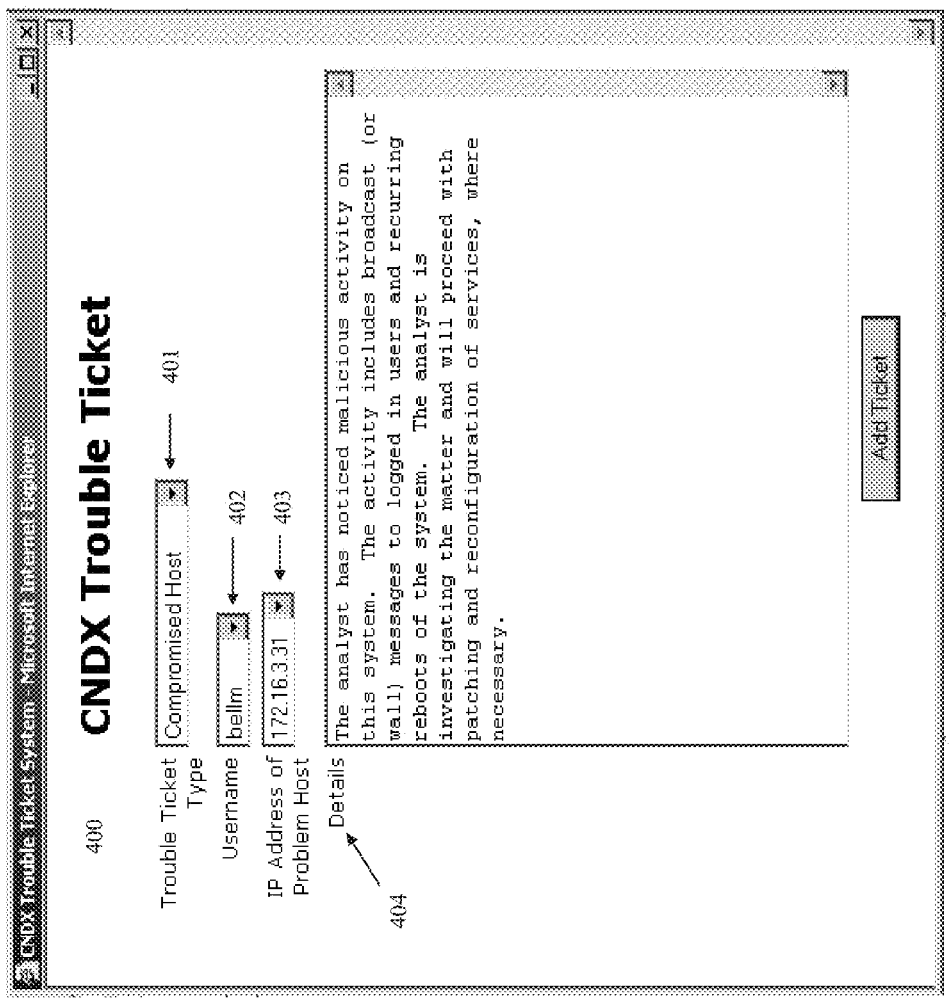
FIG. 4 illustrates a "student's" trouble ticket creation window.

By clicking on a specific node on the screen, or on the list of nodes on the left hand side of the screen, the trainee can get more in depth information about the node (see FIG. 3). If changes are made to the host or a problem is noticed, the trainee can select "Create Trouble Ticket" to report the problem (FIG. 4).

Figure 12:
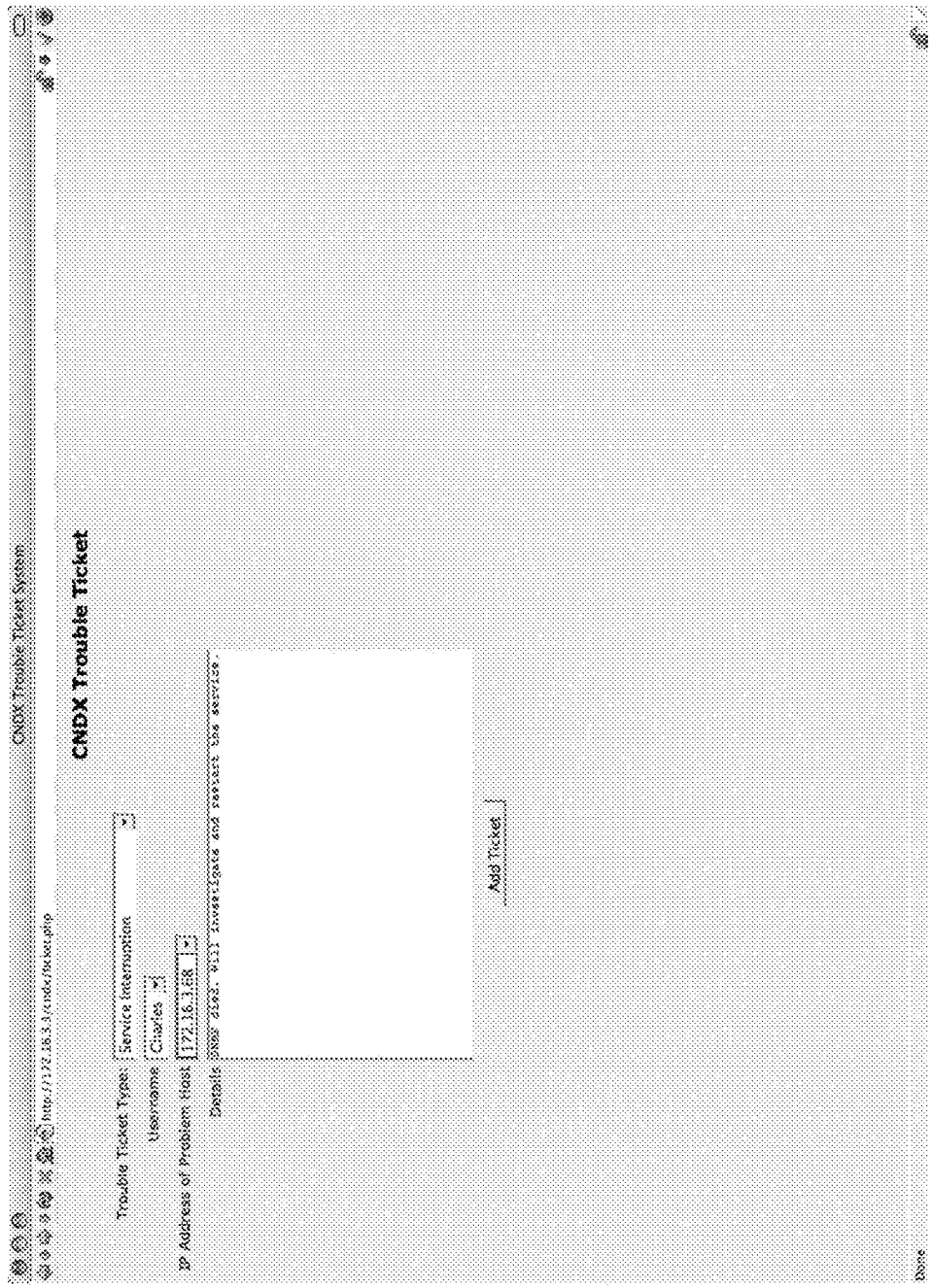
FIG. 12 illustrates a "student's" trouble ticket creation window.

Referring to FIG. 3, a detailed machine status window 300 of the current invention is illustrated. The window 300 describes the status of a node identified by its icon 310, its label 320 (including IP address, machine name, operating system, and role). In addition, the status of services monitored by embodiments of the invention 330 is also shown, e.g., in FIG. 3 file transfer (FTP) service 331 is shown as available. A link 340 near the bottom of the window 300 leads to the trouble ticket window 400 illustrated in FIG. 4 listing fields for Trouble Ticket Type 401, Username 402, IP Address of Problem Host 403 and Details 404. A second exemplary trouble ticket screen is illustrated in FIG. 12.

Referring again to FIG. 1, exploitation assets 130 available to the Red Team include at least one host 131a-131c configured to launch exploits against the enterprise assets and a host configured as a local area network (LAN) attack gateway 132. Both attackers 131 and the LAN attack gateway 132 have conventional access to the enterprise assets via switch 140, Internet 150, and the enterprise firewall 115. The LAN attack gateway also has access to all hosts visible on the enterprise network 110 via the enterprise network switch 112, thereby bypassing the firewall.

Neutral assets 120 include one or more hosts 121, 122, 123 running on the open source OpenBSD operating system. OpenBSD is a multi-platform BSD-based UNIX-like operating system with special features for security. Applications for controlling and scoring the exercises are run on this host, including an application that uses the Apache Web Server and Php Server to display the current statistics for the Blue Team, storing the data in the MySQL database with web interfaces for the teams to for scoring, status, and trouble tickets. In some embodiments, the IDS is deployed as a Blue Team asset and is an available target that can be attacked by the Red Team. The Sensor Collector can be implemented as a process within the scoring process.

Neutral assets include computer program products for controlling and scoring system exercises. In some embodiments, a Controller Perl Script reads a list of Target IP addresses provided by the Exercise Coordinator at start up, and pulls relevant Target information from the backend target database running on MySQL. Target information includes critical services and vulnerabilities for each host as well as relative point value.

The Controller creates Perl scripts on-the-fly to test Target Platforms. In addition, the Controller executes Perl scripts that scan for scoring information. If a target host is alive, the target host is checked to see if specified services, e.g., critical services are available. In addition, the Controller tests targets for vulnerabilities. Scores are collected in the neutral asset MySQL database for target dead/alive, service up/down, and vulnerabilities found. A scoring Perl script reads scan results from the MySQL database and calculates scores (group—e.g., Windows, UNIX, etc.; and individual). The script displays scores in graphical format via a system http: site to show how well the network defense team (Blue team) performs over time.

Figure 8:
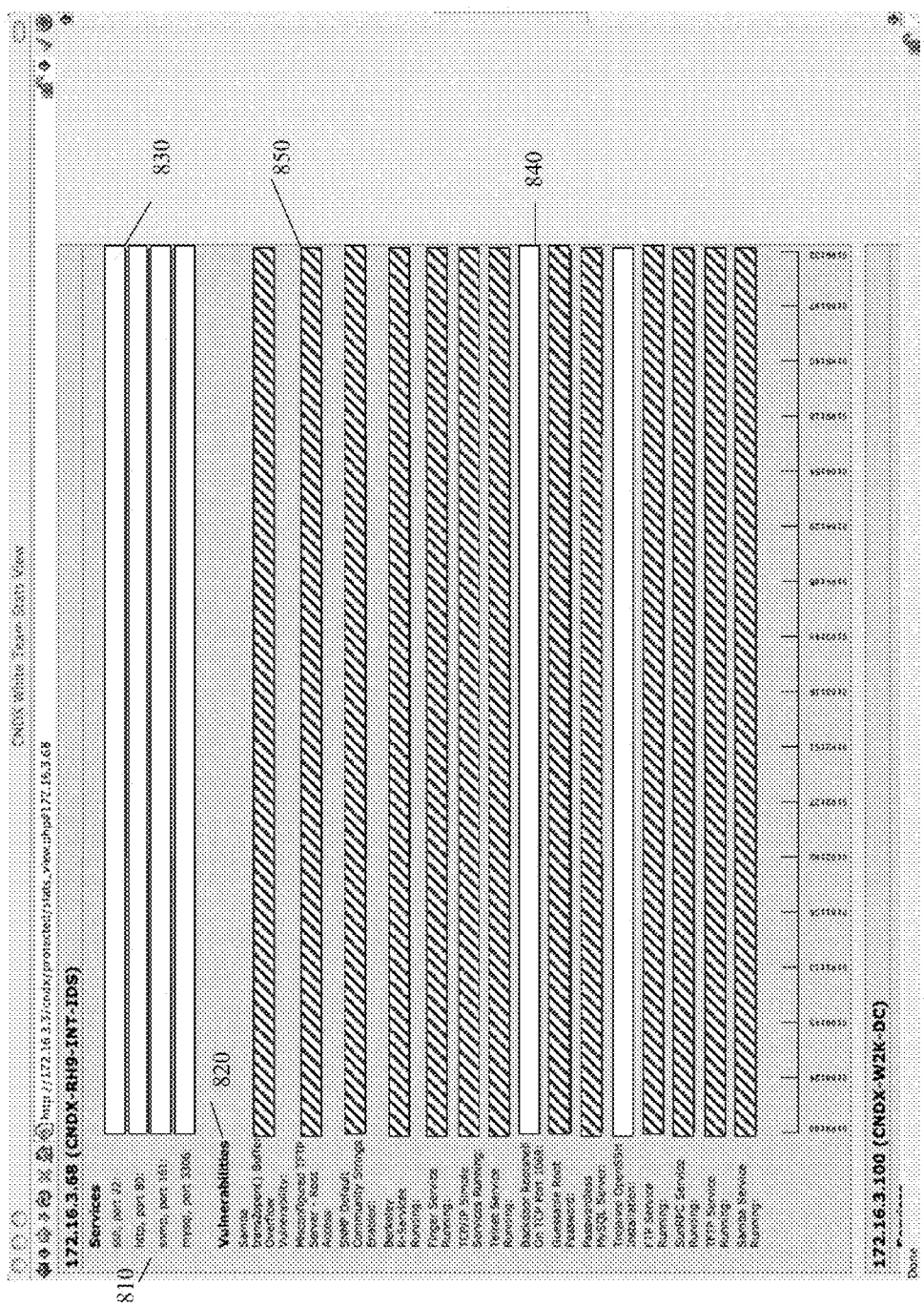
FIG. 8 illustrates a services and vulnerabilities timeline.

Embodiments of the invention keep track of the Blue Team's progress by monitoring the target systems and services to determine if any services or systems are not operational and whether any vulnerabilities exist. This information is displayed in a time-based graphical form as shown in FIG. 8. With reference to FIG. 8, services 810 and vulnerabilities 820 appear on screen to the user as either black (the resource/platform for the service is not available; or vulnerability status is indeterminable), red (the resource/platform for the service is available, but the service is down; or vulnerability is valid), or green (the service is available; or the vulnerability is mitigated). The colors indicating red and green are shown as cross-hatch (red) and white (green) respectively in the figures of the present application. This display may also be monitored by the Red Team as one basis to determine which attacks to perform. Alternatively, for repeatable exercises, the Red Team disregards vulnerability status and launches exploits at prescribed times. It should be noted that embodiments of the invention can report total system performance as well as by either system types (i.e. UNIX, Windows, Security and Network Devices), and by each individual system.

Trainees are evaluated in two ways in some embodiments: quantitatively and qualitatively. These methods will apply both objective (automated scoring) and subjective (evaluator scoring) scoring criteria to help the trainees to evaluate their strengths and weaknesses in defending enterprise assets. Quantitative factors include: time from initiation/start of exploit to time detected; time from exploit detection to time corrected; effective triage according to priority of service; percentage of exploits detected; percentage of exploits corrected; mean/median time for exploit detection; mean/median time for exploit correction; and mean/median number of services down. Qualitative factors include: ability to effectively report incidents; apparent understanding of impact of downed services; apparent knowledge of student to detect and fix vulnerabilities; apparent knowledge of student to use detection/monitoring systems. Qualitative values are converted to quantitative values (minus 10 to plus 10 scale) via the White Team Trouble Ticketing interface.

Figure 5:
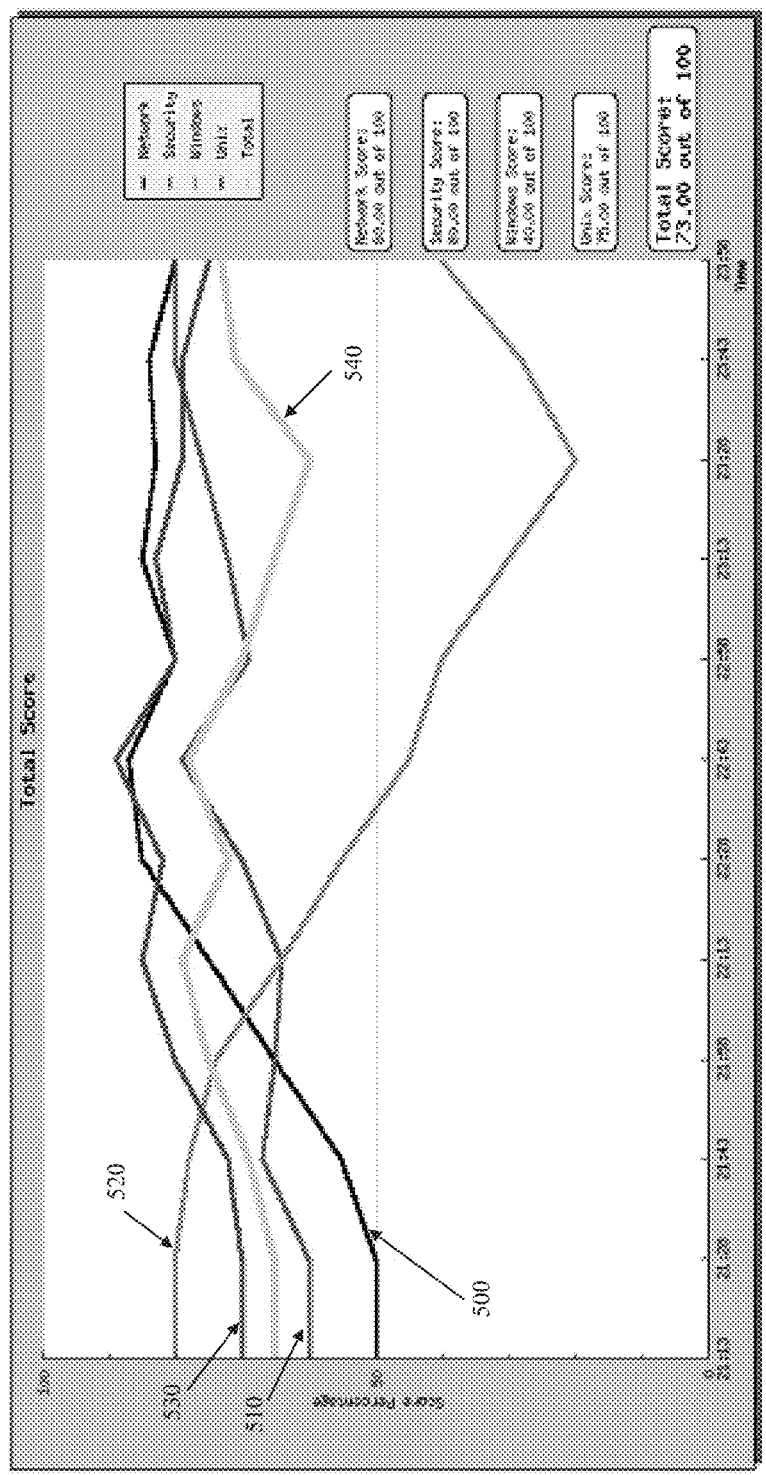
FIG. 5 illustrates a scoring timeline.

FIG. 5 depicts an exemplary score over time based on the above mentioned factors, showing components for Network status 500, network security 510, operating system status (both Windows 520 and UNIX 530), along with a total score 540.

In all embodiments, the scoring software 122 provides real-time feedback of student's progress by measuring: system configuration data, system vulnerability data, student response to incidents; and vulnerability exploit results. In all embodiments, the measurements are taken every 45-60 seconds with results stored in a back-end database; other measurement periodicity appropriate to the training environment and operational environment can be used.

Scoring data is used during exercise by White Team to identify weaknesses in performance and then adapt, in situ, training in response. Scoring measures the ability of network defenders to: maintain critical systems and services (availability); detect and mitigate vulnerabilities, react to threats (i.e., hackers, abusers, etc.), and communicate with White Cell members for support and to report status of Blue Team resources and actions.

Some measures of performance that can be used include: time to detect system vulnerabilities; time to detect exploit from exploit initiation; time to correct exploit from exploit detection; time to complete incident handling; percentage of exploits detected and correctly diagnosed; percentage of exploits corrected; and percentage of services impacted. Performance Criteria include the ability to: lock down hosts; properly configure network devices; maintain network devices; detect computer misuse; correct misuse in timely manner; and work as a team. Qualitative aspects are translated to quantitative points, and thereby also contribute to the assessment of Blue Team performance.

Scoring and evaluation is implemented in real time as a computer program product across a plurality of platforms. It provides for automated analysis of man and machine, tracks multiple values over time, permits trend analysis, and allows evaluation against best practices. In some embodiments, exploits are launched from Red Team platforms. In other embodiments, exploits may be launched by Blue Team platforms if the games include offensive operations.

In a physical implementation of architecture such as the one described above, hosts may be implemented on blade or 1 U multi-processor servers mounted in roll-away 21 U chassis. These servers are housing for individual minimally-packaged hosts, switches, routers, and other network devices ("blades") that typically provide their own processors, memory, storage, and network connections, but share common cooling and a power supply built into the chassis.

The enterprise asset firewall 115 is a Cisco PIX 515 firewall, and the enterprise switch is a Cisco 24-port switch. Blades, switches, routers, and other network assets for all teams, along with integrated power filtration, are installed in man-portable chassis, e.g., roll-away 21 U sized chassis, for deployment at a customer's site. As new technology emerges, updates to these systems performing standard network and security functions will be implemented.

In some methods of use of the invention, three phases of training are used. Prior to Phase I, the system topology is configured in a manner as described above by example; exercise controls and teams are established. In Phase I, instructors cover proactive measures for protecting a network, e.g., "best practices" for identification and mitigation of system vulnerabilities, installation and verification of security patches, identification and eradication of "back doors"; configuration of security devices such as firewalls, routers, and switches; and installation and configuration of intrusion detection systems.

In Phase II, various aspects of live exploits are described, such as the effect of the exploit, protection from the exploit, detection of the exploit, assessment of damage from its presence, mitigation of further damage, and collection of evidence. The trainees are then allowed to assess the present Blue Team network, clean it, and implement proactive measures. An example syllabus for Phase I and Phase II includes: exercise overview, general security fundamentals, windows security, UNIX security, SANS Top 20 vulnerabilities, toolset overview, IDS and firewall configuration fundamentals, and basic IT forensics.

In Phase III, Red Team members run exploits against the system, scoring proceeds (e.g., as described above), and feedback is given to participants. In addition to exploits described above, security testing may include attempted logins using guessed and discovered account names and passwords; network sniffing, traffic monitoring, and traffic analysis; use of exploit code for leveraging discovered vulnerabilities; password cracking via capture and scanning of authentication databases; spoofing or deceiving servers regarding network traffic; and alteration of running system configuration. Feedback can take the form of what trainees reported versus actual, and a preferred timeline of responses to the scenario.

Figure 6:
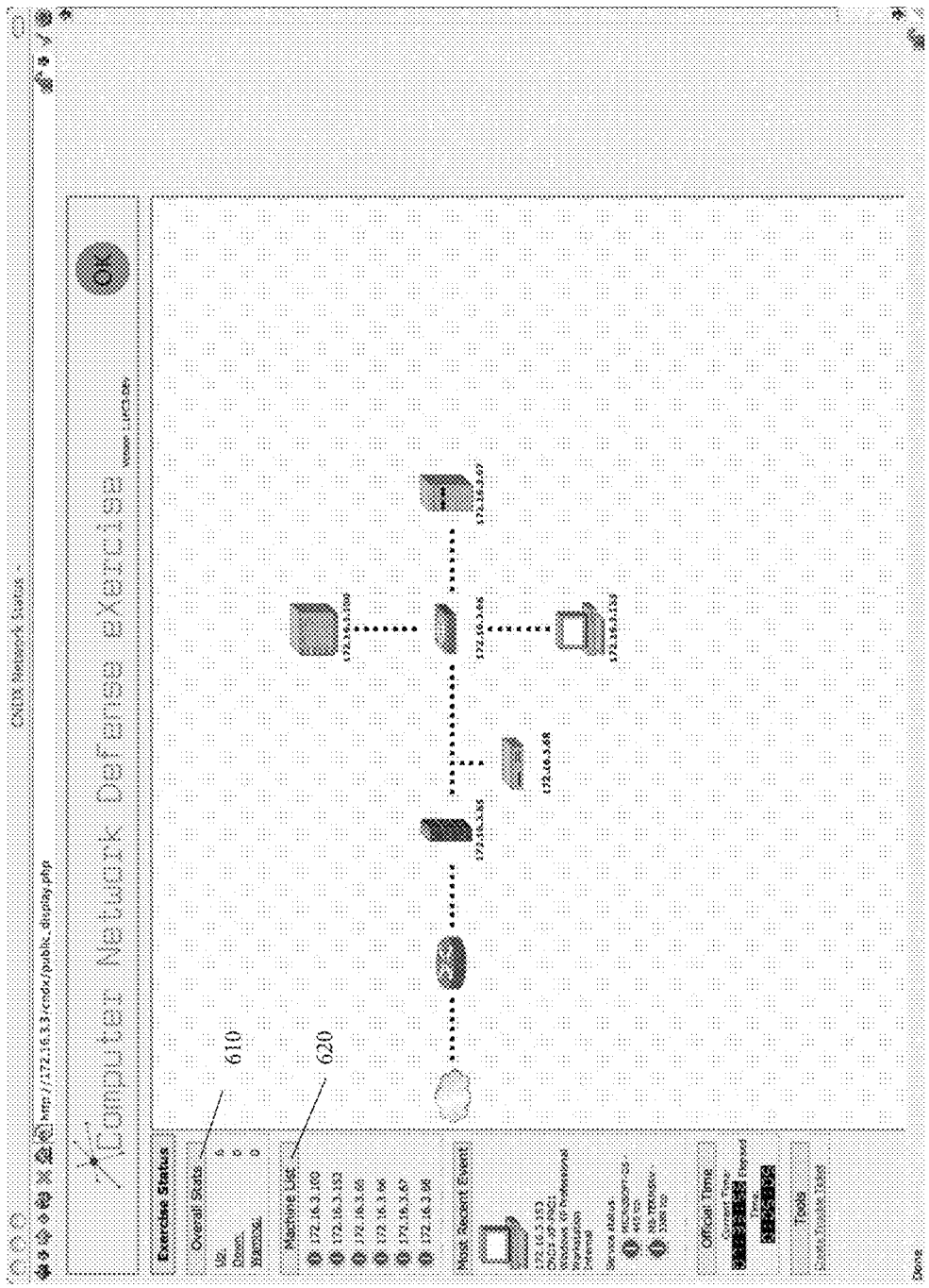
FIG. 6 illustrates a nominal "Network Management Console" interface depiction of the status of exercise resources.
Figure 7:
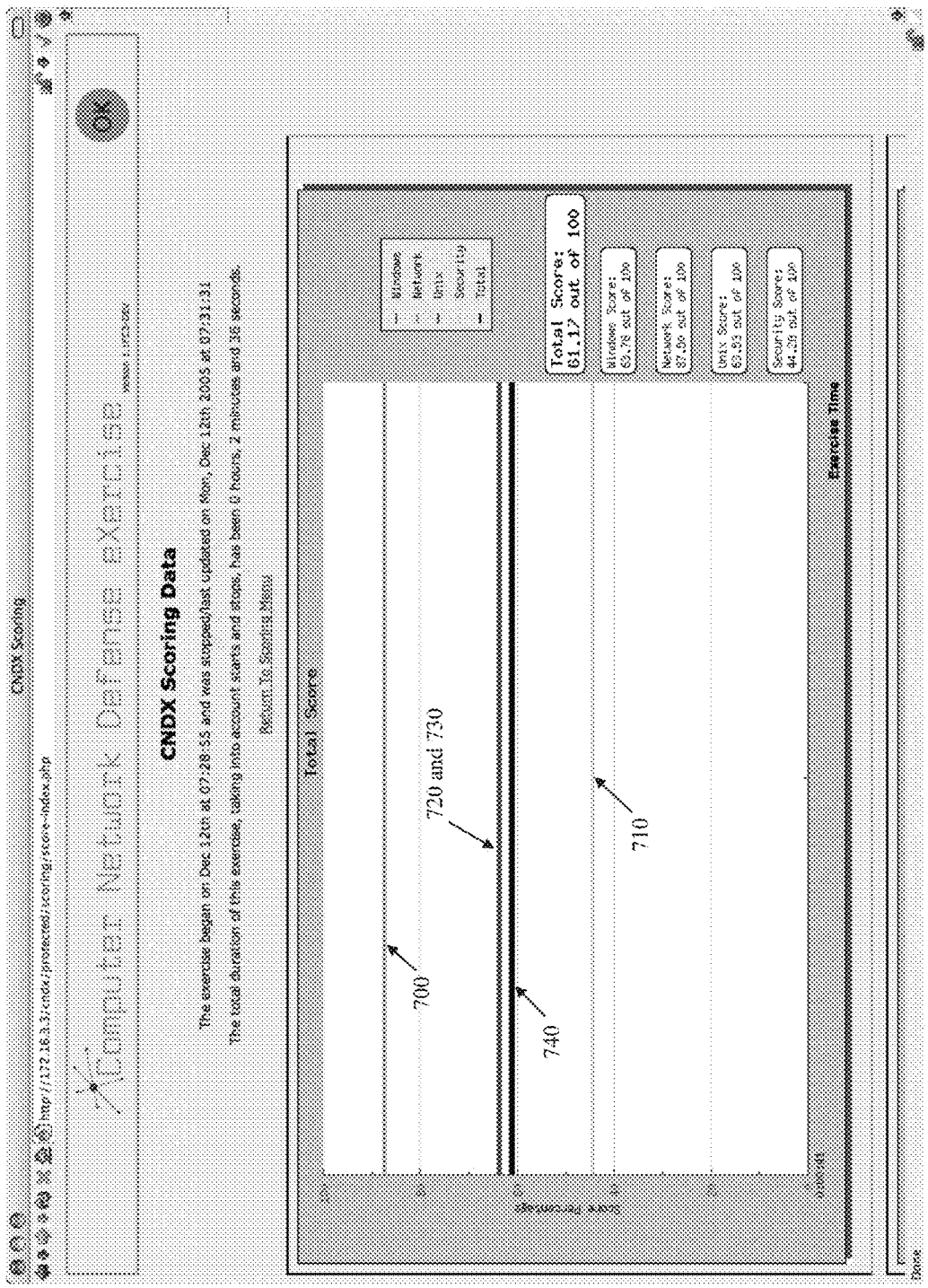
FIG. 7 illustrates a scoring timeline.

At the start of an exemplary simplified Phase III, Blue Team enterprise assets are quiescent, with no attacks being launched by the Red Team and no changes having been made from the initial configuration. Monitoring view for the Blue Team would look normal as shown in FIG. 6. Referring to FIG. 6, the overall stats 610 and the machine list 620 indicate that each IP address in the network is up. The scoring display (e.g., FIG. 7 as shown after the exercise was concluded) displays a constant value since no changes had been made: network status 700, network security 710, operating system status (both Windows 720 and UNIX 730 are overlapping as shown), along with a total score 740. FIG. 7 shows less than 100% at the beginning of the exercise because the systems are vulnerable to exploit at that point. A 100% score means that all vulnerabilities are fixed and all services are up/available. The per vulnerability view, by platform (in this case, 172.26.3.68 (CNDX-RH9-INT-IDS) (e.g., FIG. 8 also as shown after the exercise) shows no changes. In FIG. 8, available services and vulnerabilities that have been remediated are shown as white for purposes of the illustration, e.g., 830 and 840 respectively, though in an operational system of the present invention, the display color of green is preferred. Also in FIG. 8, existing and exploited vulnerabilities are shown as cross-hatch for purposes of the illustration, e.g. 850, though in an operational system of the present invention, the display color of red is preferred.

Figure 9:
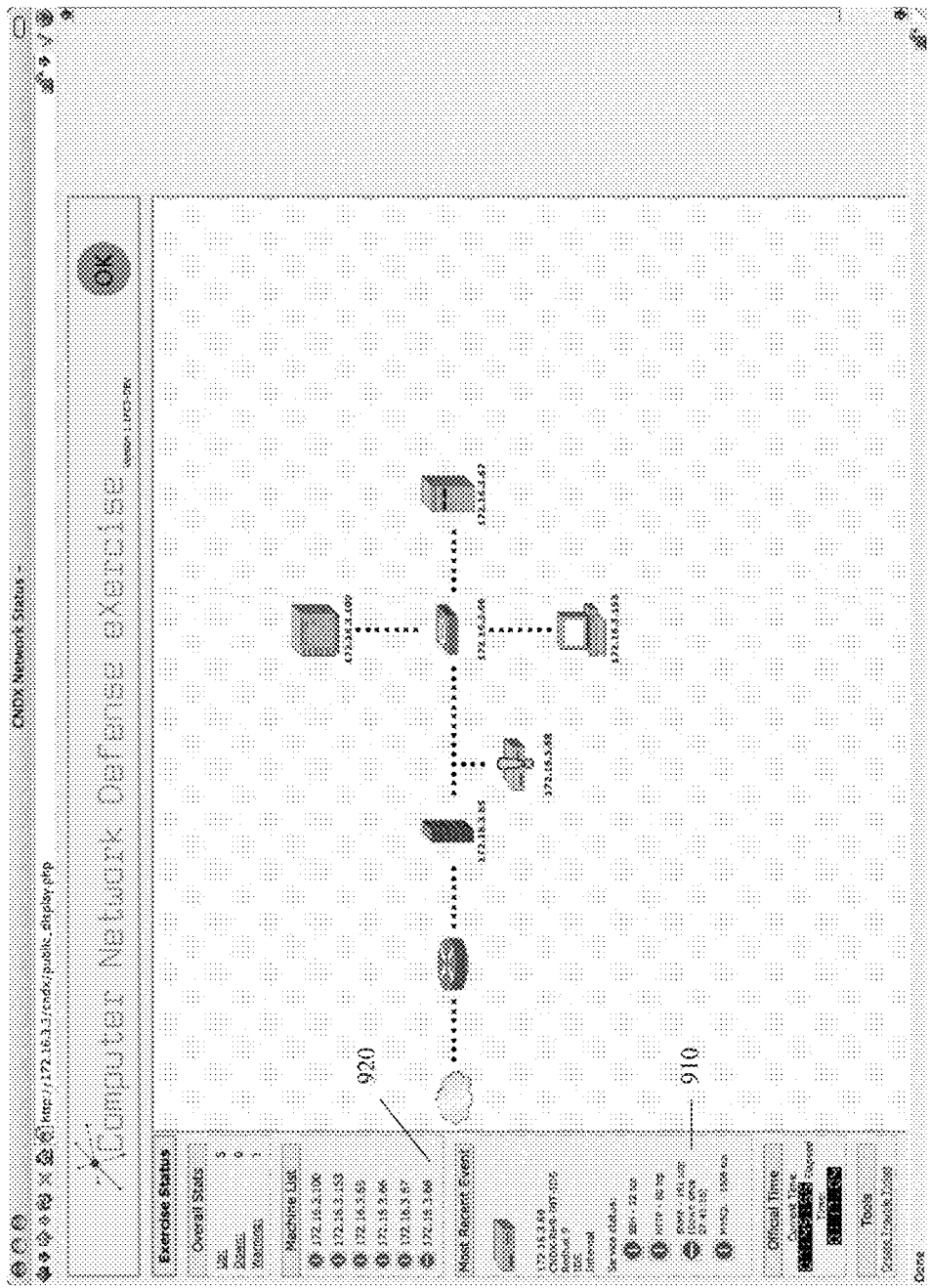
FIG. 9 illustrates a nominal "Network Management Console" interface depiction of the status of exercise resources.
Figure 10:
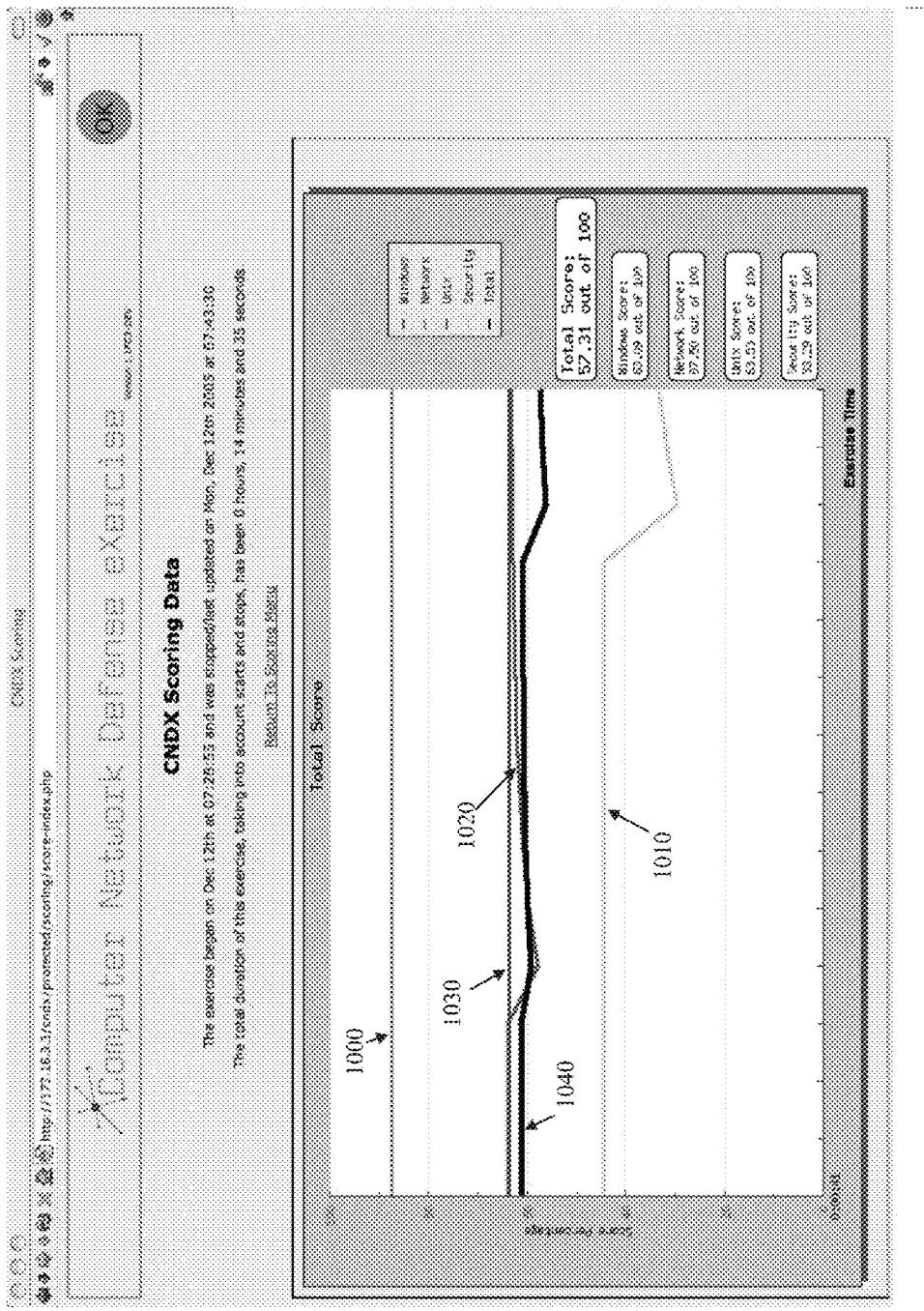
FIG. 10 illustrates a scoring timeline.
Figure 11:
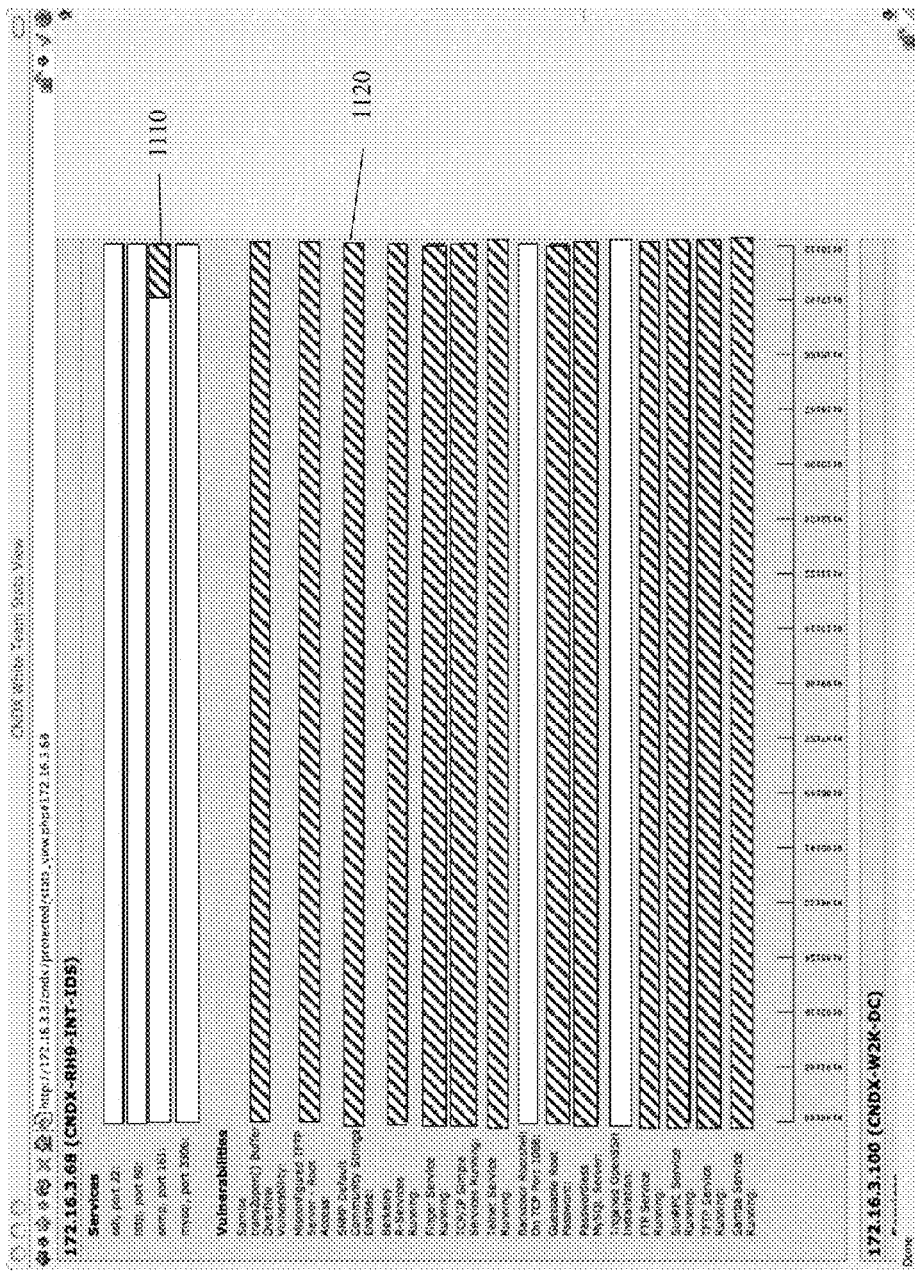
FIG. 11 illustrates a services and vulnerabilities timeline.

Upon the first launch of attacks by the Red Team, the attacker uses an attack script to gain control of a Blue Team host and disables one of the services. This action causes the monitor system, shown in FIG. 9, to display the loss of a critical service 910 and the status of the host 920, in addition to the flashing yellow explanation point symbol superimposed on the affected system. However since the attacker also successfully attacked the Blue Team host, the scoring system has deducted 10% of the current score as shown in the scoring display of FIG. 10: network status 1000, network security 1010, operating system status (both Windows 1020 and UNIX 1030), along with a total score 1040. The change in the service and vulnerability view, FIG. 11, showing a change to the "snmp, port 161" 1110 and to "SNMP Default Community Strings Enabled" for the time period 00:17:03 to 0:18:12 1120. The 10% change is reflected in the line graph going down by 10%. In preferred embodiments, the time axis of the scoring view and vulnerability view are both based on total exercise time elapsed.

Figure 13:
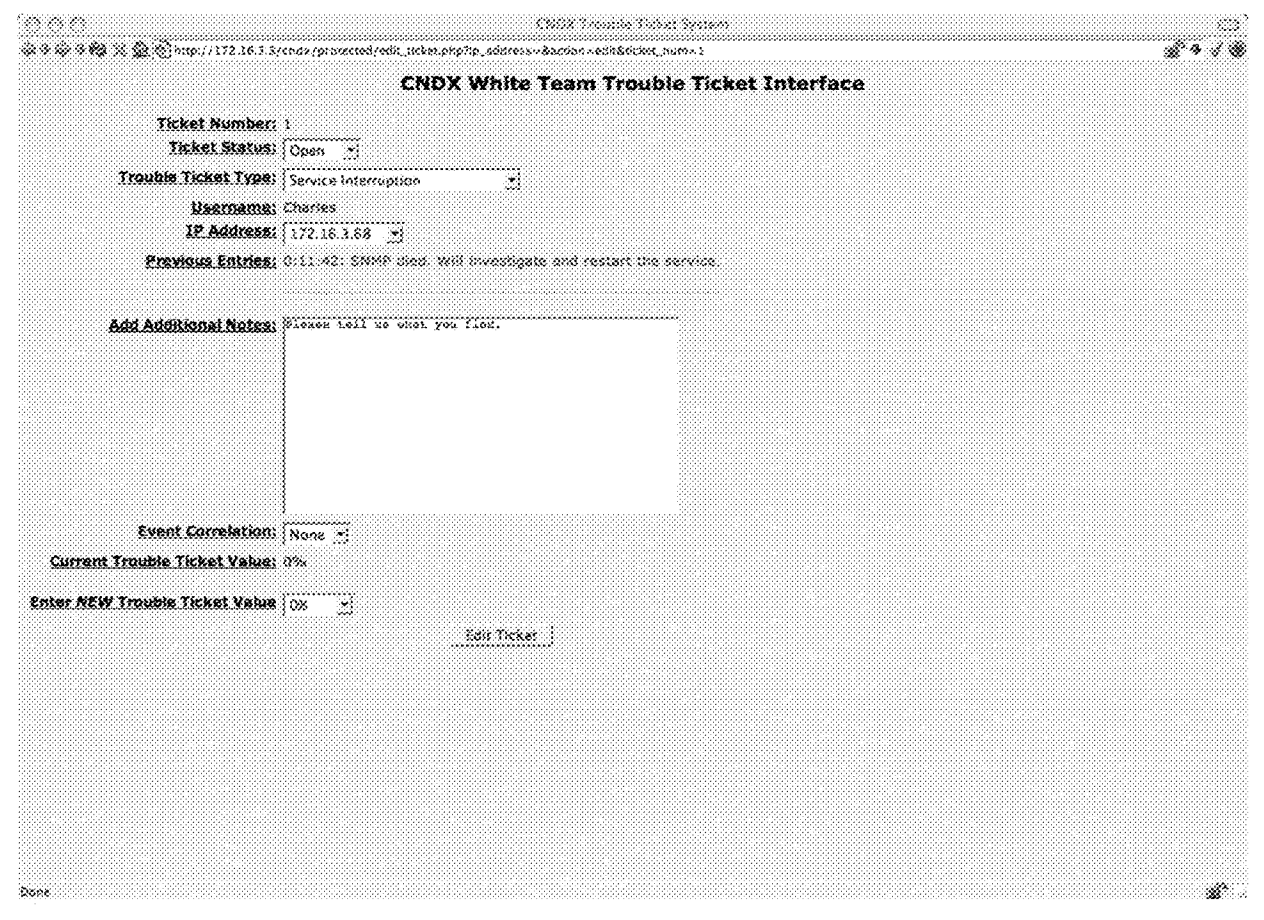

Once the monitoring system informs the Blue Team of the loss of a critical service (or in the event that the Blue Team becomes otherwise aware of a trouble condition), the Blue Team puts in the trouble ticket, e.g., as shown in FIG. 12, to inform the White Team of the issue. The White Team then responds, e.g., as shown in FIG. 13, to direct the Blue Team to continue their progress with no change in scoring for the non-informational trouble ticket.

Figure 14:
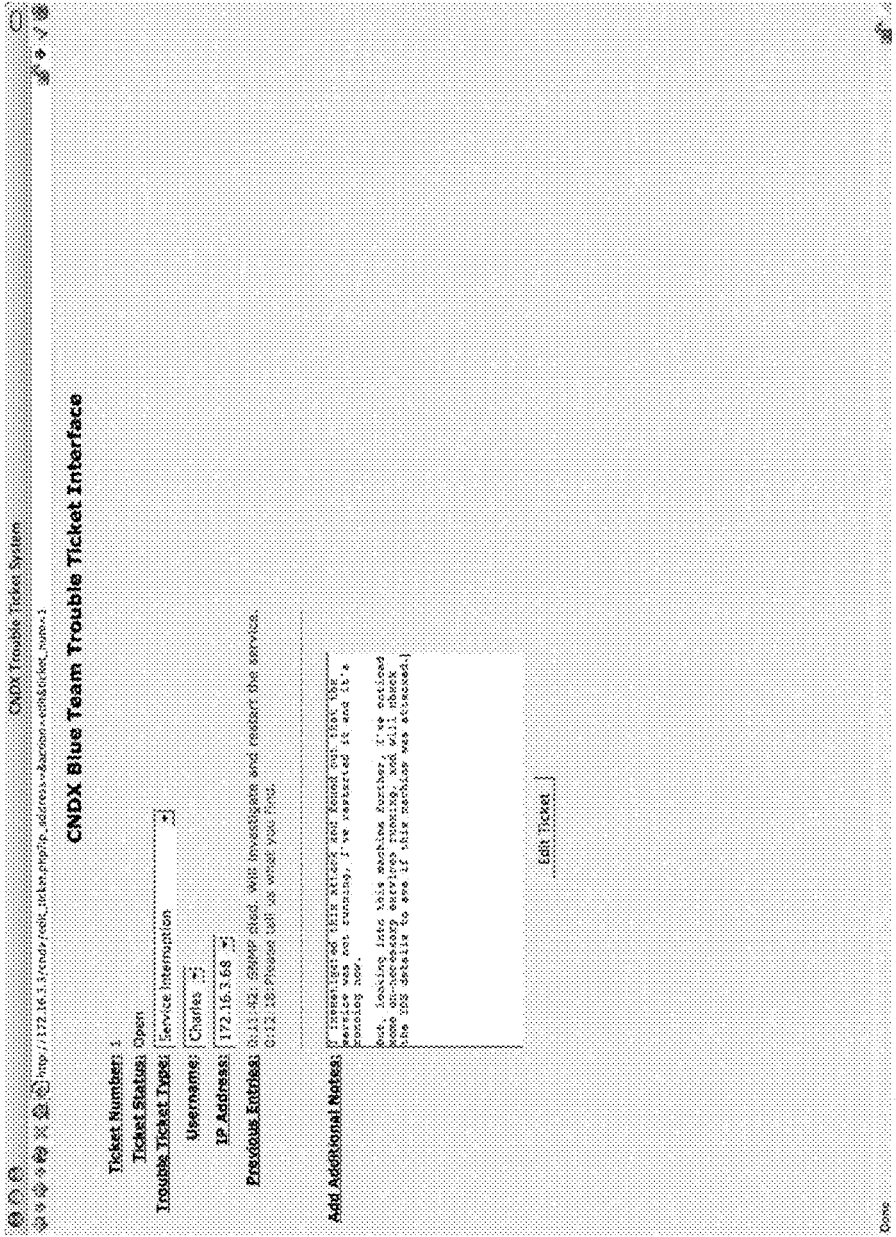
FIG. 14 illustrates an updated "student's" trouble ticket.
Figure 15:
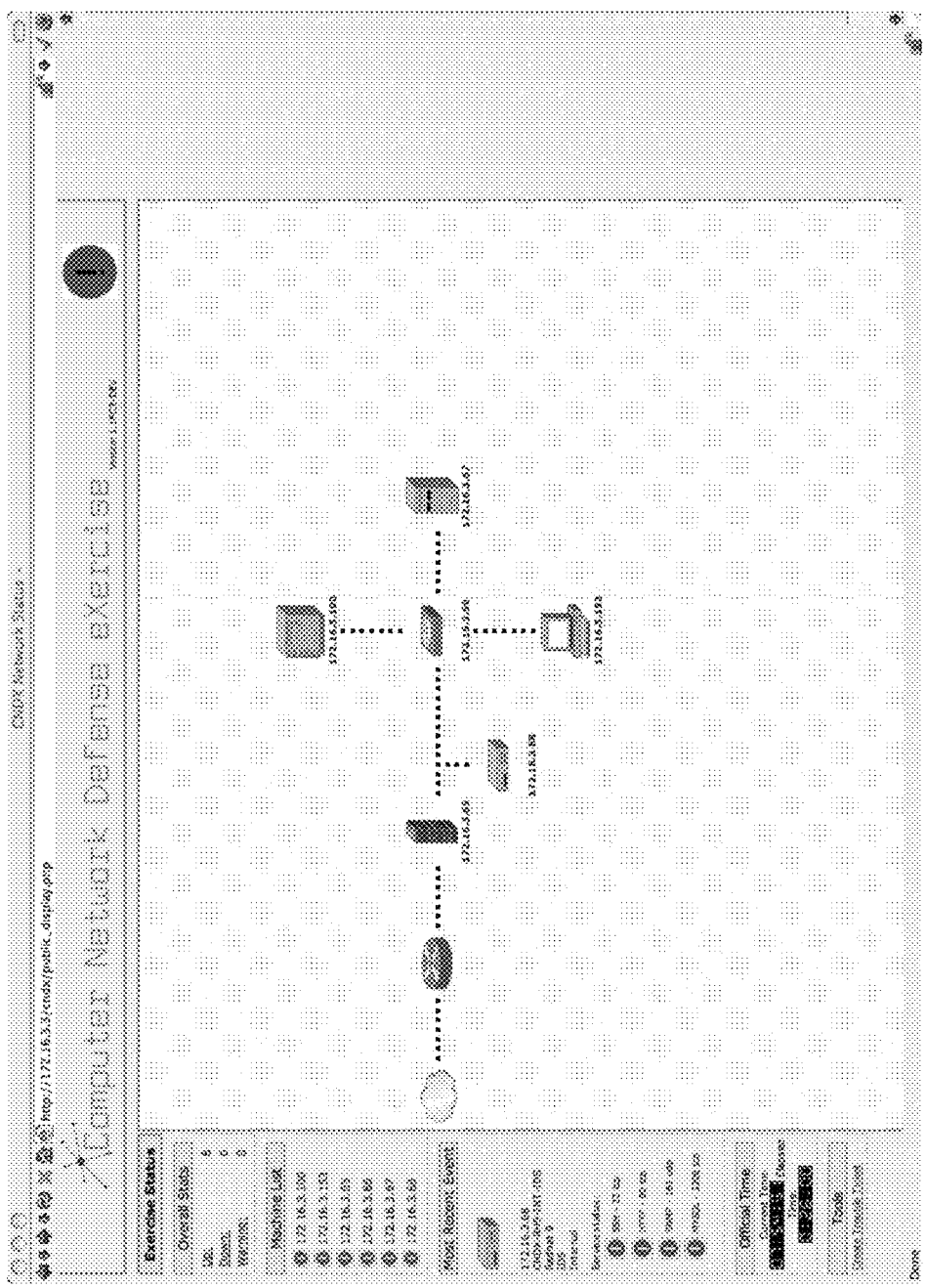
FIG. 15 illustrates a nominal "Network Management Console" interface depiction of the status of exercise resources.
Figure 16:
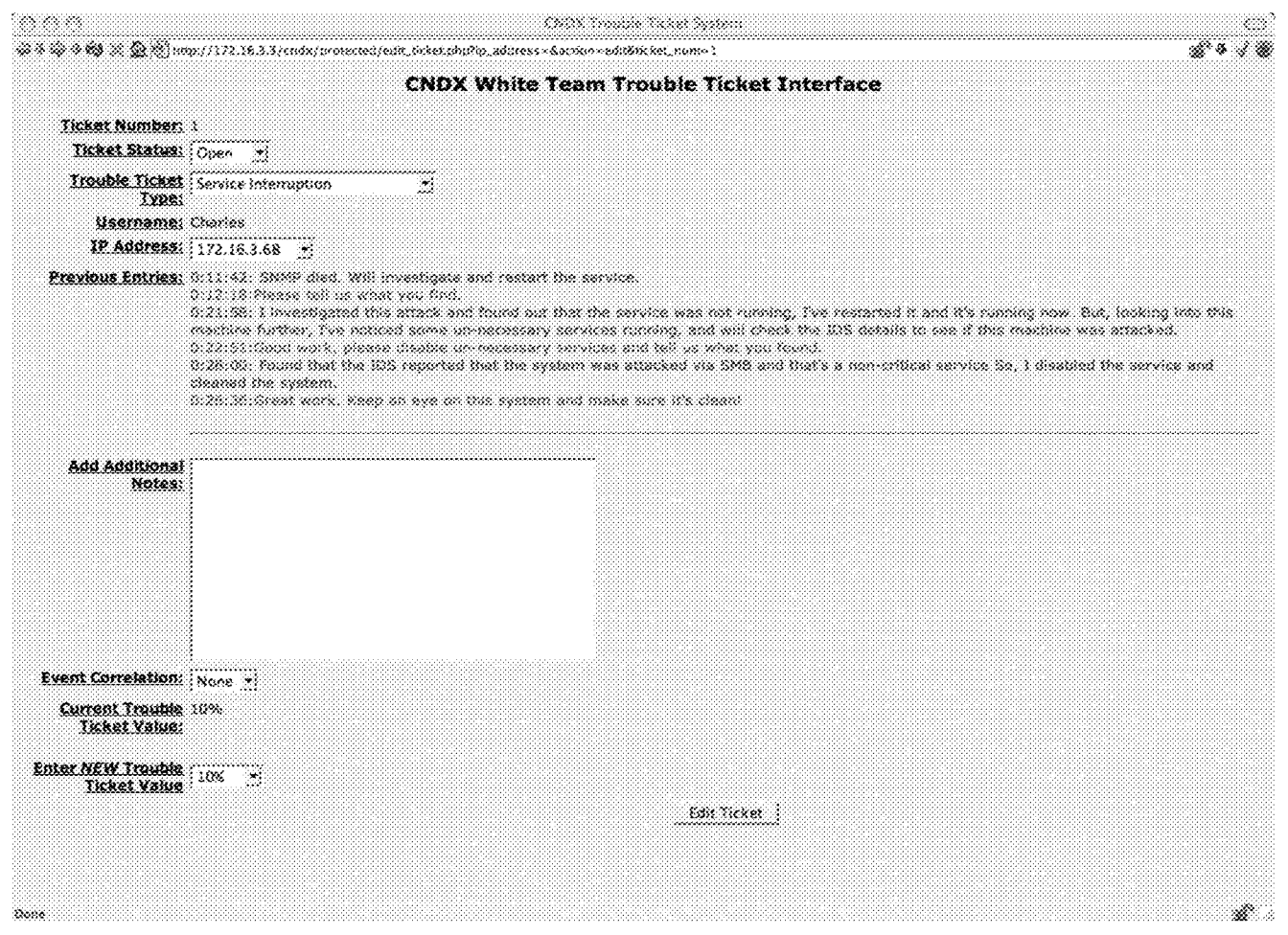

Now the Blue Team is looking to restore their critical service and determine the cause of the problem. The Blue Team connects to the server, restarts the service and enters a trouble ticket, e.g., FIG. 14, to the White Team informing them of their current findings. Once the critical service is restarted, the monitoring view would return to it's previously "healthy" display, e.g., FIG. 15. The White Team responds, e.g., FIG. 16, to the trouble ticket and upon receiving the completed response from the Blue Team grants full credit of +10% for their trouble ticket response to the incident. As noted above, the White Team can assess a value between minus 10 to plus 10, for each separate incident of trouble ticket, depending on the timeliness and substance of the information provided.

After the scoring round is complete, the monitoring display shows that the system is back in a healthy state, where as the scoring display shows the changes due to the Red Team actions, the remediation by the Blue Team, and the scoring changes due to correct trouble ticket usage from the White Team. With the vulnerability view for this target displaying an improvement of the specific vulnerabilities fixes by the Blue Team during the remediation of this host.

In the embodiment described to this point, testing for vulnerabilities was accomplished by launching, on a 60 second interval, a sequence of associated exploits by the scoring system. If the exploit was successful, then the vulnerability was considered still valid; if however, there was no return value from the target system, then the vulnerability was considered to be mitigated. In an embodiment of the present invention, team-based network monitoring exercises are staged, run and scored via a client-server infrastructure with a web-based front end and preferred communication protocol. The infrastructure supports rule-based configuration of clients; end-to-end communications between server and client and simple interface for delivery of scenarios. The server provides at least the following functionality: provides the client with a set of profiles, e.g., aggregated rules, to establish a target which the client monitors for vulnerabilities; introduces vulnerability scenarios into the target and manages the reset and termination of the scenarios; tracks client identification of such vulnerabilities and the handling thereof; and provides a scoring system to grade the client's response to the vulnerabilities. The target can either be a virtual machine (using VMWare) or it can be a physical hardware device.

Figure 17:
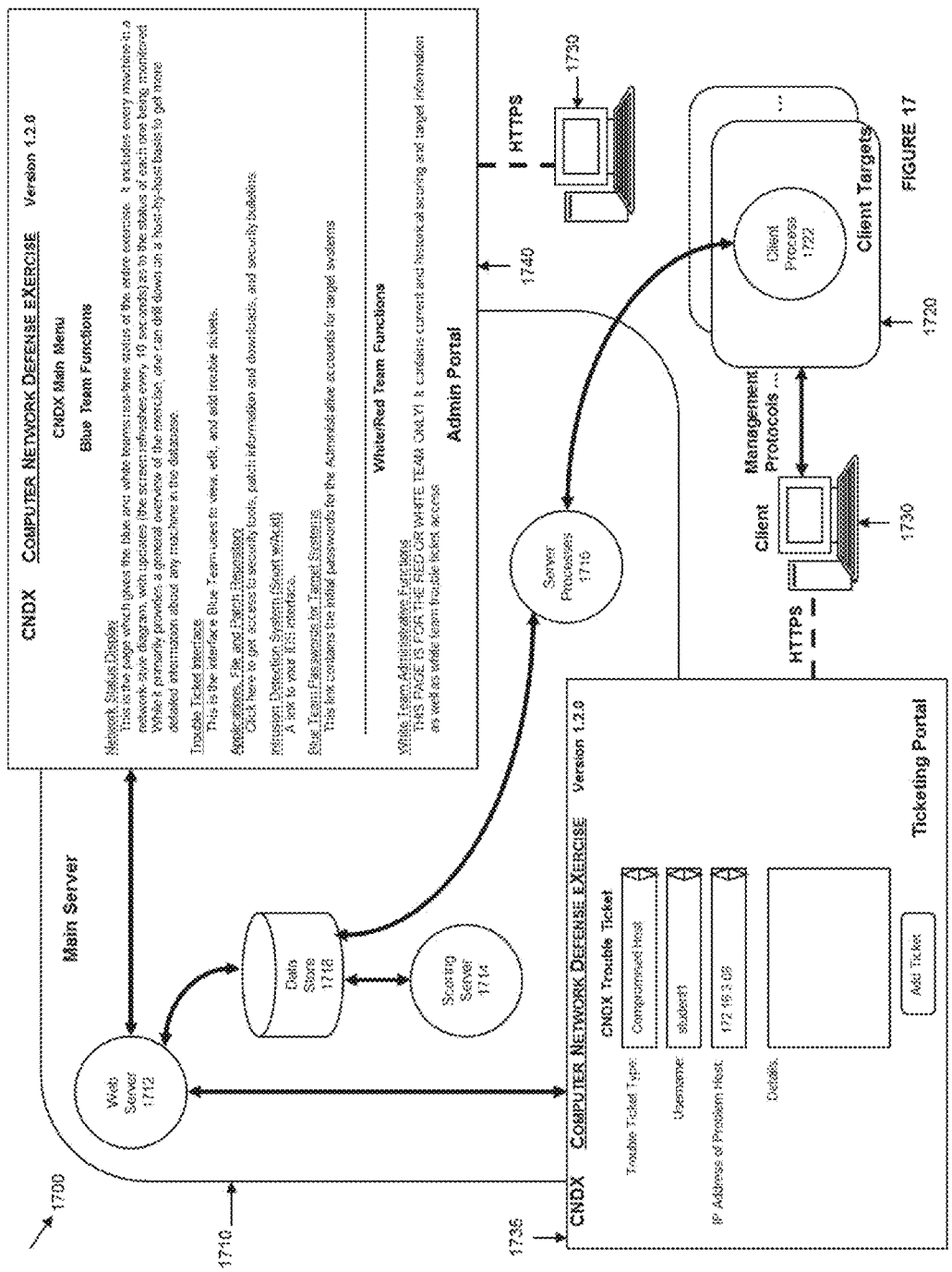
FIG. 17 illustrates a client-server process architecture.

Referring to FIG. 17, the primary components of the client-server architecture 1700 include: main server 1710, which further includes, facilitates and manages web server 1712, scoring server 1714, server processes 1716, data store 1718; and client target 1720 which includes client processes 1722. Users access and interact with the infrastructure through work stations 1730 and web portals, e.g., client ticketing portal 1735 and server system administration portal 1740. The main server applications may be written in JAVA. Throughout this description of the invention, it is understood that reference to the main server is not intended to limit that server to a single physical piece of hardware. The intention is to describe the two parts of the client-server architecture as simply as possible. The main server may in fact include multiple physical pieces of hardware, each performing designated tasks. Alternatively, the main server may be a single physical piece of hardware that is running dedicated software for performing different server-type tasks. One skilled in the art recognizes the various implementations of the concepts described herein. Accordingly, where designated servers are referenced herein, e.g., web application server, scoring server, these may be stand-along pieces of hardware or software modules designated to perform the described tasks.

Figure 18:
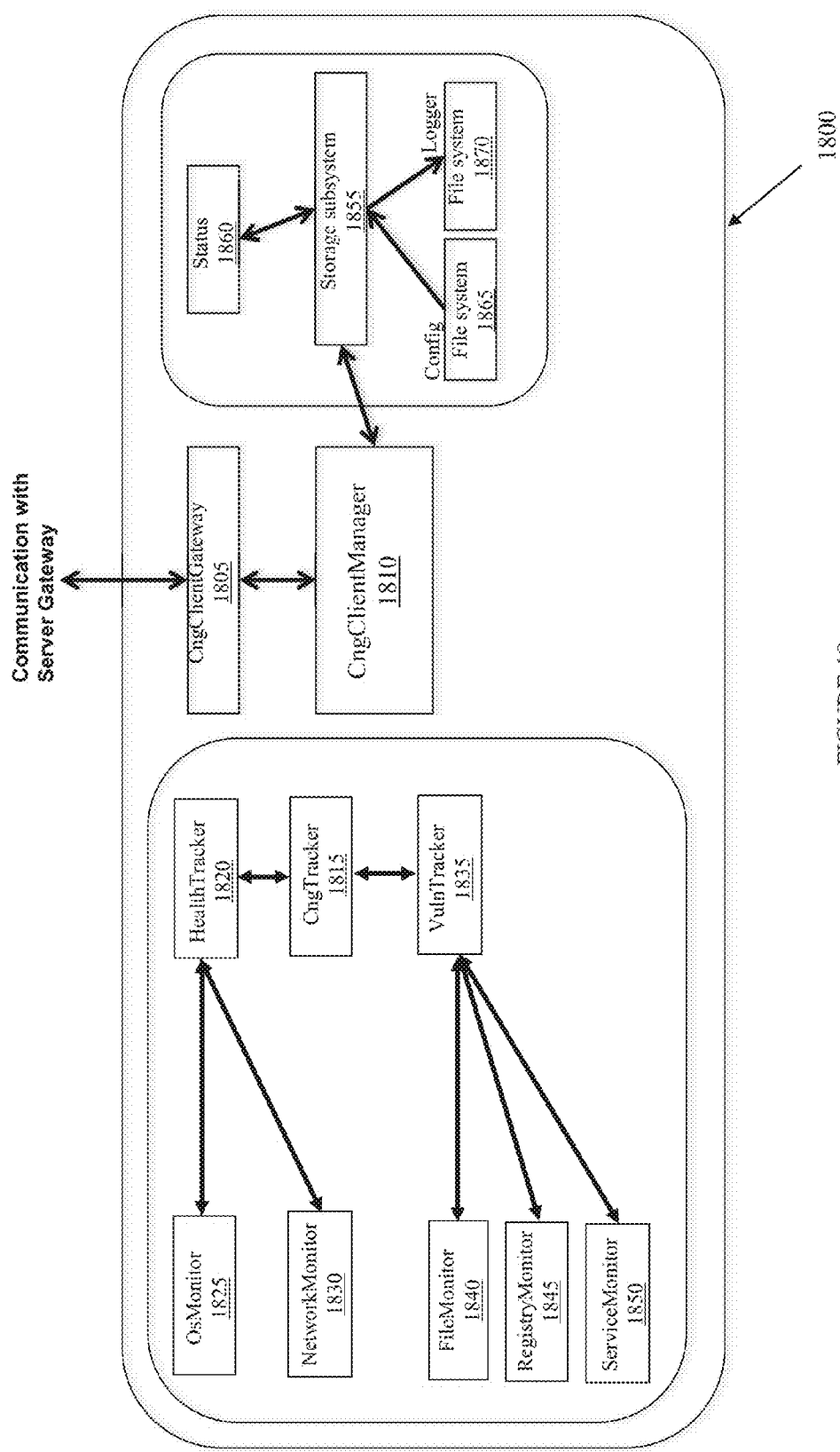
FIG. 18 illustrates a client-side architecture.

On the client target 1720, there are a numerous modules supporting client processes 1722 and communications with the main server 1710. Referring to FIG. 18, the client architecture 1800 further comprises client gateway 1805 and client configuration manager 1810. The client architecture 1800 further including at least the following modules and sub-modules communicating with the client configuration manager 1810 for implementation of the processes described herein from the client-side: Configuration Tracker 1815; Health Tracker 1820; operating system (OS) monitor 1825; Network Monitor 1830; Vulnerability Tracker 1835; File Monitor 1840; Registry Monitor 1845; Service monitor 1850. The client architecture 1800 also includes storage subsystem 1855; status subsystem 1860; configuration file system 1865 and logger file system 1870. The primary individual functionalities, uses of and communications between these modules, sub-modules, systems and subsystems are addressed below. One skilled in the art recognizes that other modules and systems are contemplated by the invention for implementation of the target monitoring and vulnerability identification described herein.

The client configuration manager 1810 performs and facilitates a variety of functions including: start-up notification, i.e., notifying the server on host start-up, shut down, crashes and status details such as IP address, hostname, MAC address, kernel version and other fingerprint information; configuration change tracking, i.e., notifies the server when changes are made to specific files, including changes from a previously recorded baseline, changes to registry keys, creation of new users, and changes to usernames; and history tracking, i.e., keeps host status and activity history locally in status file system 1860 and logger file system 1870 via storage subsystem 1855, logged by date and time in a server-recognizable format, and provides history upon server query.

The client configuration manager 1810 also monitors resiliency, working to ensure that the client is resilient to system administrator changes to the target. Since one purpose of the present invention is that the system encourages training exercises, the client runs at a higher privilege in an effort to avoid being compromised by server-driven vulnerabilities that are intended to affect the target and be spotted and fixed by the client. The client code is monitored by the OS, and restarted on an as required basis. When the participant terminates the client, the OS will restart it. If the OS in unable, then the server will report the target as failed. Thus a white team member can remedy the situation manually. Client is also first-in, last-out, i.e., first process to start-up and last process to end. Additionally, if the client is "killed" by a server-driven change, the system provides for a respawn of the client; similar to the scenario where a game-player has multiple chances or "lives" during a single running of a game.

As shown in FIG. 18, the client configuration manager 1810 also communicates through the configuration tracker module 1815 to track client health and client vulnerability. Generally, the health tracker module 1820 tracks target health and provides status reports to the server at regular intervals. The server can change the interval rate at which the client health tracker module generates the health status report. The health criteria are based on critical profile services including CPU, memory, hard disk and network usage as well as system interface upload usage in KB/s and download usage in KB/s. More particularly, the health tracker module 1820 communicates with the OS Monitor module 1825 in order to: track operating system upgrades and notify the server when a service-pack (e.g., Windows update) or new kernel (e.g., Linux, Solaris) is installed; and perform patch level tracking which tracks the system patch level and notifies the server when target software is updated, including providing version number in notification, and when a vulnerability is remediated via a software update. Similarly, the health tracker module 1820 communicates with the network monitor module 1830 in order to monitor network and web application firewalls, including tracking of firewall status, i.e., changes such as start, stop, flush, reload, opening and closure of listening ports, configuration changes and the like, as well as monitoring of vulnerable web applications to determine if/when the applications are protected by application firewalls, when the applications are blocked due to configuration changes, when an application firewall is installed and when changes are made to the application firewall configuration.

Also shown in FIG. 18, the client configuration manager 1810 communicates through the configuration tracker module 1815 with a vulnerability tracker module 1835 which in turn communicates with file monitor module 1840, registry monitor module 1845 and service monitor module 1850. The services monitor module 1850 monitors the target's specific services and notifies the server when: unused or irrelevant target services are stopped or disabled; vulnerable services are fixed or upgraded; server is going down or coming up, new services are started. The file monitor module 1840 monitors the target's specific files in the target's file system and notifies the server when monitored: file permissions, file ownerships, file contents, and/or file checksums are created, deleted, and/or modified. The registry monitor module 1845 monitors the target's configuration registry and notifies the server when monitored: key permissions, key ownerships, and/or key contents are created, deleted, and/or modified.

In a preferred embodiment, the client functionalities are written in Java and compiled to native binary implementation. The client gateway 1805 communicates with the main server 1710 via XML-RPC or JMS and all communications are SSL encrypted.

Figure 19:
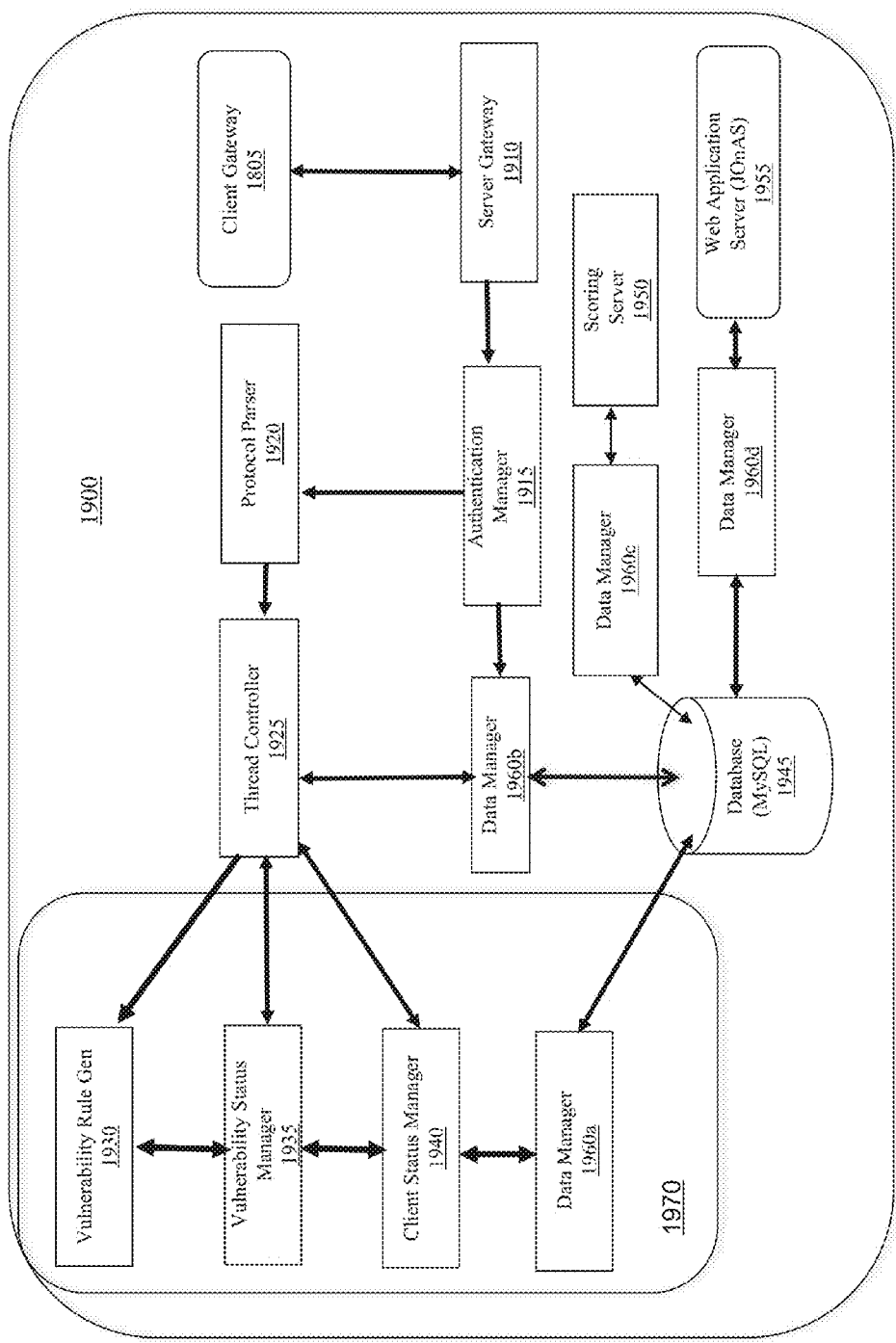
FIG. 19 illustrates a server-side architecture.

Referring to FIG. 19, a detailed view of a main server architecture 1900 according to an embodiment of the present invention includes the following components and modules: client gateway 1905; server gateway 1910; authentication manager 1915; protocol parser 1920; thread controller 1925, vulnerability rule generator 1930; vulnerability status manager 1935; client status manager 1940; database (e.g., MySQL) 1945; scoring server 1950; web application server (e.g., JOnAS) 1955 and various data managers 1960*a-d*. The primary functionalities of these components and modules are addressed below. One skilled in the art recognizes that additional components and modules are contemplated by the invention for implementation of the target monitoring and vulnerability identification described herein.

The server gateway 1910 communicates rule-based profiles generated by the vulnerability rule generator 1930 to the client via client gateway 1805. The exemplary profiles include web server, domain controller, DNS server, file server, database server, etc. These profiles may be changed by the server, which instructs the client to flush and reload the new profiles.

The web application server 1955 manages numerous function and processes, including, for example, scenario reset, secure communications between main server and client, attack generation, collaboration, target security. The web application server 1955 handles numerous requests, accessing one or more databases 1945, generating the static web pages for delivery to the client browser and displaying content to users. More particularly, the web application server 1955 generates pages for the trouble ticket interface, statistics interface and scenario management interface. The web applications may be written in PHP and deployed to the web in a web archive file (.war)

To establish initial secure communication between client and server, an exemplary authentication process includes: client broadcasts for server location which are received by the server gateway 1910; server responds to client broadcast; client authenticates to the responding server with a system fingerprint, e.g., targetname, IP address, MAC address, requested profile, etc.; and server compares using authentication manager 1915. Once authenticated, a thread controller 1925 initiates a thread to provide an initial rule-based vulnerability profile generated by vulnerability rule generated 1930. The exemplary thread cluster 1970 may include tasks for accessing, checking and updating vulnerability rules generator 1930, vulnerability status manager 1935, client status manager 1940 and data manager 1960*a*. Numerous other threads are contemplated by the invention in order to implement the processes described herein and would be known to a person having ordinary skill in the art. Additionally, post-authentication client-server communications are encrypted using SSL to thwart sniffing.

The web application server 1955 provides for collaboration amongst system administrators at the client. Client administrators can write-up trouble tickets for changes they make on their servers; comment on the trouble tickets of others; collaborate in a free text form and collaborate in chat sessions. Additionally, the web application server 1955 identifies to the client system administrator that a target is considered secure (as well as clearly labeling when hacked), i.e., a successful lockdown of a target triggers a notice to the system administrator of this accomplishment.

Further still, the web application server 1955 supports a process for delivering attacks to the client; such that the attack is immediately known to the client system administrator, e.g., windows pop-up. Exemplary attacks include use of infiltration to download client password files and attempts to crack passwords. The invention also contemplates running commercial-off-the-shelf applications to deliver attacks to the client such as Metasploit.

The data managers 1960*a-d* are selected and implemented in accordance with the required functionalities of the various servers and components. The selection and implementation would be well within the knowledge of a person having ordinary skill in the art of programming and networking. Similarly, protocol parser 1920 reads in the configuration definitions of the OVAL (Open Vulnerability and Assessment Language) vulnerabilities as defined in the system and parses them into the appropriate system format.

All client-server communications are logged. As discussed above with respect to the client server, a log and history is maintained on the client side. Similarly, all messages sent to the server, as well as actions performed by the server, are logged and tabulated at database 1945 so that the client and server administrators can run reports, including statistical analyses, and score appropriately.

In addition to the particular modules described above, other modules may be used to implement a secure and dynamically configurable rule-based system in accordance with the present invention which: can be configured during runtime to monitor files, services, registry, etc.; includes profiles containing granular rules that may be aggregate; facilitates additions of new rules or changes to existing rules to a specific target during assessment; requires immediate updates and compliance with rules changes by client; includes specification of files and/or registry keys to watch and services to monitor.

The communications between client and server are governed by a particular protocol that is design to minimize the number of server-client exchanges. An exemplary protocol specification in accordance with the present invention is described below. In the following example, the protocol is a XML based messaging protocol and its intended delivery is XML-RPC although other forms such as JSM may also be supported.

Server messages are messages that are generated by clients and consumed by the server. These messages are encapsulated by the server-tag. A client acknowledges the server when a server message has been received. FIGS. 21*a* and 21*b* illustrate an exemplary acknowledge ("ACK") state diagram. FIG. 21*a* shows ACK: QUIT and FIG. 21*b* shows ACK: RESET. Message transmissions are controlled via the ACK message. The following acknowledgements are supported: OK: success; RESET: resend command; ERROR: an error occurred; QUIT: Too many errors occurred, stop all transmissions; and EXPIRED: The session has expired. The client should expect acknowledgement for all messages unless specified in the protocol description, e.g. the HEALTH message. If no ACK message is received, the client should retransmit the last message. An exemplary ACK message is shown in FIG. 21*c*.

Figure 22A:
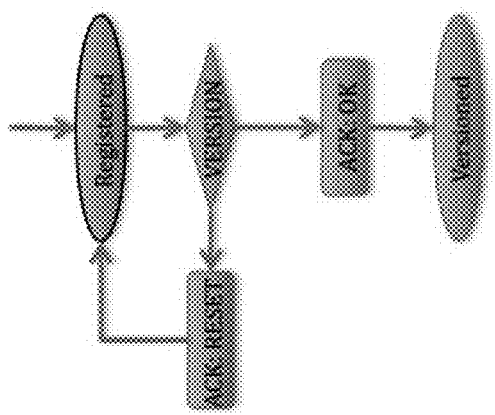
FIGS. 22a and 22b illustrate a VERSION state in accordance with the communication protocol of the present invention.
Figure 22B:
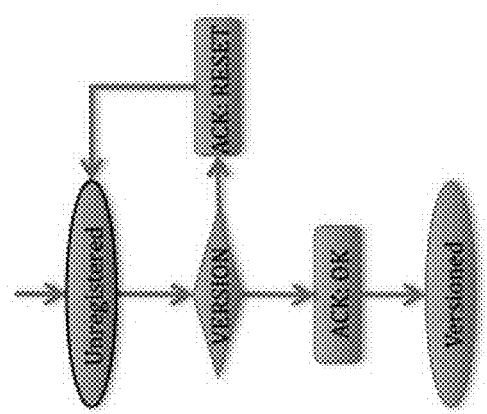
Figure 22C:
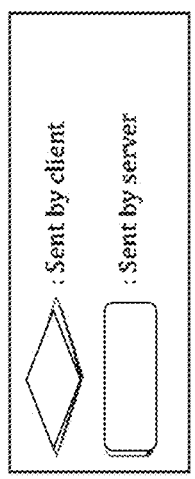
FIG. 22c illustrates a client generated VERSION message in accordance with the communication protocol of the present invention.

It is expected that different clients may support different versions of the protocol. The client sends the version of the protocol it supports. FIGS. 22*a* and 22*b* illustrate exemplary versioning diagrams in accordance with the present invention. On initial startup the client will connect to the server and perform a version handshake, the lowest version supported by either party will be used. This version will be used for all future communication between the server and client until the client is issued a RESET command. Making sure that the server and client agree on a protocol version will give the system extensibility in the future. More particularly, when the client initially starts, it sends the highest version of the protocol it supports in a VERSION message. If the server responds with an ACK: RESET message then the next lower supported version of the protocol will be sent again in a VERSION message. This process will continue until the server transmits an ACK: OK message i.e. a version of the protocol has been agreed upon or the client is sent an ACK: QUIT command. An exemplary VERSION message is shown in FIG. 22*c*.

Figure 23A:
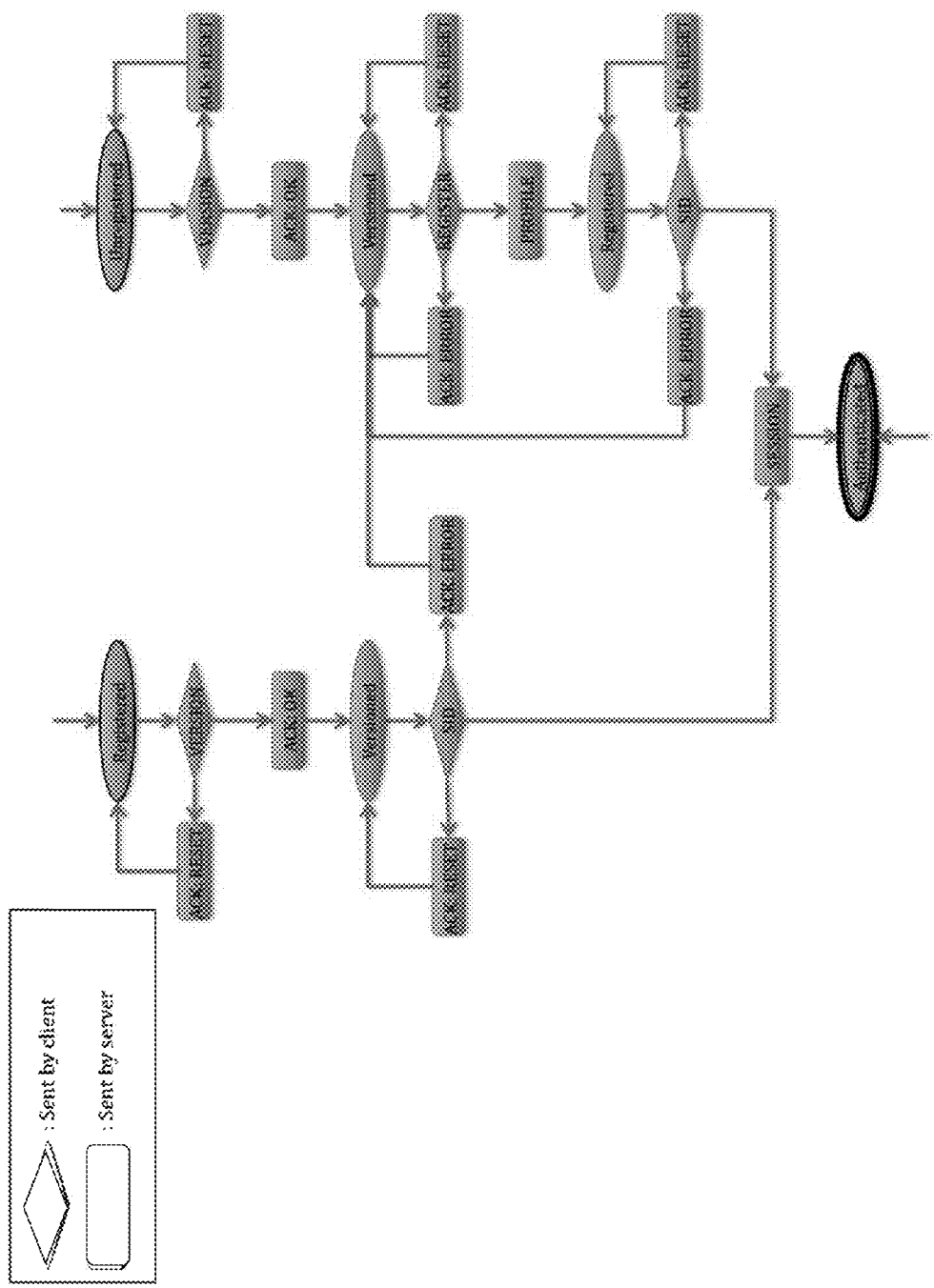
FIG. 23a illustrates a REGISTER state in accordance with the communication protocol of the present invention.

The REGISTER or registration message provides the server with fingerprint information that the server will use to generate a System ID (SID) and use it to track the target. This is also called authentication. An exemplary authentication diagram is shown in FIG. 23*a*. The registration message transmits the following information: Targetname; Network Information; Kernel/OS Information; Processor(s) type(s); and Amount of RAM. Once the protocol version has been agreed to per the versioning steps described above, the client will send a REGISTER message. If registration is successful then the server will reply with a PROFILE message. If registration is unsuccessful then the server will reply with either an ACK: ERROR or an ACK: RESET notifying the client that either an internal error occurred or that the last message was not received (respectively). The client will try to reregister until it is successful, it is given an ACK: QUIT message or it makes a predetermined number of attempts. In a preferred embodiment, the client authentication process takes less than 15 seconds. An exemplary REGISTER message is shown in FIG. 23b.

Once registered, the client sends its authentication token or System ID ("SID") (a 32-character string) via a SID message. The SID message is used to keep track of the target identity. The SID message will also be transmitted whenever the ACK: EXPIRED message is received in order to refresh the client's Session ID (see client SID message). An exemplary SID message is shown in FIG. 24.

Figure 25A:
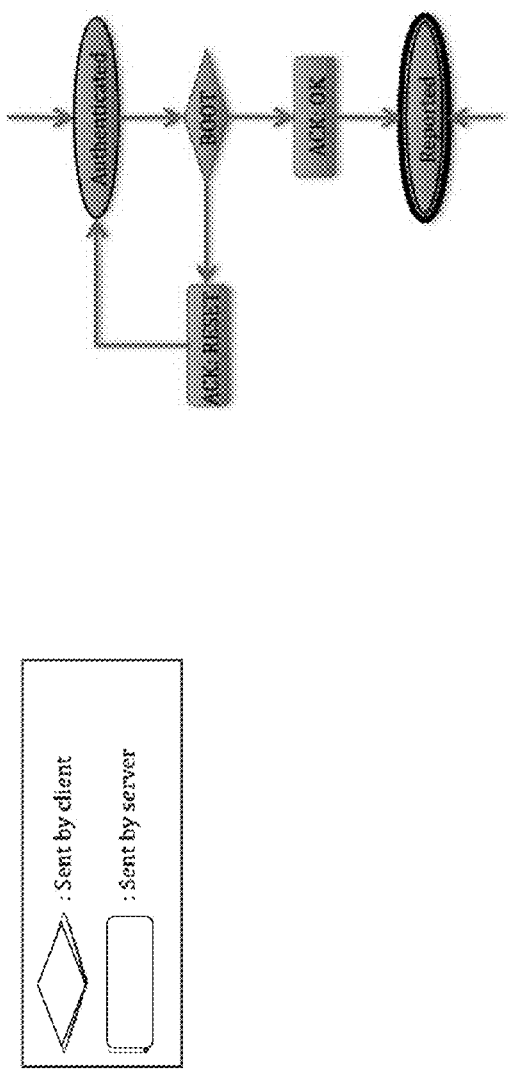
FIG. 25a illustrates a BOOT state in accordance with the communication protocol of the present invention.
Figure 25B:
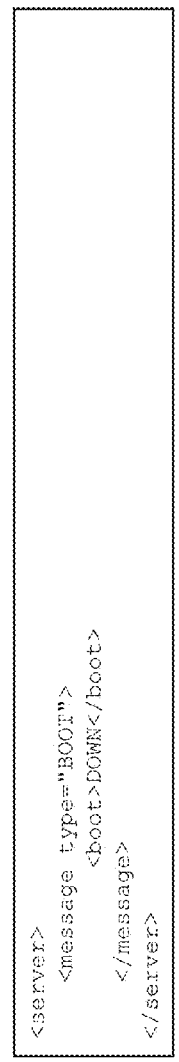
FIG. 25b illustrates a client generated BOOT message in accordance with the communication protocol of the present invention.

In order to keep track of client uptime the client will communicate via the BOOT message, which notifies the server when the client is going down and when it comes back online. If possible the client will also notify the server when it's going for a reboot. This message will only be transmitted after the System ID (SID) has been assigned and the profile has been transmitted. An exemplary BOOT state diagram is shown in FIG. 25a. The BOOT message can take the following forms: DOWN: the target is shutting down; REBOOT: the target is rebooting; UP: The target started. Once the target is registered, it will notify the server whenever it is shutting down by sending a DOWN or REBOOT BOOT message. If the client does not receive an OK ACK message, it will retransmit this information when it comes back up followed by an UP BOOT message. An exemplary BOOT message is shown in FIG. 25b.

Figures 26A, 26B:
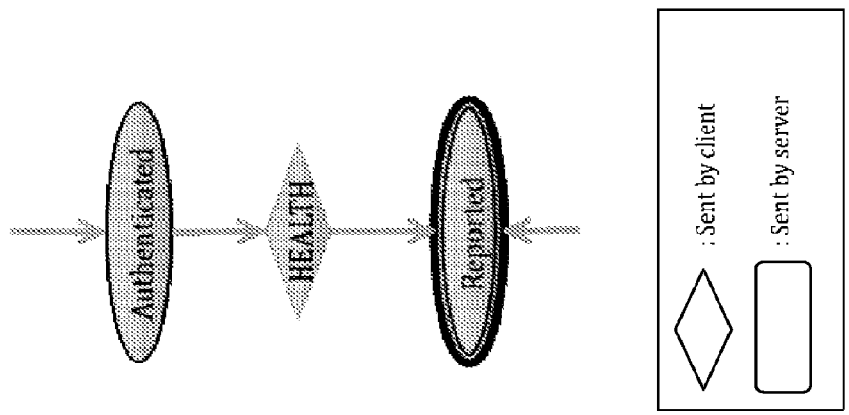
FIG. 26a illustrates a HEALTH state in accordance with the communication protocol of the present invention.
FIG. 26b illustrates a client generated HEALTH message in accordance with the communication protocol of the present invention.

The HEALTH message provides regular (keep-alive) health status updates. HEALTH messages report system health: CPU, memory, hard disk and network usage. Given these system measurements, the server will rate the system health between 1 and 10, a reading that the front-end will reflect. If the server does not receive this message within two cycles of the allotted time, the server will mark the target as problematic and alert the administrator. Exemplary HEALTH message fields include: cpu: percentage of CPU used; mem: percent of used memory; disks: hard disk usage; part: disk partition; name: the partition label; full: the partition usage in percent. Additionally, the message includes information about the system interfaces. For each interface the message includes: name: the name of the interface; up: upload usage in KB/s; and down: download usage in KB/s. Once the target is registered, it will notify the server once every set number of seconds of its standing health via a HEALTH message. This message is not replied to and its reporting time may be changed by the THROTTLE message (discussed below). An exemplary HEALTH state diagram is shown in FIG. 26a and an exemplary HEALTH message is shown in FIG. 26b.

All client messages, i.e., messages generated by the server and directed to the client, will include the time and date as well as message and session IDs as part of the message body. The session ID will expire at predetermined time, e.g., every 60 minutes. The client message fields include: time: date and time; msgid: the message ID (6-digit number); session: and the session ID (32-character string). An exemplary message, including metadata information is shown in FIG. 20.

Figure 27A:
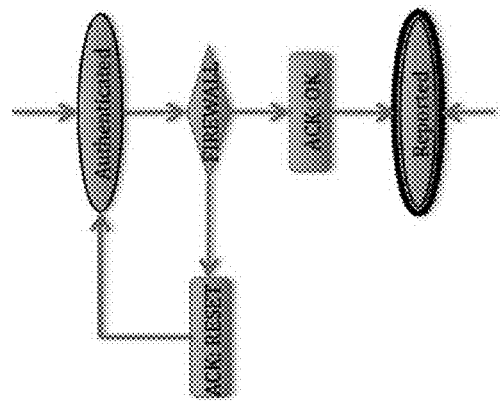
FIG. 27a illustrates a FIREWALL state in accordance with the communication protocol of the present invention.
Figure 27B:
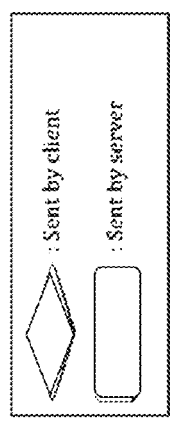
FIG. 27b illustrates a client generated FIREWALL message in accordance with the communication protocol of the present invention.

The Client notifies the server when a firewall configuration change is made. The FIREWALL message is used to communicate target firewall status, which may be up, down or none (firewall not installed). The FIREWALL message will also be transmitted when individual rule changes are made. The FIREWALL message will be transmitted any time system administrators make changes to system firewalls. An exemplary FIREWALL state diagram is shown in FIG. 27a and an exemplary FIREWALL message is shown in FIG. 27b.

Figure 28A:
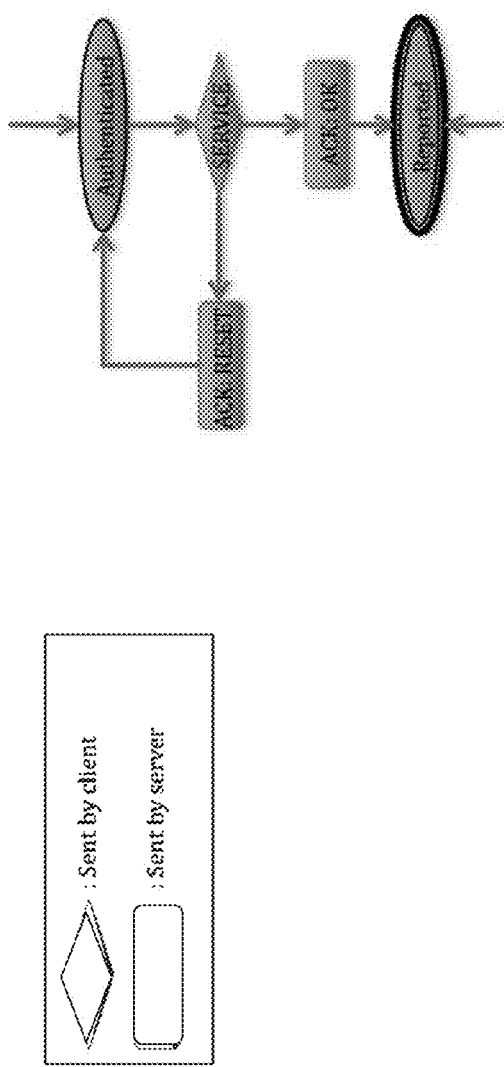
FIG. 28a illustrates a SERVICE state in accordance with the communication protocol of the present invention.

The Client notifies the server when a service is manually stopped, started or restarted. SERVICE messages are used to communicate service (or daemon) status. The client needs to report when a service is manually stopped, started or restarted by a system administrator and if the service crashes. All SERVICE messages include a reason for reporting, valid reasons are either manual or error. Manual means that the system administrator manually made the change, while error messages mean that the server crashed unexpectedly. The SERVICE message will be transmitted when any service is manually changed or if a service unexpectedly stops. An exemplary SERVICE state diagram is shown in FIG. 28a and an exemplary SERVICE message is shown in FIG. 28b.

Figures 29A, 29B:
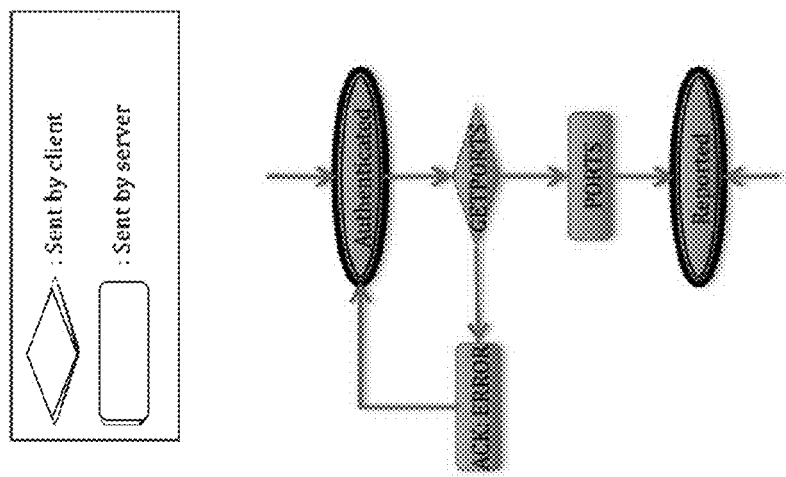
FIG. 29a illustrates a GETPORTS state in accordance with the communication protocol of the present invention.
FIG. 29b illustrates a client generated GETPORTS message in accordance with the communication protocol of the present invention.

The Client uses the PORTS message as a response to the GETPORTS message (discussed below) and requires no acknowledgement from the server. Anytime after receiving its SID (authenticated), the client may receive a GETPORTS message from the server. The client responds to GETPORTS with PORTS message including all open TCP and UDP ports and all monitored closed TCP and UDP ports. An exemplary PORTS state diagram is shown in FIG. 29a and an exemplary PORTS message is shown in FIG. 29b.

Client sends a VULNFIXED message to the server whenever the system administrator fixes a target vulnerability per the given profile. The only thing the server needs is the vulnerability ID as transmitted in the PROFILE message. An exemplary VULNFIXED message is shown in FIG. 30.

Figures 31A, 31B:
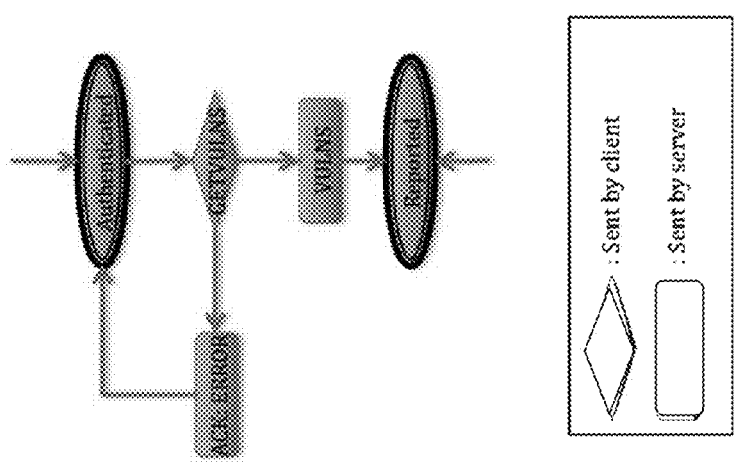
FIG. 31a illustrates a VULNS state in accordance with the communication protocol of the present invention.
FIG. 31b illustrates a client generated VULNS message in accordance with the communication protocol of the present invention.

Client responds to GETVULNS (discussed below) with the VULNS message outlining fixed and existing vulnerabilities. The fixed subsection simply includes a list of vulnerability IDs that have been fixed by the system administrator while the existing subsection includes a list of vulnerabilities not yet addressed. The VULNS message is sent as a reply to the GETVULNS message. An exemplary VULNS state diagram is shown in FIG. 31a and an exemplary VULNS message is shown in FIG. 31b.

As discussed above, client messages are generated by the server and consumed by the client. Similar to the server messages described herein, the server generates client VERSION and ACK messages in the same format as the server messages. Exemplary VERSION and ACK client messages are shown in FIGS. 32 and 33.

Figure 34A:
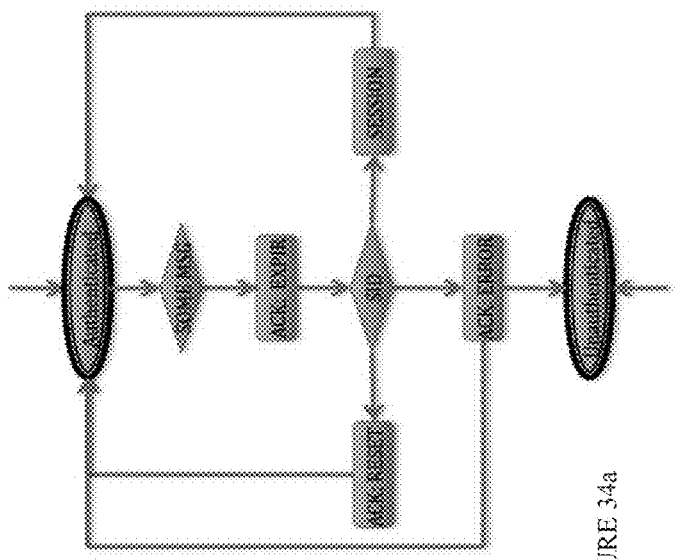
FIG. 34a illustrates a SESSION state in accordance with the communication protocol of the present invention.
Figure 34B:
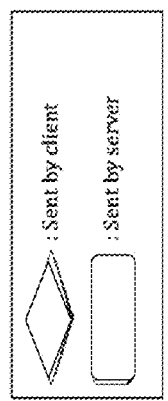
FIG. 34b illustrates a server generated SESSION message in accordance with the communication protocol of the present invention.

The SESSION message is used during authentication to initiate a session and upon reinitiation of a session. The SESSION message contains the Session ID as well as its expiration time in milliseconds (predefined time, recommended 60 minutes). After expiry, any message sent with the expired Session ID will be replied to with the ACK: EXPIRED message. The client may resend a server SID message to which the server will respond with a SESSION message containing a new Session ID and expiration. An exemplary SESSION state diagram is shown in FIG. 34a and an exemplary SESSION message is shown in FIG. 34b.

The PROFILE message is a reply to the client's REGISTER message. The client SID (a 32-character string) is generated from the registration information and used to identify the client. The System ID should be kept secret and not displayed on the frontend. Along with the SID, all vulnerabilities the client is responsible for are also sent in the vulnerabilities subsection. Vulnerability subsections have a precedence (prec), which dictates the priority in which these fixes should be administered. The Vulnerabilities subsection includes: id: the vulnerability ID; services: services to monitor; keys: registry keys to monitor; and bin: a binary to monitor. The Services include: name: the system service name and action: the action that should be taken on the service, such as, disable: the service is supposed to be disabled, enable: the service should be set to automatic and started, restart: the service should be restarted. The Registry Keys include: keyname: the registry key name; valuename: the name of the value to be monitored; and value: the expected value. Finally, the Binaries include: file: the full path to a file to be monitored; version: the expected binary version; and md5: the expected checksum of the binary. An exemplary PROFILE message is shown in FIG. 35.

The server sends the PASSCHECK message any time after the client has been authenticated to check if the system administrator has changed a weak password in the system. The server will simply send the username and password to check. The client will respond with an ACK: OK message if the weak password has been changed and the ACK: RESET if the password remains unchanged. An exemplary PASSCHECK message is shown in FIG. 36.

The THROTTLE message is sent by the server any time to change the frequency of HEALTH message reporting. When the THROTTLE message is received by the client, the client adjusts its internal reporting interval and responds with an ACK message. An exemplary THROTTLE message is shown in FIG. 37 and shows that the server is requesting that the client provide health reporting every 2 minutes and 15 seconds.

The GETPORTS message allows the server to arbitrarily query the client for a list of open ports.

The server sends a GETPORTS message and the client responds with a PORTS message. See PORTS message protocol above. An exemplary GETPORTS message is shown in FIG. 38.

The GETVULNS message allows the server to arbitrarily query the client for a list of fixed and unfixed vulnerabilities. The vulnerabilities are outlined in the initial profile received by the client. When the server sends a GETVULNS message, the client responds with a VULNS message. See VULNS message protocol above. An exemplary GETVULNS message is shown in FIG. 39.

Figure 40:
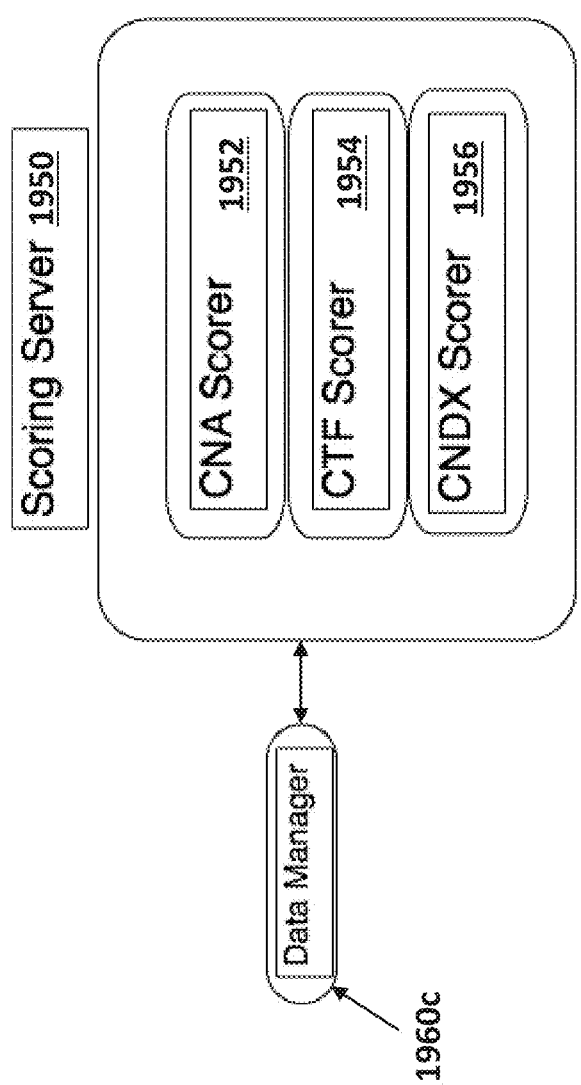
FIG. 40 illustrates a scoring server configuration.

A key component to numerous embodiments of the present invention are the scoring processes controlled by the scoring server 1950 (also shown as 1714) and formatted for display by the web application server 1955 (also shown as 1712). The scoring server is disconnected from the client-server communications described herein as the scoring server only communicates internally with the at least one database 1945 (also shown as 1718) through data manager 1960c. The at least one database 1945 is populated with scoring information from the client-server communications. As shown in FIG. 40, the scoring server 1950 includes modules facilitating CNA scoring 1952, CTF scoring 1954 and CND scoring 1956. The applied scoring techniques differ depending on the type of network defensive, offensive, investigative scenario that is being implemented. Some of the contemplated scenarios include: Capture The Flag (CTF), which can be an offensive or mixed offensive and defensive scenario intended to track flag/target capture and pits team against team; CNA (computer network attack), which is an offensive scenario intended to track assessment and capture of target vulnerabilities; CND (computer network defense), a defensive scenario which scores trouble tickets and tracks attacks which affect score; Forensics and data recovery, which will track and measure the effectiveness of the participants in finding malware and identifying its' capabilities; Wireless, which will track and measure the ability for the participants to both attack and defend an 802.11 wireless network; SCADA and other remote and mobile devices which will track and measure the participants ability to monitor and maintain control of a distributed control infrastructure; IPv6 which will provide an enhanced IPv6 implementations of the targets and vulnerabilities to track and measure the effectiveness of the students to defend in the next generation of IP space; Web Application Security (SQL injection, XSS, etc.) which will focus the tracking and measurements of the system to a specific application to better gauge the ability of the participants in specific application configuration and management; Denial of Service and Botnets which will track and measure the participants capabilities in exploiting a botnet command and control infrastructure to regain control or to leverage an existing botnet to further prosecute measurable impacts; Exploit Engineering—Fuzzing and basic overflows which will track and measure the capabilities of the participants in their investigation and exploitation of unknown vulnerabilities and measure the capabilities for a participant to gain control via exploitation; and, hacker versus hacker which will track and measure multiple participants in a no-holds barred exercise to gain total control of the entire target community.

Figure 41:
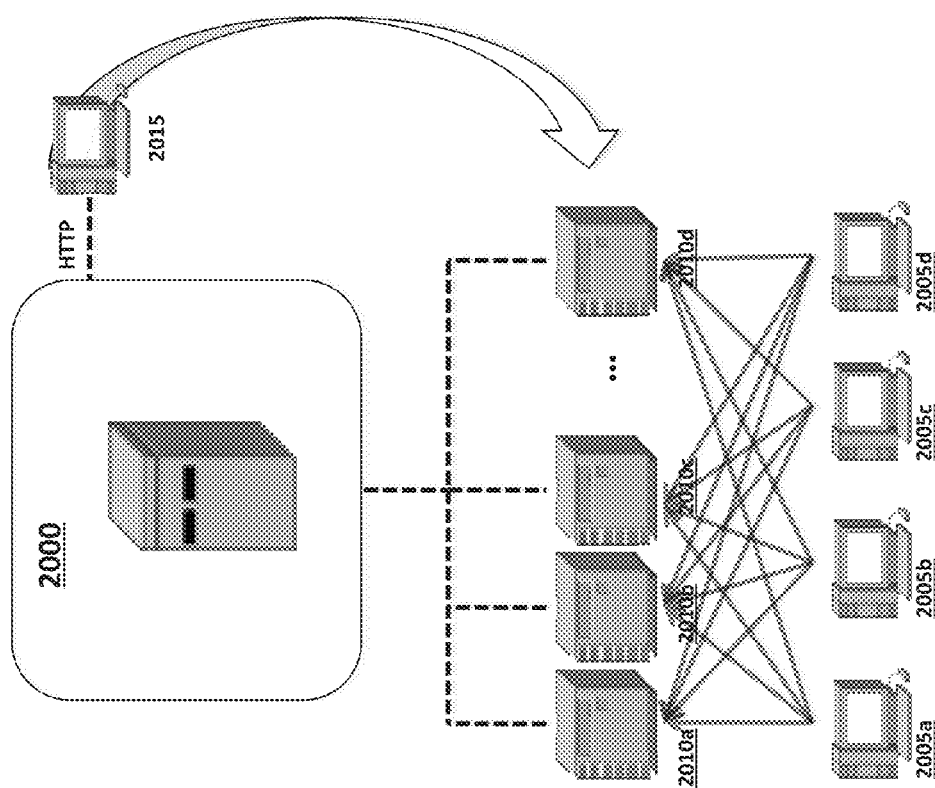
FIG. 41 illustrates an offensive scenario architecture.

Referring to FIG. 41, the schematic illustrates exemplary users and information flow in an offensive scenario, e.g., CTF. The main server 2000 facilitates game play between users/teams 2005a-d as they attempt to plant, remove and steal flags from various targets, i.e., computers, servers, networks running various operating systems (e.g., Windows, Linux, Solaris, OSX) with varying levels of security as exemplified by 2010a-d in FIG. 41. The administrators 2015 monitor the teams 2005a-d for fair play. The flags or targets can be particular files located on secure computers/networks and stealing would require penetrating the computer/server and retrieving the file. In a purely offensive scenario, all teams are racing to capture the same flag or plant their flag first. In a mixed offensive and defensive scenario, teams might both be defending against flag capture and attempting to capture another team's flags. For CTF, scoring functionality may include determining which team can capture and keep targets over the longest period of time. The CTF rules include: limited game duration, points for flag plant, flag removal and target stolen.

For CNA, scoring functionality is intended to show which team can assess and capture as many targets the fastest. The CNA rules include: limited game duration or first to score value; one time target/vulnerability pair capture per team; points for root compromise flag plant, which entails placement in root directory or Admin user; file exposure flag plant or report, which entails placement in user directory or data location or key in value stored in insecure location; points for information disclosure flag plant, which entails placement in non-secured location or key in value stored in insecure location.

Figure 42:
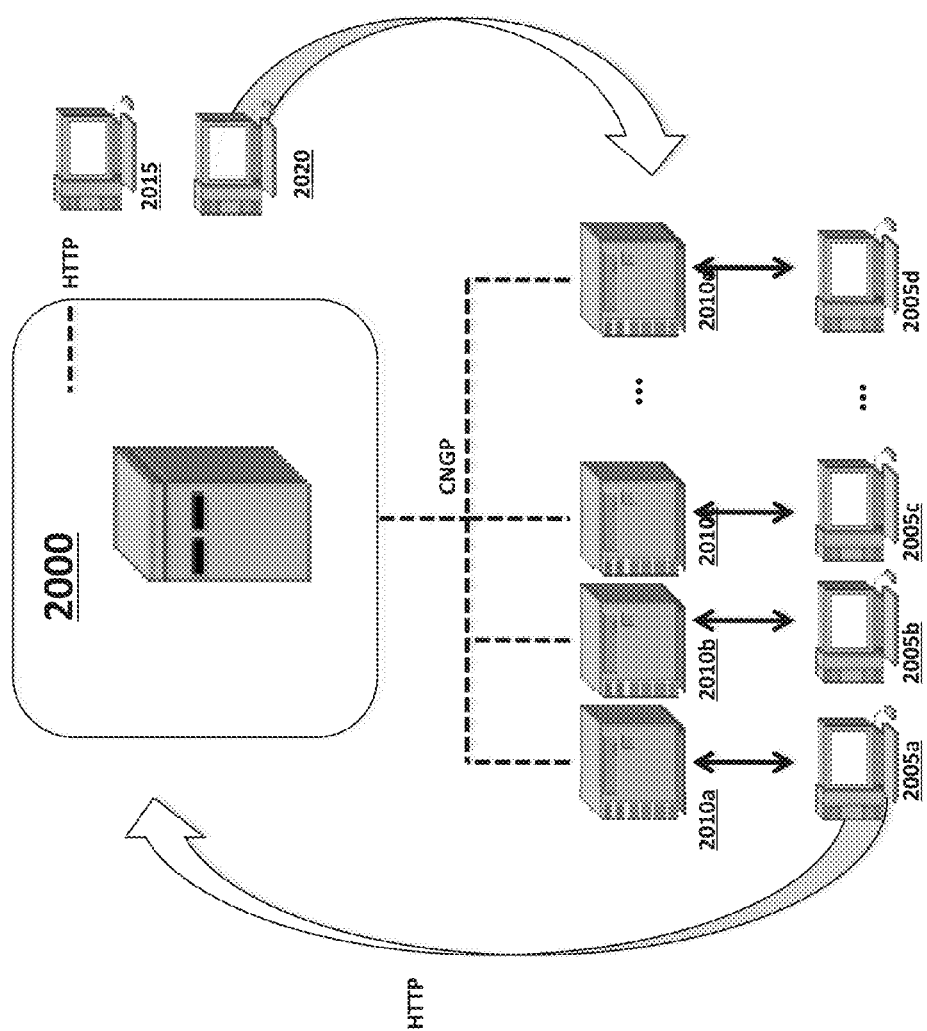
FIG. 42 illustrates a defensive scenario architecture.

For CND, the scoring functionality provides for aid instruction, measurement of team performance and reliability, and repeatable scoring of teams. The functionality gives instructors real-time view into the exercise; permits identification and focused training on weak areas during the exercise; tracks multiple values over time; provides quantitative measure of ability to keep the business operational; permits performance trend analysis to measure progress; shows ebb and flow of team focus during exercise; allows evaluation against best practices, evaluates performance across multiple factors; provides complete history of exercise; and provides full documentation to put performance in context. Referring to FIG. 42, the schematic illustrates exemplary users and information flow in a defensive scenario, e.g., CTF. The main server 2000 facilitates hacking of various targets, i.e., computers, servers, networks running various operating systems (e.g., Windows, Linux, Solaris, OSX) with varying levels of security 2010a-d by hacker applications 2020, e.g., Metasploit. The users/ teams 2005a-d are responsible for monitoring their assigned targets 2010a-d and reporting trouble tickets as they spot and implemented fixes to vulnerabilities. The administrator 2015 runs the scenario and allocates points for trouble tickets.

In an exemplary CND scoring design, scores are normalized based on percentage of vulnerabilities and their value. By way of example, high value resolutions could include: remote Admin/Root compromise; remote user compromise; and privilege escalation. Medium value resolutions could include service exploitation. Low value resolution could include modification of date. Minor resolution could include information leakage. Additionally, information resolution could include running an extraneous service. As shown in exemplary FIGS. 5, 7 and 10, a comprehensive score chart shows the combined perspective of the targets. If a target is reachable via ICMP (Internet Control Message Protocol), it can be scored, if it isn't reachable the score is 0. In a preferred embodiment, the score is built on the total negative value of each vulnerability (rated from 1 to 10). So, for example: Remote Root/Administrator Access Vulnerability=10; Service Exploitation Vulnerability=7; Modification of Data Vulnerability=5; Information Leakage Vulnerability=3; and Extraneous Service running=1. Then the values of each critical service (as based on the System Weight) is calculated as a positive value. To that value the trouble ticket values are added, and then the entire total is normalized to a scale of 0-100. Thus a system that starts with all it's critical services running and with all it's vulnerable services will not start at zero. But, if a critical service is turned off, then the score will drop. Finally, the score is adjusted based on the exercise time. For example, a vulnerability that is not fixed until 7 hours into an exercise, has less weight on the score as the same vulnerability fixed in the first 15 minutes of the exercise.

Further to the CND scoring design, trouble tickets generated by clients (see FIGS. 4, 12-14 and 16) are scored depending on various factors, e.g., negative points for installing tools or fixing without requisite approval and increasing number of positive points depending on whether problem is merely noticed, problem is confirmed by system, fix suggested, fix implemented. And there is a significant deduction for allowing the monitored system to be compromised.

Figure 43:
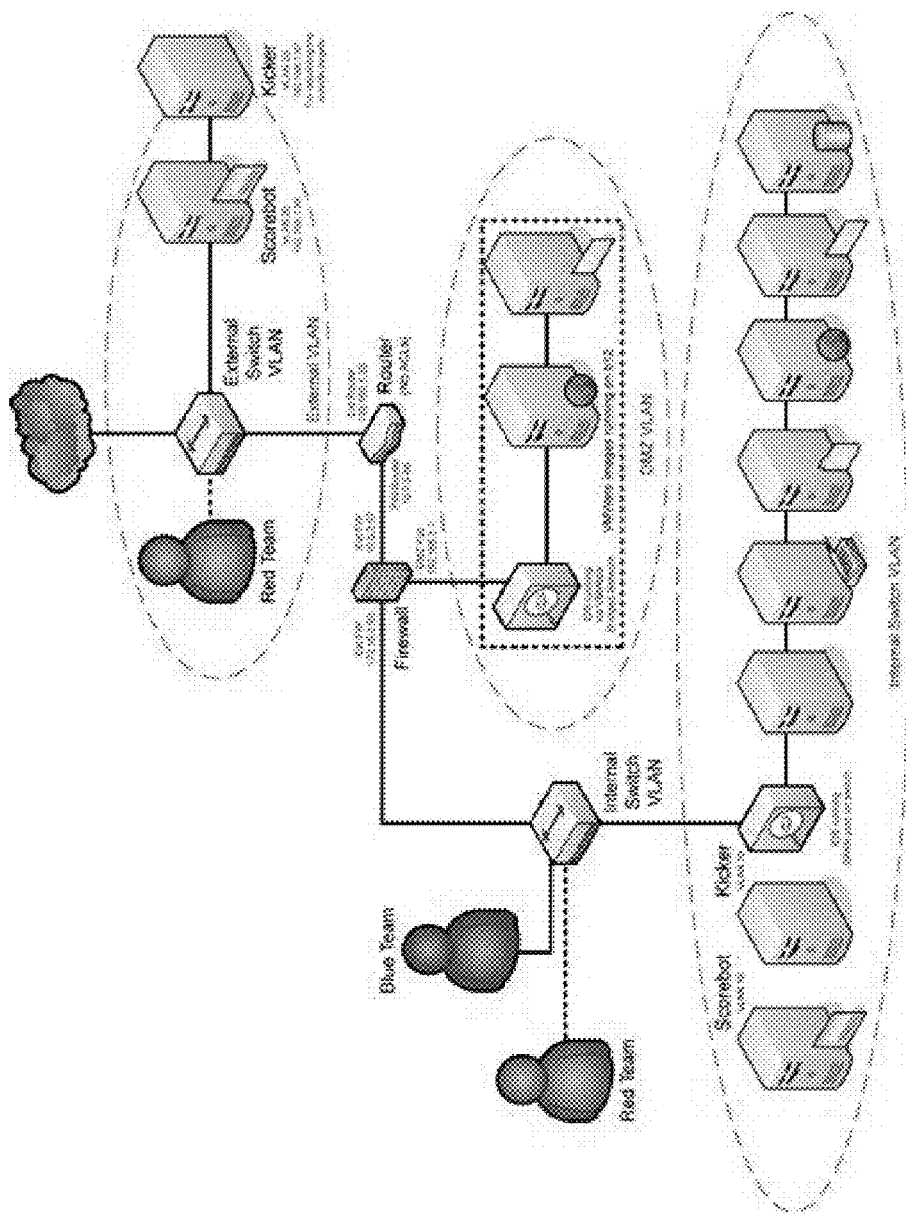
FIG. 43 illustrates an exemplary system schematic for security training exercises in accordance with at least one embodiment described herein.

The system exemplified in FIG. 43 may be used in accordance with one or more embodiments described herein and has the following attributes:

Self-contained; never touches operational environment
Emulates student's operational environment using standard Windows, UNIX, network management interface and network/security devices
Realistic, live environment with real-time, automated, quantitative scoring validated by the Center for Infrastructure Assurance and Security (CIAS)
Complexity to the student level (middle school to professional)
Outbrief capability showing status, trends and scores
Ability to rerun same scenario
Available anytime-anywhere
Scale to large numbers
Automation for ease of use The system facilitates training, competition and certification through variable exercises. For example, during a distributed game (Practice/Qualification), the following processes are implemented:

Contestant downloads and hardens target on own machine
Contestant maintains critical services on own machine
Contestant performs Defensive Work, Forensics, and/or Penetration Test
Agent sends status to CyberNEXS Global Services which returns score to Contestant's Status Page
No attacks nor trouble ticket activity performed (no red/white team required)

During a centralized game (Final Round), the following processes are implemented:

Contestant remotely logs into CyberNEXS Global Services
Distributed game activities, plus attacks and trouble ticketing run and scored on CyberNEXS (red/white team required)
Red/White/Blue Team functions local or remote As discussed above, various game scenarios may be implemented as part of the training, competition and certification. Exemplary cyber games include, but are not limited to:

1. CND (Computer Network Defense)—goal for this game is for the defenders (Blue Team) to maintain the critical services of their hosts, improve the security of their hosts, defend against the attackers (Red Team), and communicate to the scoring team (White Team).
2. Forensics—goal for this game is for the analysts (Green Team) to identify and communicate, to the White Team, the evidence uncovered including the method of intrusion, the IP address of the attacker, any evidence of misuse left by the attacker.
3. Penetration Testing (CNA (Computer Network Attack))—goal for this game is for the Pen Testers (Red Team) to compromise the target hosts and "claim" them by inserting a target flag into specific locations, as well as the discovery of certain keyword information planted in the targets.
4. CTF (Capture The Flag)—goal for this game is for the Attackers (Red Team) to gain control of one or more targets (i.e. neutral systems not owned by other participants), and then remove vulnerabilities while maintaining critical services. They must also act as Defenders (Blue Team) to prevent other teams from gaining control of that target.
5. Progressive Ladders game (aka King of the Hill)—goal for this game is the same as any of the other gamed (CND, Forensics, PenTest, CTF), however, at a predefined time interval or scoring threshold reached, a new host or hosts are added to the pool of targets for the game.

Figure 44:
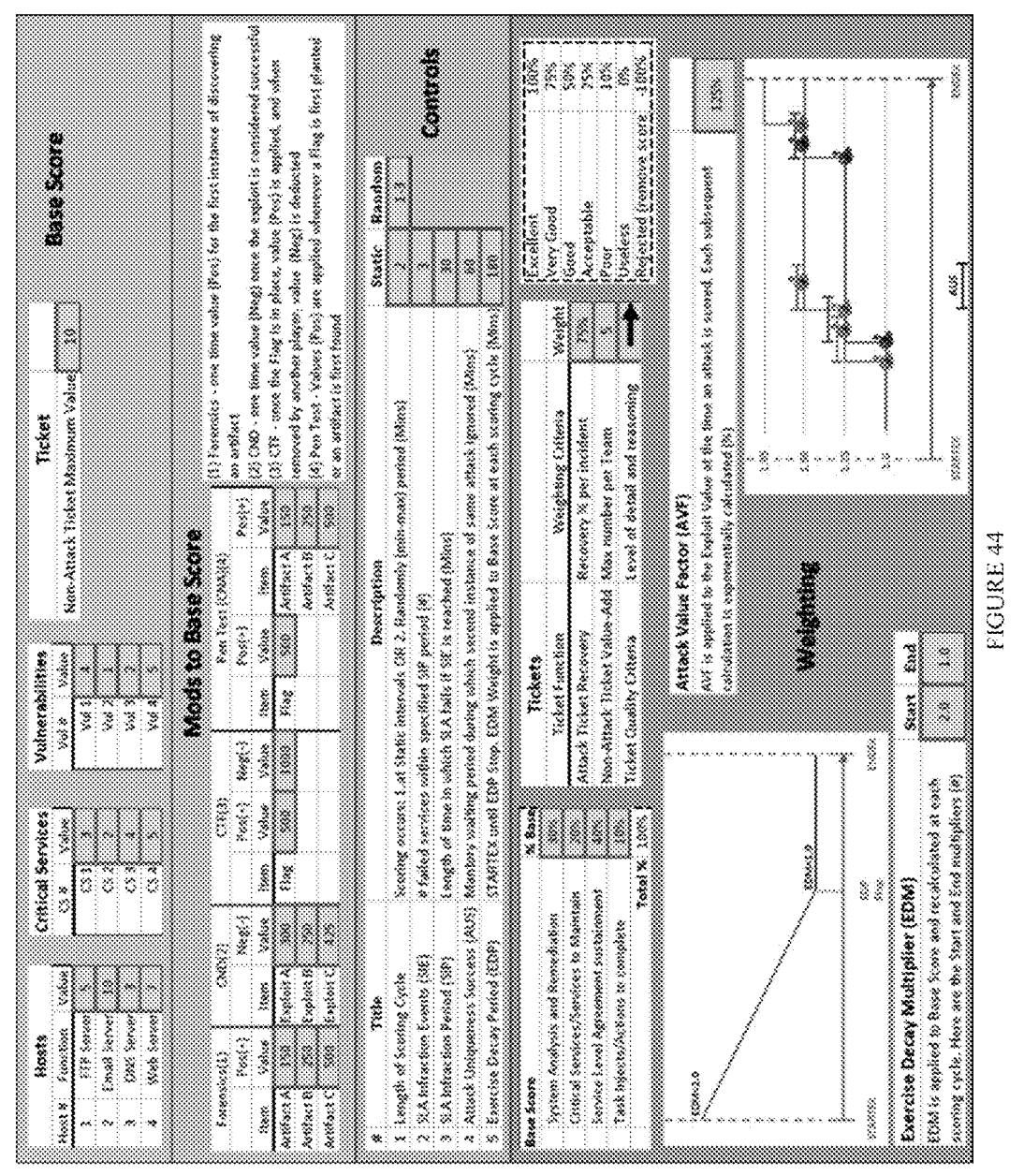

The cyber games are scored in accordance with a scoring system such as that shown in FIG. 44. The scoring system of FIG. 44, while overlapping in many respects with those as previously described in cross-referenced U.S. application Ser. Nos. 13/554,609 and 12/492,242 (now U.S. Pat. No. 8,250,654) which were filed on Jul. 20, 2012 and Jun. 26, 2009, respectively, for SYSTEMS AND METHODS FOR IMPLEMENTING AND SCORING COMPUTER NETWORK DEFENSE EXERCISES, has additional features and configurations as described further below.

Game Roles are defined for Participants, as well as Game Managers. Roles are defined by Team color designations as follows.

1. Blue Team—The "Defenders" for the game. Their role is to secure the computer(s)/network(s) by patching, repairing, reconfiguring, operating, and managing the targets assigned to them. (Targets is a term used for the game systems (server/personal computer and network devices) which game players defend, attack, or conduct forensics and are scored according to their level of success in performing those operations.) They need to communicate effectively via tickets to the White Team, what changes they make to the system and what they detect and mitigate regarding vulnerabilities and hacker activity. The Blue Team must also operate and maintain any critical services as defined by the game design. Blue Team actions and activities are scored by the White Team (defined below).

2. Red Team—The "Attackers" for the game; this is not only a hacker role in a defensive or CTF game, but also a security professional applying penetration testing techniques in a CNA game. Their role is to compromise and control the computer(s)/network(s) by scanning, probing, and exploiting the targets available or assigned to them. They need to coordinate with the White Team either via tickets or through the use of automation tools to score their findings for some of the game variants. In other variants, they just need to prove to the scoring system that they have achieved control or access to critical scoring areas.

3. Green Team—The "Forensic Analysts" for the game, if required. Their role is to identify actions performed by the attacker(s) against the computer(s)/network(s) by collecting evidence, analyzing details, and reporting the results from the targets assigned to them. They need to communicate their findings via tickets to the White Team to receive score for their findings, although certain key elements will be detected in the ticket automatically scored without manual intervention.

4. White Team—The "Judges" for the game. Their role is to monitor the Red-Blue-Green (RBG) participants' activities in the game by reviewing tickets submitted by the RBG and Black Team participants, and by observing the participants' performance in person or via the scoring system. They need to communicate to the other team(s) to score their findings and to schedule applicable injects. (Note: In some variations of games, the White Team has an additional non-scoring role to assist in fulfilling Blue/Green Team support requests.)

5. Black Team—The "Referees" and administrators for the game. Their role is to manage the game system, the underlying mechanics of the environment, and to ensure the game functions as designed. The Black Team may not communicate directly with the Blue/Red team, but should be able to initiate contact with the White Team for status updates, confirmation of actions, warnings of environment changes, etc. and when White Team makes specific system function requests, such as: system resets, systems restore requests, and reboots of targets as needed.

In accordance with these defined roles and teams, the cyber game scenarios are further summarized herein.

1. Defense—The CND (Computer Network Defense) game is a "defend and protect" scenario in which the participants are the defenders (Blue Team) and are given a network of mis-configured, compromised, and/or poorly maintained computers to defend against attack. The goal for this game is for the participants to maintain the critical services of their hosts, improve the security of their hosts, defend against the attackers (Red Team), and communicate to the scoring team (White Team). ScoreBot, based on the client information, tracks whether critical services are running and/or specific vulnerabilities exist; then automatically scores the game as a base score during each scoring cycle. This base score is then combined with the score decrements as a result of the Red Team attacks as well as score increments as scored by the White Team. Score increments can be the result of effective Blue Team actions reported or completion of injects.

2. Forensics—The Forensics game is an "investigate and report" scenario in which the participants are given specific host data or forensics details to collect, investigate, analyze, and report. The goal for this game is for the participants (Green Team) to identify and communicate to the White Team specific information such as the method of intrusion, the IP address of the attacker, the evidence of misuse left by the attacker, the timeline of hostile activity, etc. The game is scored based on tickets containing these artifacts that will demonstrate that the participant has discovered the specific data. Examples of the artifacts can include: the MD5 hash value of the malware, the username of the account that was attacked, the IP address of the attacker, etc. The score is then objectively factored by the White Team, which is checking for accuracy and clarity as both negative and positive modifications to the base score.

3. CNA—The CNA (Compute Network Attack) game is an "assess and exploit" scenario in which the individual participants are competing against each other as evaluators (Red Team) and are given a network of computers to analyze and exploit as fully as possible. (From a philosophical point, this game can also be called "Penetration Testing" as the exploit actions are conducted against authorized targets and not against other individuals.) The goal for this game is for the participants (Red Team) to compromise the target hosts and "claim" them by inserting a target flag into specific locations, as well as the discovery of certain information planted in the targets. Examples of the artifacts include: the hash value stored as credit card data in the database; the hash value stored in ContactName in the SNMP MIB; the hash value in the user files; the hash value as the command in the admin page for the web application; etc. The game is scored based on the number of flags planted and artifacts found based on the complexity of the flag location or the value of the artifact.

4. CTF—The CTF (Capture The Flag) game is a "capture and defend" scenario in which the participants are competing against each other and attempting to gain control of one or more centrally available targets (i.e. neutral systems not owned by other participants) or are responsible for the management of targets (i.e. systems run by each participant team and used as targets by other participant teams) while attacking the targets run by other teams. The team that successfully finds and exploits vulnerabilities to gain control of the host and plants a flag immediately scores points. Once the flag is planted, the team controlling the system attempts to secure it and maintain critical services. This reduces the opportunity for other teams to find holes in the system and accumulates points for maintenance of critical services. When another team successfully removes the first team's flag, the first team loses points and the new team gains points for the reversal of flag and then begins incrementing their scores per scoring cycle as appropriate.

5. Progressive Ladders (King of the Hill) The Progressive Ladders game, also known as King of the Hill, is a variant of all of the above game types, except that additional targets are introduced after the start of the game. At pre-defined time interval or when a certain scoring threshold reached, a new host or hosts are added to the pool of targets forcing teams to balance these new targets against their ability to work with their existing targets.

There are two metrics that make up the score for each gaming scenario: 1. Base Score and 2. Modifications to the base score. The base score is an indication of the overall progress of the participants. For example, in a CND game, the base score is a reflection of the Critical Services uptime and the Remediation actions, whereas in a Forensics game, the base score is a reflection of the discovery of specific artifacts in the Forensic image(s). Regardless of the type of score, each scoring data point is affected by weighting as described herein.

The Base Score is the components of the score that are cumulatively added for each scoring cycle. Therefore a base score increment is added to the cumulative total of each team every time a score is calculated. Exemplary outputs of base scoring scenarios are shown in FIGS. 45a and 45b.

Figure 45A:
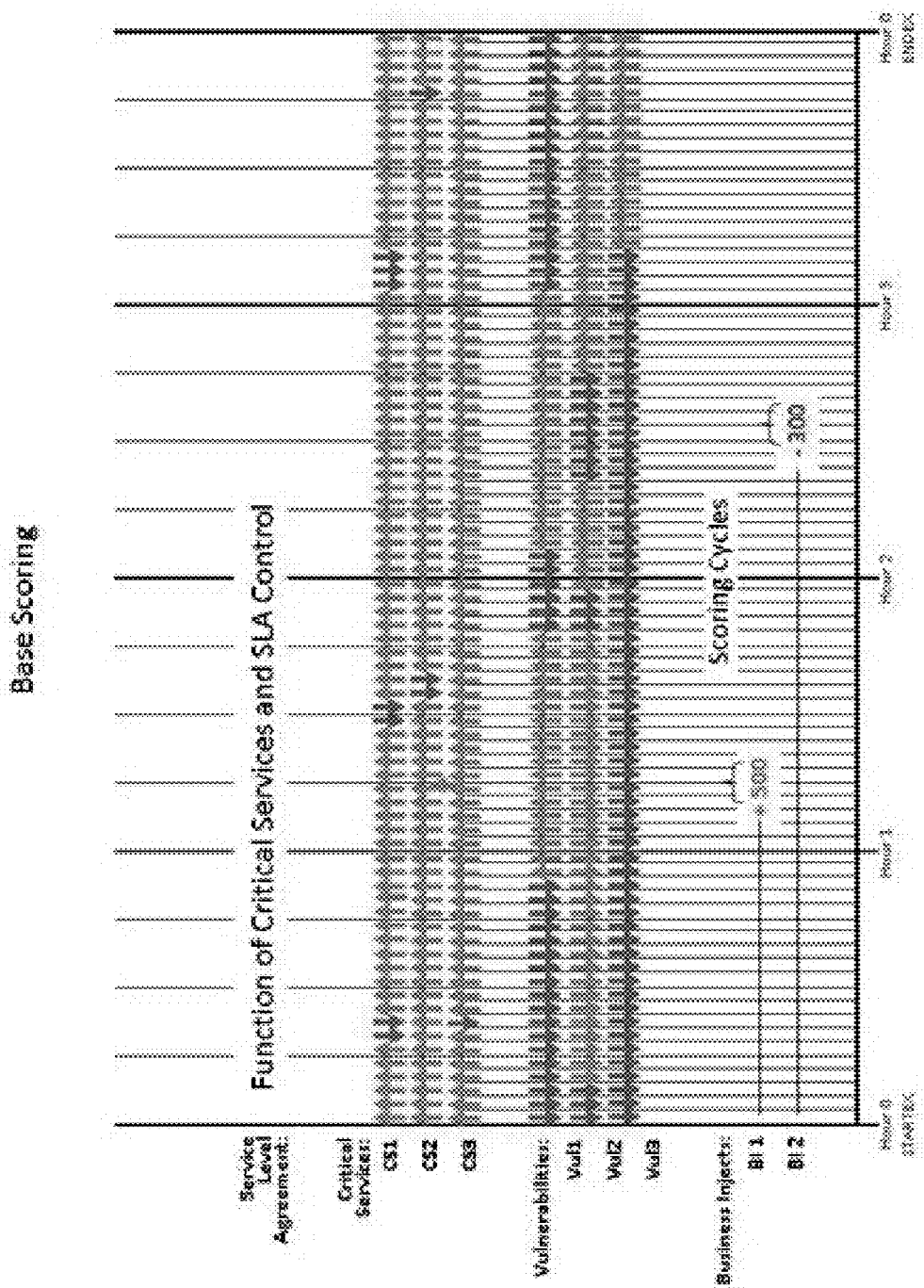

FIGS. 45a and 45b depict scoring of a single host for a single participant/team. Referring to FIG. 45b, the first line shows whether "host 1" was live to the network; when the host is "UP", the participant/team accrues the value of the host, or in this case, "2" points. Also, because the host is talking to the network, the rest of the components will be recorded as to the nature of their state at that moment. The next component set listed below the host is the critical services for that specific host. Note that each has an individual value assigned, as do the vulnerabilities located below them. When a scoring cycle hits, if the service is "UP", they accrue the point value for the critical service(s). For the vulnerabilities, if their status is "FIXED", they accrue the point value for each of the vulnerability(ies) that have been remediated. If this were a Penetration Testing game, then a planted Flag would be scored each cycle that the Client determined it was active in the proper location.

At the bottom of FIG. 45b, there is a running "Cumulative" score from each scoring cycle. This cumulative score will be used to certify an individual or declare a game winner. That cumulative score also includes one-time "Modifications to Base Score", such as Trouble Tickets (TT) or "Successful Attacks", discussed below.

As the Base Score is based on conditional states reported by the Client, if a host is "DOWN" during a particular scoring cycle and cannot communicate with the server, then no score is recorded, as is the case in Scoring Cycle 3 below. If when Scoring Cycle 4 arrives Host 1 is "UP", then the base score will once again record for each component consistent with their current state. For Modification to Base Scores components, like TT or Attacks, the points are assessed on the server-side, and therefore are immediately posted to the database, and counted during the next scoring cycle.

Figure 46:
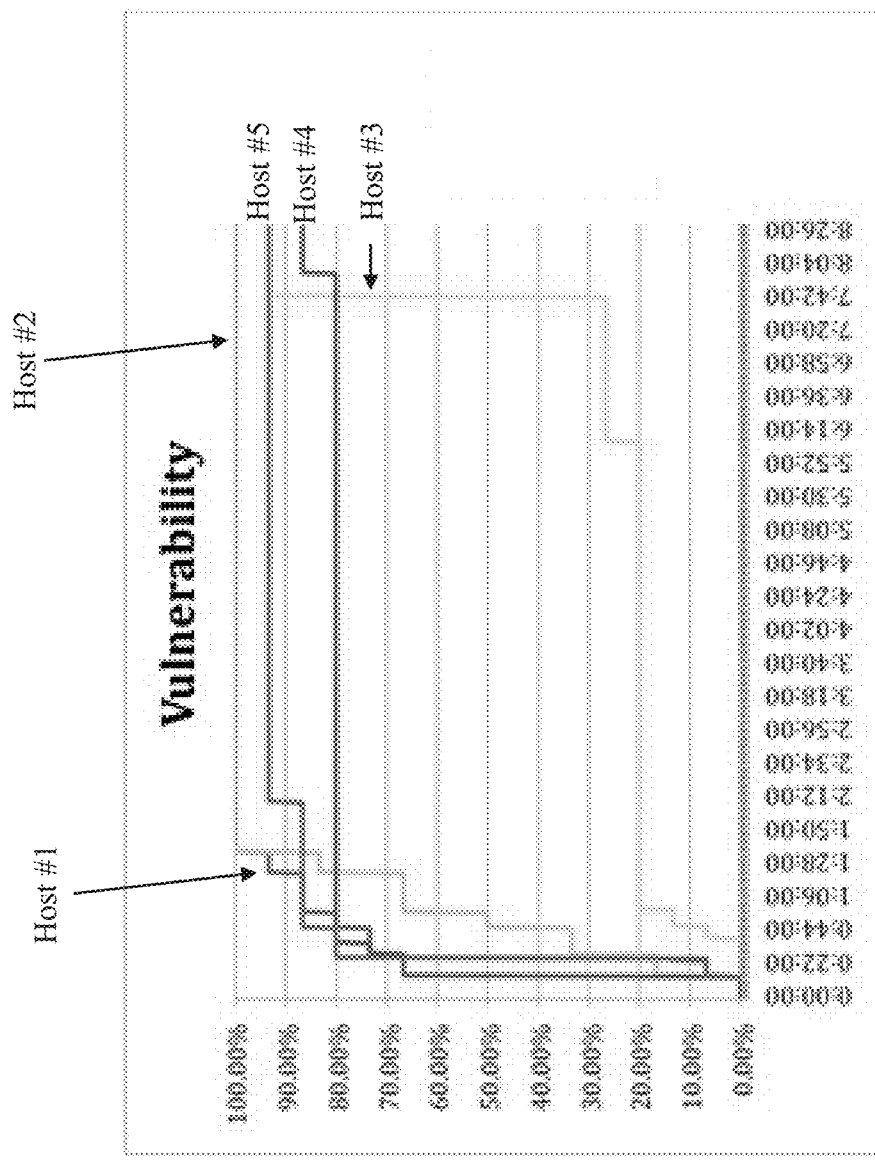
FIG. 46 illustrates vulnerability fixes per host over time in accordance with at least one embodiment described herein.

As a participant makes positive changes as per the game variant, these positive actions are used to change the base score. For instance, in a CND game the base score is a combination of the critical services and the vulnerabilities fixed. So, as a participant continues to improve the security of targets and maintain their critical services their base points rise. Similarly, in the CTF game the base score is a combination of the critical services and the flags planted on the host, thus a participant won't achieve maximum score for their flags unless they have also maintained their critical services. FIG. 46 illustrates an exemplary output showing vulnerability fixes over time for multiple Hosts.

For each game variant that requires it, there is a list of critical services that the participants need to maintain. For some targets or game variants, critical services could include ICMP or 'ping' as a component of the scoring. In games that measure critical service performance, critical services must be maintained in order to allow the game to function. For example, if during a CND game the defender just disabled all critical services, then there would be nothing to defend. Likewise, for CTF games, once a participant has successfully compromised a target, they must maintain in a functional manner the services that target is responsible for providing. Critical service maintenance is the basis for base score on most games. For those games that have no critical services, then this component of the base score is set to zero or null.

Figure 47:
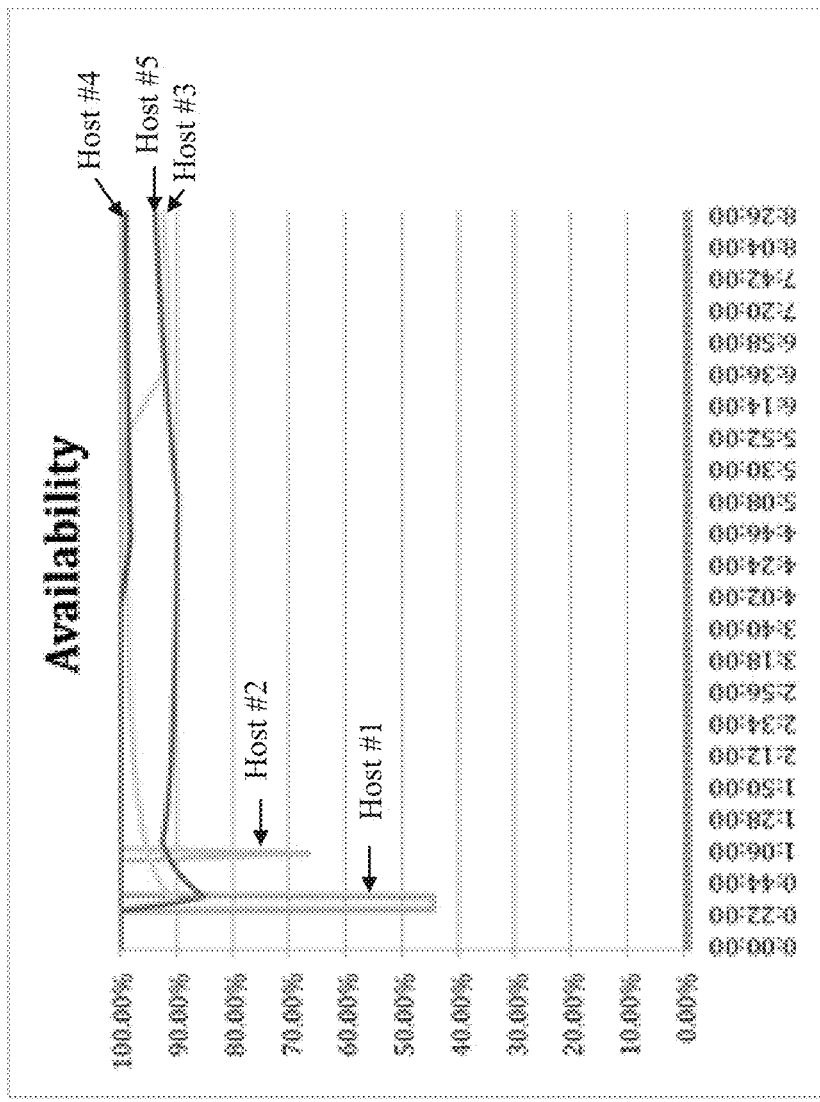
FIG. 47 illustrates an exemplary output showing critical services availability over time for multiple Hosts in accordance with at least one embodiment described herein.

FIG. 47 illustrates an exemplary output showing critical services availability over time for multiple Hosts.

For each game variant that requires it, a Service Level Agreement or SLA is established that requires the participants to maintain a specific service level percentage for a length of multiple scoring cycles. The scoring difference between the Critical Services and SLA is the desire for the service to remain functional and viable for as long as possible and to give the participants an added incentive to focus on keeping this services up and available. Failure to maintain critical services at or above the established SLA level results in the loss of points.

A task inject is the process of the White Team or Black Team introducing an additional requirement after the game has started. It may include the development of a security policy document, the instantiation of a new host, and/or deploying a new critical service as well the introduction of new vulnerabilities to team systems or targets. For instance, a participant may be given a task inject that requires them to install and have functioning a secondary DNS server on one of their hosts within 45 minutes. If they succeed within their allotted time, the White Team will immediately increment their score accordingly. However, after implementation, this new critical service must now be maintained, and any associated vulnerabilities mitigated as with the originals hosts. This introduces additional scoring opportunities, both positive and negative depending on the participant's success.

Modifications to Base Score are those events that offer a one-time change to the base score for a single scoring cycle. This can give a significant increase or decrease to the score for that scoring cycle, but this value is added to/subtracted from the cumulative total for the game only once for these actions.

Note in FIG. 45b above that Trouble Tickets (TT) scoring is depicted. As a modification to base score, the value of a TT is only accrued one time. For example, in Scoring Cycle 2, TT 2 was submitted and awarded a score of 5 out of a possible 10 points maximum. In Scoring Cycle 3, the value of TT2 was increased by the White Team to 10, or an increase of 5 points, which was recorded during that cycle and added to the Accumulative Score. If the TT was later downgraded in score, the difference of points would be deducted during the next scoring cycle.

If the game variant permits, a participant can submit documentation via a ticket that is scored either by the White Team or by an automated process looking for specific keywords (such as in the case of the Forensic or CNA (Computer Network Attack) game variants). In either case, this alteration of score is immediate and is not subjected to any additional modification.

Similar to the positive actions, if the game variant permits, a participant can be hacked, fail to deliver a specific inject, or fail to maintain a flag on a system. In these cases, the score will be adjusted either by the White Team, in the case of inject failures, or automatically, in the case of a hack or loss of flag. In all cases, this alteration of score is immediate and is not subjected to any additional modification.

For each scoring component, there are controls available to weight and alter the importance of specific items based on the needs of the game designer. These controls provide the ability to tailor the scoring to specific categories of participants and provide the ability to tune the scoring to match the desired testing capability.

Figure 48:
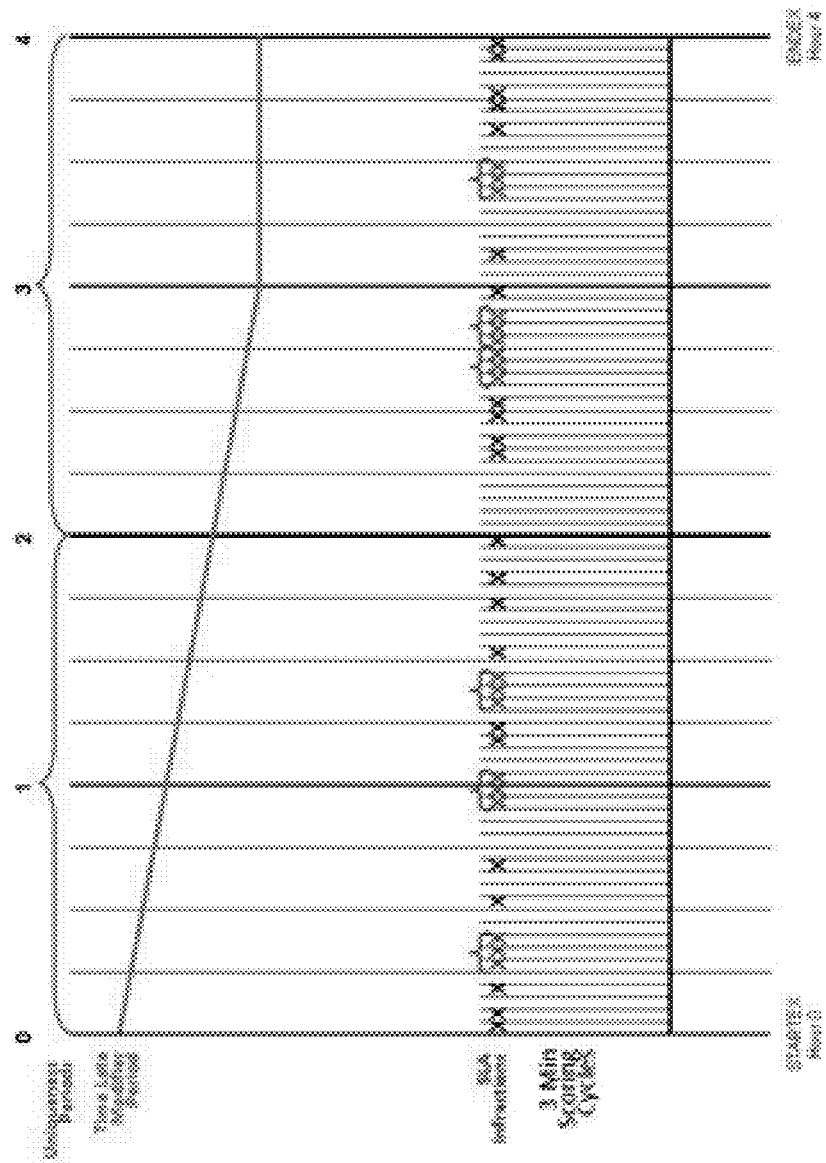
FIG. 48 is exemplary of a scoring controls output configuration in accordance with at least one embodiment described herein.

Controls are those elements that don't directly modify the score. Instead controls are the inputs that define how the scoring system functions without a direct correlation to the score itself. FIG. 48 is exemplary of a scoring controls output configuration.

The length of each scoring cycle can be altered so that the timing of scoring is not based on the input from the ScoreBot and can be varied. The timing can be either expressed as a set time interval or random, so long as the minimum time interval is not less than the ScoreBot's current cycle time. If the random time interval is chosen, a random delay, not to exceed 5 times the ScoreBot's current cycle time, is injected between each scoring cycle; the timing, though, is still based on the ScoreBot's current cycle time. To put it another way, if the ScoreBot is configured to get information from all targets every 90 seconds, and the scoring system is set to 3 minutes, then every other update from the ScoreBot can be ignored for scoring, and only the current data at the time of scoring is considered. Likewise, if the scoring system is set to random, then the system will score at random times throughout the exercise with only the current data at time of scoring considered.

Each critical service is required to be maintained and kept functional, thus an additional scoring criteria is the ability to manage the uptime via a Service Level Agreement (SLA). This can be described as the number of scoring cycles to consider for the calculation of the SLA as well as the percentage of uptime desired. Thus a game can have a 91% desired uptime when measured against a window of the last 30 scoring cycles. Therefore if during any 3 or more cycles in the past 30 cycles, the critical services are down, then the SLA is failed and no points are given for that cycle. This calculation takes into account the relative value per service (weights) as described below.

With the game variants that have an attack component, the scoring system can be configured to ignore repeated instances of the same attack against the same host during a specified period. Therefore if a Red Team member used the RPC_DCOM exploit against a single Windows 2000 server, the score against that host would only decrement once in the defined uniqueness window.

Weights are those elements that directly modify the score. These are the values that are used by the scoring system to adjust score areas based on importance assigned by the game goals.

The game designer is able to set the scoring percentage on calculations of the base score for the game variant chosen. Thus a game designer can prioritize the game's areas of interest and then assign the percentage of attribution for each scoring area. If the focus for the game is to work on vulnerability reduction, then the scoring can be adjusted to favor those actions more than others. The percentages for base score are:
  % of Base Score dependent on % of weighted vulnerabilities fixed per host
  % of Base Score dependent on % of weighted availability of critical services per host
  % of Base Score dependent on meeting SLA requirements for weighted availability of critical services per host
  % of Base Score dependent on % of score for completed injects per host
The sum of the percentages of Base Score must equal 100%.

Similarly, each host or target is also definable as having a separate value when considered with the other hosts or targets. Thus a host with a value of 10 has five times greater impact (or significance) than a host with a value of 2. This allows games designers to assign significance to high value systems, such as an e-commerce site.

Each critical service is definable as having a separate value when considered with the other services. Thus a critical service with a value of 5 has five times greater impact (or significance) that a critical service with a value of 1.

Like the critical service and host, each remediation, vulnerability, flag, or artifact can also have an individual value associated with it. The amount for each is related to the criticality or severity of the issue. For instance in a CND game, a remotely exploitable vulnerability which surrenders a root or administrator shell would warrant a high value like 10, but a minor information leakage like a default SNMP community string would warrant a lower value like 1.

In games that have a CND component, the value of each Red Team attack when measured against the defenders score is based on the impact of the vulnerability exploited. Therefore a remote root exploit could have a score of 2,000, a web page defacement could have a score or 1,000, a vulnerable user password could have a score of 500, and non-sensitive data leakage could have a score of 100. In each case, the successful completion of the attack would be acknowledged and then scored against the base score.

For the tickets that are related to a specific action, in a CND game where the Blue Team submits a ticket about a hack they detected, a percentage of the initial action can be defined and points can be "earned back" by the submitting team. Therefore in a CND game, a team could regain a percentage of the points lost from a successful hack. Including regaining higher than 100% of the points lost.

Some tickets can be submitted that don't directly relate to a specific attack. For example, during a CND game, a Blue Team member may suggest that a maintained site be recovered to the off-site disaster recovery facility. This scenario may not be part of the game per se, but the White Team may consider this a valuable and insightful idea and thus want to award some points for this ticket. The amount of score that will be attributed to a 'good idea' ticket can be established at the onset and the white team can simply rate the appropriateness or quality of the ticket—the score is calculated as a percentage of the per ticket maximum value. The maximum number of 'Good Idea' tickets can also be limited in weighting of a game, thus a team can only submit and be scored for a maximum of 5 non-hack related tickets for example.

For every ticket that is submitted, the White Team subjectively determines the value of the ticket as they read and score the ticket. Any automated score based on ticket contents is already calculated, but a White Team person may grant additional value to the score by rating its appropriateness. Thus a ticket that has substantive detail, cogent explanation, well thought out reasoning, and brings value to the discussion can be ranked more useful and important to the scoring of the ticket itself. The rating is based on a percentage of the weight. Table 1 below is exemplary of a ratings scale.

TABLE 1

| Value | Percentage applied |
| --- | --- |
| Excellent | 100% |
| Very Good | 75% |
| Good | 50% |
| Acceptable | 25% |
| Poor | 10% |
| Useless | 0% |
| Rejected (remove score) | −100% |

The difference between a useless and rejected ticket, is if a participant submits a ticket that contains an artifact, but should not receive the points for that artifact, then these points can be "rejected". For example, in the forensics game the participants need to find the MD5 value of the suspect binary. If a team or team members submits an MD5 value for every file on the system then the desired artifact is in the ticket, but the participant has not recognized it Instead the team has submitted every possible answer in the hopes of "gaming" the system. Whereas, this undesirable behavior can be discouraged by rejecting the ticket which penalizes the team for their actions. In contrast, a "useless" ticket is on one that does not pertain to the game, contains no value and should simply be ignored.

With the game variants that have the attack component, the scoring system can also be configured to weight more heavily those same attacks against the same host that fall outside a specified time period to further penalize teams for taking no permanent action either against the initial attack or to remove the vulnerability. For example, if a Red Team member used the RPC_DCOM exploit against a single Windows 2000 server, the score against that host may only decrement once in a two-hour window. However, after that two-hour window is completed, if the same attack is repeated and the uniqueness window limitation has expired, the Blue Team would then be subject to a multiplier value if the same attack succeeds again. This multiplier could be enforced each time the uniqueness window expires and the attack is repeated successfully with the multiplier increasing for each subsequent successful attack. Therefore, a team could lose 2,000 points for the first DcomRPC DCOM remote root exploit during the first two hours of the exercise, another 3,000 points for the second DcomRPC DCOM attack two hours after the first successful attack, and another 4,500 points for the third RPC_DCOM attack if it were successful two hours after the second successful attack. In this case the uniqueness window was set to two hours and the multiplier was set to 1.5×.

Figure 49:
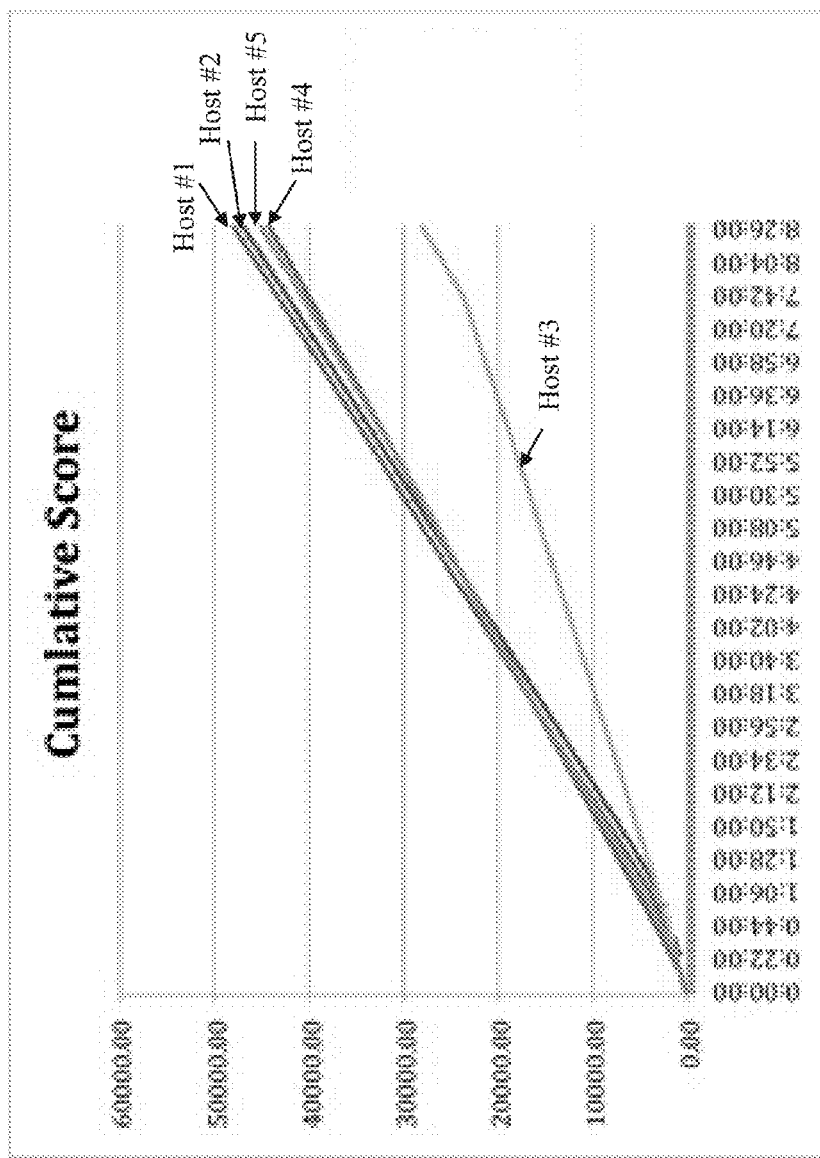
FIG. 49 illustrates an exemplary cumulative scoring output in accordance with at least one embodiment described herein.

The concept of an exercise time based modifier permits the value of actions that generate the base score to be enhanced or decreased based on the duration of time since exercise start. This modifier of base score could make actions done sooner worth more, thus rewarding the participant when they are faster in performing the necessary functions. The parameters to control this modifier are based on the initial modifier value, the final modifier value and the final time quanta that the final modifier is used. These times are based on the timing of the scoring cycle—if we had an initial modifier value of 1.5×, a final value of 1.0 and the final time set to 2 hours, then in the first two hours the value for each action would drop from initially one and one half times the base score change to just the base score smoothly over that two hours. As show as shown in Table 2 below.

total amount of points earned throughout the game. For example, a team that scored 40,000 points early in the game and then doesn't earn any points for the remainder of the game would beat a team that earns 5,000 points an hour if the game lasts less than 7 hours as the team slowly earning points will have a lower cumulative score. FIG. 49 illustrates an exemplary cumulative scoring output.

Figure 50:
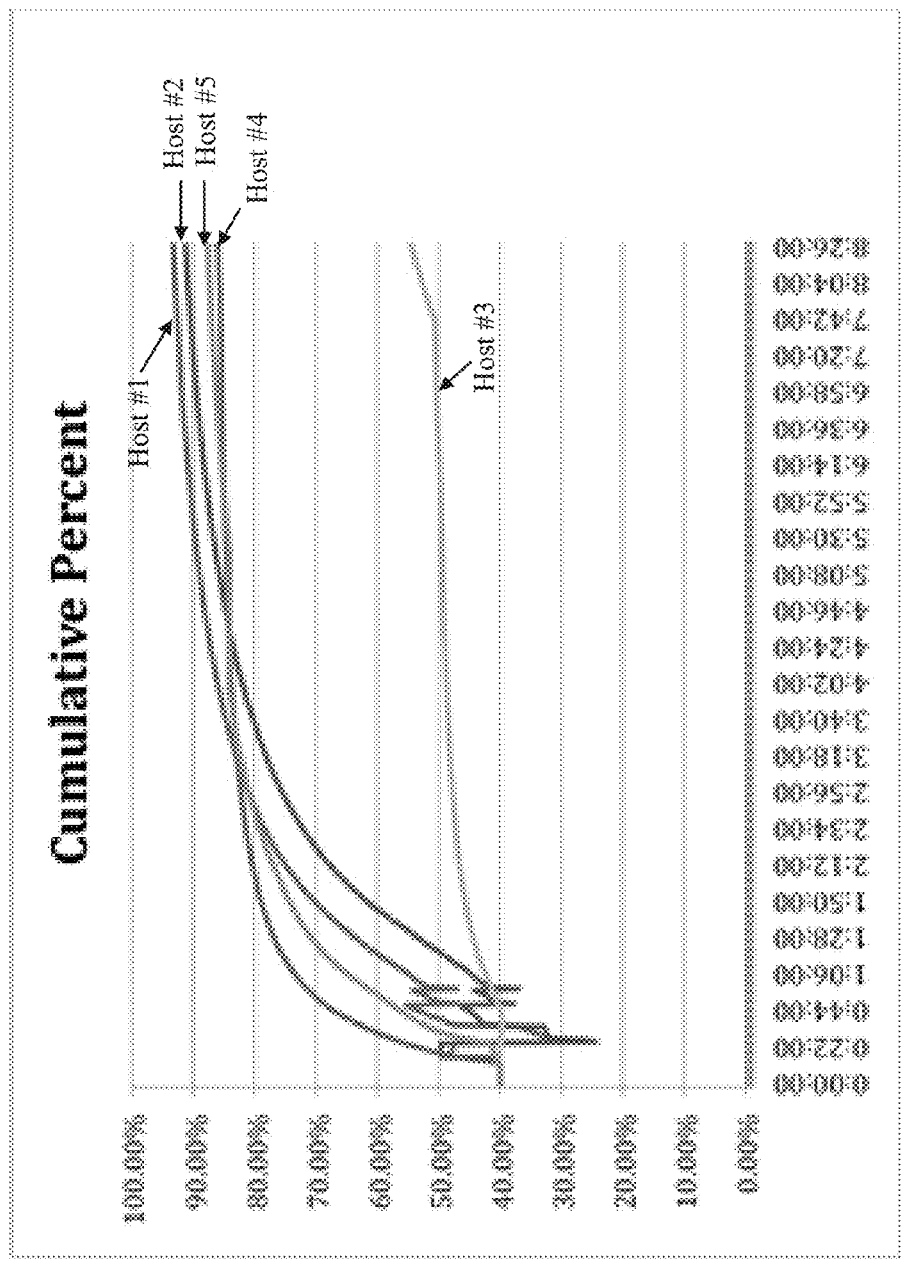
FIG. 50 illustrates an exemplary cumulative scoring percentage in accordance with at least one embodiment described herein.

Cumulative percentage shows the difference in percentage between the current amount of points accumulated for each team, individual, or host and the maximum amount of points possible at that moment. Therefore, during a game that can accumulate 100 points per scoring cycle, if a team earns 50 points in the first cycle and 0 points in the second cycle, the cumulative score would remain 50 for both cycles but the cumulative percent would be 50% for the first cycle(50/100) and 25% for the second cycle (50/200). This view of scoring is very useful to show the lack of change in a score since the amount of change is minimized. FIG. 50 illustrates an exemplary cumulative scoring percentage in accordance with at least one embodiment described herein.

An additional impact to the score is described herein. In a CND game a successful attack will decrement a fixed amount of points for that attack. So, in the first hour of a game that earns 100 points every two minutes you could achieve a maximum of 3,000 points. If a hack is worth −1,500, then a team could lose 50% of the possible points if attacked during the first hour. But, if the same hack was done later instead of the first hour, the amount of impact is less. So, in the 8th hour of a game that earns 100 points every two minutes you could achieve a maximum of 24,000 points by the end of the hour. If the same hack is worth −1,500 and is performed in the 8th hour, then a team could lose 6.25% of the possible points. So, the same attack in the first hour decrements 1,500 points or 50% of the possible total versus the same attack performed in the eighth hour decrementing 1,500 points or 6.25% of the possible total.

This is why the repeat attack escalation is so important. If a team misses the first attack, the amount of the attack can increase in impact. Thus a team that was hacked by the same attack against the same host once an hour, they would lose more and more points for the same attack occurring as they were not stopping the attacker against a previously used attack.

For each scoring cycle there are a number of weighted points to add to the cumulative score. This is known as the

TABLE 2

| | | | Time | | | | |
|---|---|---|---|---|---|---|---|
| | 0:00 | 0:30 | 1:00 | 1:30 | 2:00 | 2:30 | 3:00 |
| Base | 30 | 35 | 40 | 50 | 60 | 70 | 80 |
| Modifier | 1.5 | 1.375 | 1.25 | 1.125 | 1.0 | 1.0 | 1.0 |
| Modified Base | 45 = (30 * 1.5) | 51.875 = (45 + 5 * 1.375) | 58.125 = (51.875 + 5 * 1.25) | 69.375 = (58.125 + 10 * 1.125) | 79.375 = 69.375 + 10 | 89.375 = 79.375 + 10 | 99.375 = 89.375 + 10 |

For each game variant, there is a Base Score that is created which is then modified by the delta value and finally adjusted by the positive and negative actions impacting the final scoring. Thus for each variant a rudimentary description for the computation of the Base Score is provided, and then using that Base Score an Actual Score is computed. For all games, there are multiple score values that are calculated and tracked for each scoring cycle.

Figure 51:
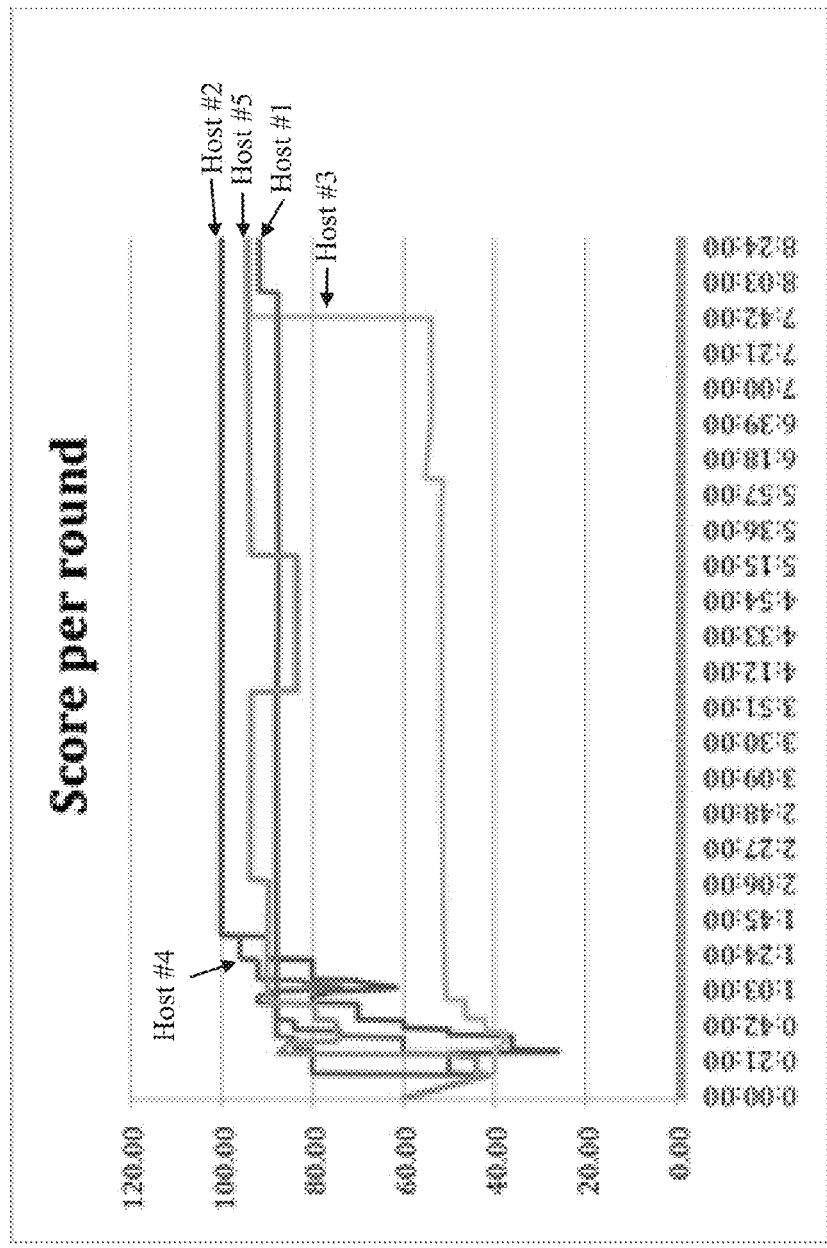
FIG. 51 illustrates an exemplary score per cycle (or round) output in accordance with at least one embodiment described herein.

This is the total amount of scoring points that each team, individual, or host have accumulated throughout the game. This number can be used to select a final winner based on the score per cycle, which shows the amount of comparative progress between the teams, individuals, or hosts per cycle. FIG. 51 illustrates an exemplary score per cycle (or round) output in accordance with at least one embodiment described herein.

For the CND game, the value of each cycle added to the cumulative points is dependent on the base score of the Blue Team fixing vulnerabilities, keeping critical services functional, meeting their SLA requirements, and completing task injects. This base score is then adjusted based on duration of exercise and the Exercise Time-Based Multiplier value as well as the impact of the positive and negative actions as shown in the textual algorithm below.

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?})+({Percent of Base Score dependent on completed injects}*{value of completed injects})

Actual Score=Base Score*{The value of Weighting based on current time}+Positive actions−Negative Actions For the Forensic game, the value of each cycle added to the cumulative points is dependent on the base score of the Green Team finding artifacts and reporting them in tickets. This base score is then adjusted based on duration of exercise and the Exercise Time-Based Multiplier value as well as the impact of the positive and negative actions as shown in the textual algorithm below.

Base score={per host weighting}*(Σ{Artifacts Found}*their weightings/(Σ{all Artifacts}*their weightings))

Actual Score=Base Score*{The value of Weighting based on current time}+Positive/Negative white team scoring on ticket completeness and writeup For the CNA game, the value of each cycle added to the cumulative points is dependent on the base score of the Red Team planting their flag on the host, while keeping critical services functional. This base score is then adjusted based on duration of exercise and the Exercise Time-Based Multiplier value as well as the impact of the positive and negative actions as shown in the textual algorithm below.

Base score={per host weighting}* ({Flagplanted*weight}+(Σ{Artifacts Found}*their weighting/(Σ{all Artifacts}*their weighting))+(Σ{Critical Services ok}*their weighting/(Σ{all Critical Services}*their weighting)))

Actual Score=Base Score*{The value of Weighting based on current time}+Positive actions−Negative Actions For the CTF game, the value of each cycle added to the cumulative points is dependent on the Red Team planting their flag on the host and calculating the value for that host, which is dependent on the Red Team fixing vulnerabilities, keeping critical services functional, and meeting their SLA requirements. This base score is then adjusted based on duration of exercise and the Exercise Time-Based Multiplier value as well as the impact of the positive and negative actions. Negative actions include the loss of the flag on a previously held host as shown in the textual algorithm below.

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?}))*(True/False Is the flag placed for this user/team?)

Actual Score=Base Score*{The value of Weighting based on current time}+Positive actions−Negative Actions For the Progressive Ladders game, the value of each cycle added to the cumulative points is dependent on the Red Team planting their flag on the host and then calculating the value for that host, which is dependent on the Red Team fixing vulnerabilities, keeping critical services functional, and meeting their SLA requirements. This base score is then adjusted based on duration of exercise and the Exercise Time-Based Multiplier value as well as the impact of the positive and negative actions. Negative actions include the loss of the flag on a previously held host. However, as more hosts are added to the progression, the total amount of points possible in each cycle increases as shown in the textual algorithm below.

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?}))*(True/False Is the flag placed for this user/team?)

Actual Score=Base Score*{The value of Weighting based on current time}+Positive actions−Negative Actions Additionally, other embodiments may be implemented in accordance with one or more of the following descriptions.

Effects based scoring is when a user (client) is directed by a controlling server to verify the state of another system. This capability would be flexible enough to be used as both vulnerability and compliance verification. Instead of measuring the changes in a system from a local system perspective, e.g., local client check, effects based scoring looks at the effect of the changes to see if a condition has changed. As an example, during an exercise the secret data that the participants are protecting is being exfiltrated out of the network via DNS by an unknown adversary. How do they stop this traffic? With effects based scoring, the following examples are instructive:

1. Block the sender at the switch.
2. Block the packet type at the firewall
3. Block the sender at the inside firewall
4. Block the receiver at the outside firewall
5. Block the DNS queries at the DNS server
6. Power off the switch
7. Block the port on the switch
8. Redirect all DNS to the internal DNS server
9. Null route the receiver at the firewall
10. Null route the sender at the firewall
11. Write a MANGLE rule for IPchains on the firewall to destroy the content of the packets
12. Write an ACL (Access Control List) on the external router to block the receiver This flexibility in solution can be scored by measuring the effect of what the action had on the event.

In operation, the server creates tasking for clients to verify the health/vulnerability status of other clients in the exercise. Therefore, if a mail server is expected to be functioning, then one client will try to send mail to a user on that host with a random key value created by the server. Then after a few moments, a different client would try to read the mail from that server to see if the random key value was in any of the messages. Thus ensuring that the Email server was truly functioning.

Similarly, if checking for vulnerability in a Web Application, the server could have another client send a Web Request to another server, and then verify the return from the web page matched the expected or un-expected responses.

Additionally for data exfiltration and other network flow traffic, the server could have one of the clients begin sending out "classified" or "secret" data to a remote site. Thus, if that data stopped flowing, then the team had successfully blocked the exfiltration.

The server maintains several queues for work submissions based on the clients that have registered. Queue types are split by client_id, subnet, operating system, and critical services. When the server determines that an effect based scoring event needs to be triggered, it will either directly assign it to the appropriate client(s), or place it in the queue for the next available client(s) to pick up. When the client updates it's next status or health check, it looks in the queues that are assigned to it and receives the request. The client then parses and executes the actions in the request, and then parses the corresponding "Success" or "Failure" triggers for the reply.

Depending on the requests that are written, one request may send a trigger action to one client, and the response action to another client. In this way, a client that is "outside" of the exercise (like a proxy) would be able to send or receive actions from the server and provide additional scoring data.

The requests are written in an XML format to allow simple extension to the scoring methods over time. Thus new methods can be developed. Intended methods may include:
RAW IP PACKET SEND/RECEIVE
HTTP REQUEST/RESPONSE
HTTPS REQUEST/RESPONSE
SMTP REQUEST/POP3 RESPONSE/IMAP RESPONSE
LOCAL COMMAND LINE/RESPONSE With the randomness of not knowing which client is tasked to do what actions, there are separate time-out values for both queue insertion (thus preventing a task from being left in the queue too long) and expected response (thus preventing a task from being unfinished on the client).

Composable Competition Management Units

A small-footprint service set can be duplicated and connected to support any size cyber competition. Aggregation functions support the synthesis of data, but the composable design makes it possible. The composable units include and support the following features and functionality:
- Each Competition Management Unit (CMU) consists of five services communicating internally through an encrypted tunnel.
- Communication between the five services is through a protocol of message exchanges, web services and shared data.
- Services coordinate on exercise start and stop, exercise parameters, user and target identities, and scoring parameters.
- A database preserves shared data for the five services of the CMU.
- A new CMU joins an aggregation of CMUs through a server-level message exchange protocol.
- One CMU is always the aggregator. This is decided by manual property setting, or by a voting procedure among the CMUs.
- Aggregator and secondary CMUs exchange identity information that is needed for bi-directional exchange of information.
- The aggregator CMU communicates the parameters of an exercise to secondary CMUs that join the aggregation, along with any ongoing changes in parameters that may occur in the course of an exercise.
- Secondary CMUs communicate local exercise status and registration statistics to the aggregator CMU.
- Secondary CMUs communicate user and team-level scoring information to the aggregator CMU.
- Clients registered on any CMU in the aggregation will participate in the same game.

Cyber Maneuvers Rule Set

A rule set has been developed that combines vulnerability definitions, vulnerability detection tests, attacks on vulnerabilities, and the weights and scores associated with these. This combination of observables and actions are called maneuvers. The rule set connects OVAL and tools for developing and executing exploit code, anti-forensics code and evasion code, such as Metasploit and connects them. The rule set can be externalized in formal rule syntax to produce a re-usable rule set that could be loaded into a rule engine and used with the embodiments described here. Details of the rule set include:
- The components of a Maneuver Rule consist of: Vulnerability Definition, Vulnerability Test, Vulnerability Category, Vulnerability Weight, Vulnerability Value, Exploit against Vulnerability, Exploit Value, Scoring Algorithm and Parameters for Exploits, and Scoring Algorithm for Vulnerability and Vulnerability Fix.
- Taken together, these components can be considered Event-Condition-Action (ECA) Rules. ECA Rules can be loaded into a forward or backward-chaining rule engine that supports this rule format. Events are Vulnerability detections. Conditions are the parameters for evaluating vulnerabilities. Actions are the launch of exploits and the fixing of vulnerabilities.
- Embodiments compose ECAs rules for identifying, analyzing and scoring Vulnerabilities and corresponding Exploits.
- The ECA RuleSet could be exported in a formal ECA Rule format for import into a stand-alone rule engine. JDROOLS and JESS are examples of publicly available rule engines that support ECA rule formats.

User and Team Competition

Users and teams may be registered and scored directly as competitors in the new game types (CTF, CNA, Forensics). Users and teams have their own scoring displays. Exemplary details regarding implementation of this functionality include:
- Individual users register for access according to game type.
- Individual users are scored for actions based on game type.
- Individual users can be scored as a team.
- Targets register with a scorebot based on name and team credentials.
- Targets can be scored as a team as well as individually.
- Teams and users have their own scoring displays, distinct from target scoring displays Omnigrapher The omnigrapher functionality enables a user to pick X and Y parameters for graphs from lists, in any combination. The displays are generated on the fly from those parameters to allow individual users to view score results in various combinations. Exemplary details include:
- The user can pick specific exercise participants for display generation, to limit detail on the graph or table.
- Exercise data for users, targets or teams can be displayed.
- Exercise parameters can be selected from a constrained list based on game type.
- The desired graphic will be rendered on the fly from the selected subjects and parameters.
- Available graphics are line graphs, tables, histograms, pie charts.

As is evident to a person skilled in the art, various components and embodiments of the invention described herein can take the form of an entirely hardware embodiment, an entirely software embodiment or an embodiment containing both hardware and software elements. Software implementations include, but are not limited to, firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The embodiments set forth herein are intended to be exemplary of the described inventive concepts and are in no way intended to limit the scope of the invention thereto. One skilled in the art recognizes the numerous variations that are inherently contemplated by the invention as described.

The invention claimed is:

1. A process for scoring a client network system defense training exercise implemented over a services-oriented architecture comprising:
   receiving by at least one server machine from the client network system data related to a defense training exercise at an end of one or more of predetermined scoring cycles or upon request, the data including one or more of a current list of client network system vulnerabilities, details of client system vulnerability fixes, details of client system vulnerability identifications and details of client system vulnerability exploitations, wherein the details include a unique identifier for each of a vulnerability fixer, a vulnerability identifier and a vulnerability exploiter and a time value for each of time to fix, time to identify and time to exploit;
   applying a set of scoring rules by a scoring engine of the at least one server machine to the details to determine one or more base scores at the end of one or more of predetermined scoring cycles or upon request from a second server machine for each participant in the defense training exercise, wherein the participant is an individual user or a group of users;
   determining an actual score for each participant using the one or more base scores at the end of the defense training exercise;
   receiving by at least one server machine from the client network system at the end of one or more of predetermined scoring cycles or upon request, data related to the operation and maintenance of one or more critical services of the client network system, including details related to percentage up time of the one or more critical services; and
   applying the set of scoring rules by the scoring engine of the at least one server machine to the details related to percentage up time of the one or more critical services and, where applicable, including the result in the calculation of the one or more objective scores for each participant.

2. The process according to claim 1, wherein the set of scoring rules is different depending on a role of the participant.

3. The process according to claim 2, wherein the roles of the participant are selected from the group consisting of: defender of the client network system, attacker of the client network system, forensic analyst of the client network system, judges of the one or more defense training exercises and referees of the one or more defense training exercises.

4. The process according to claim 3, wherein the one or more defense training exercises is a computer network defense (CND) game and includes at least one defender of the client network system, at least one attacker of the client network system, and at least one judge;
   wherein defenders are scored on ability to defend one or more computers from attacks thereon by the attackers during each of one or more predetermined scoring cycles as judged by the judges; the attackers are scored on their ability to compromise one or more computers during each of one or more predetermined scoring cycles as judged by the judges; and the judges are scored based on one or more of accuracy of scoring other participants and accuracy of one or more task injects to the CND game in response to status.

5. The process of claim 4, wherein the one or more task injects include one or more of: development of a security policy document, instantiation of a new host, deploying a new critical service and introduction of additional vulnerabilities to systems or targets after a defense training exercise has started.

6. The process according to claim 3, wherein the one or more defense training exercises is a forensics game and includes one or more forensic analysts of the client network system;
   wherein the forensic analysts are scored on ability to collect, investigate, analyze and report on data resulting from actions of an attacker, such data including at least one of the following: identification of method of intrusion, identification of IP address of the attacker, identification of evidence of misuse left by the attacker, ascertaining timeline of hostile activity, identification of MD5 hash value of malware, and identification of username of an account that was attacked.

7. The process according to claim 3, wherein the one or more defense training exercises is a computer network attack (CNA) game and includes multiple individual attackers;

wherein the multiple individual attackers are scored on ability to analyze and exploit authorized targets in the client network system as evidenced by at least one of insertion of an identifying flag in one or more target locations and reporting of an artifact found.

8. The process of claim 7, wherein artifacts found include one or more of: a hash value stored as credit card data in a database; a hash value stored in ContactName in the SNMP MIB; a hash value in a user file; and a hash value as a command in the administrative page for a web application.

9. The process according to claim 3, wherein the one or more defense training exercises is a capture the flag (CTF) game and includes multiple individual attackers and multiple individual defenders acting in both attacker and defender capacities as the CTF game progresses;

wherein the multiple individual attackers and multiple individual defenders are scored based one or more of ability to gain control of one or more centrally available targets and management of appointed targets while simultaneously attacking the targets run by others.

10. The process according to claim 9, wherein additional targets are introduced after the start of the CTF game.

11. The process according to claim 1, wherein the one or more base objective scores are comprised of at least three of the components selected from the following: percentage of weighted vulnerabilities fixed per host; percentage of weighted availability of critical services per host; percentage dependent on meeting predetermined service level agreement requirements for weighted availability of critical services per host; and percentage of completed injects per host, wherein the sum of the at least three percentages must equal 100 percent.

12. The process according to claim 4, wherein the base score and actual score are determined as follows:

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?})+({Percent of Base Score dependent on completed injects}*{value of completed injects})

Actual Score=Base Score*{The value of Weighting based on current time}+Positive actions−Negative Actions, wherein SLA is Service Level Agreement.

13. The process according to claim 6, wherein the base score and actual score are determined as follows:

Base score={per host weighting}*(Σ{Artifacts Found}*their weightings/(Σ{all Artifacts}*their weightings))

Actual Score=Base Score*{The value of Weighting based on current time}+Positive/Negative judge scoring, wherein judge scoring is an evaluation of the accuracy of one or more reports from the forensic analyst.

14. The process according to claim 9, wherein the base score and actual score are determined as follows:

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?})*(True/False Is the flag placed for this user/team?)

Actual Score=Base Score*{The value of Weighting based on current time}+Positive actions−Negative Actions, wherein SLA is Service Level Agreement.

15. The process according to claim 10, wherein the base score and actual score are determined as follows:

Base score={per host weighting}*({Percent of Base Score dependent on vulnerabilities}*Σ{Vulnerabilities Fixed}*their weighting/(Σ{all Vulnerabilities}*their weighting))+({Percent of Base Score dependent on availability of critical services}*Σ{Critical Services ok}*their weighting/(Σ{all Critical Services}*their weighting))+({Percent of Base Score dependent on meeting SLA}*{True/False was the SLA met?}))*(True/False Is the flag placed for this user/team?)

Actual Score=Base Score*{The value of Weighting based on current time}+Positive actions−Negative Actions, wherein SLA is Service Level Agreement.

* * * * *